US008578039B2

(12) United States Patent
Pounds et al.

(10) Patent No.: US 8,578,039 B2
(45) Date of Patent: *Nov. 5, 2013

(54) METHOD AND APPARATUS FOR LEVERAGING A STIMULUS/RESPONSE MODEL TO SEND INFORMATION THROUGH A FIREWALL VIA SIP AND FOR RECEIVING A RESPONSE THERETO VIA HTML

(75) Inventors: Greg Pounds, San Jose, CA (US); Timothy Kusumi, Los Gatos, CA (US); Gary L. Maxwell, Sunnyvale, CA (US); Chris Koverman, San Jose, CA (US)

(73) Assignee: BroadSoft Casabi, LLC, Gaithersburg, MD (US)

( * ) Notice: Subject to any disclaimer, the term of this patent is extended or adjusted under 35 U.S.C. 154(b) by 1298 days.

This patent is subject to a terminal disclaimer.

(21) Appl. No.: 11/931,085

(22) Filed: Oct. 31, 2007

(65) Prior Publication Data
US 2008/0049910 A1 Feb. 28, 2008

Related U.S. Application Data

(60) Division of application No. 11/745,888, filed on May 8, 2007, now abandoned, which is a continuation-in-part of application No. 11/175,991, filed on Jul. 5, 2005, now Pat. No. 7,975,011.

(60) Provisional application No. 60/870,349, filed on Dec. 15, 2006, provisional application No. 60/585,375, filed on Jul. 2, 2004.

(51) Int. Cl.
*G06F 15/16* (2006.01)
*H04M 1/64* (2006.01)

(52) U.S. Cl.
USPC .......................... 709/230; 709/219; 379/88.17

(58) Field of Classification Search
USPC ........ 709/230, 217, 219, 227, 229; 379/88.17
See application file for complete search history.

(56) References Cited

U.S. PATENT DOCUMENTS 5,012,466 A 4/1991 Buhrke et al.
5,999,525 A 12/1999 Krishnaswamy et al.
(Continued)

FOREIGN PATENT DOCUMENTS

EP 1113620 7/2001
EP 1235397 8/2002
(Continued)

OTHER PUBLICATIONS

Affidavit Pursuant to 37 CFR 1.56, submitted in related U.S. Appl. No. 12/636,586, signed by inventor Stephen Kwo, Dated Dec. 10, 2009, 1 page.

(Continued)

*Primary Examiner* — Peling Shaw
(74) *Attorney, Agent, or Firm* — Jenkins, Wilson, Taylor & Hunt, P.A.

(57) ABSTRACT

A method and apparatus turns a typical home telephone system into a platform for delivery of web based content and services. The preferred embodiment of the invention comprises a broadband enabled telephone system for the home and a series of web servers that collect, package, and deliver personalized content and services to all of the telephone handsets throughout the home. With this end-to-end solution, any information or services available via the web can be delivered through a broadband enabled telephone system. Through the web, each member of a family can build a profile which defines what information and services they want available through the handset. In addition, each handset can be dynamically personalized for any family member. The color screens on the handsets become windows through which an individual can view and interact with a broad range of content and services. The audio channels thus become an extension of the voice based services, such as messaging and voice chat.

8 Claims, 38 Drawing Sheets

(56) References Cited

U.S. PATENT DOCUMENTS

| | | | |
|---|---|---|---|
| 6,223,286 B1 | 4/2001 | Hashimoto | |
| 6,453,329 B1 | 9/2002 | Dodgen | |
| 6,463,462 B1 | 10/2002 | Smith et al. | |
| 6,523,021 B1 | 2/2003 | Monberg et al. | |
| 6,567,398 B1 | 5/2003 | Aravamudan et al. | |
| 6,665,711 B1* | 12/2003 | Boyle et al. | 709/219 |
| 6,671,424 B1 | 12/2003 | Skoll et al. | |
| 6,714,222 B1 | 3/2004 | Bjorn | |
| 6,721,306 B1 | 4/2004 | Farris et al. | |
| 6,738,981 B1 | 5/2004 | Tonnby et al. | |
| 6,741,853 B1 | 5/2004 | Jiang et al. | |
| 6,748,095 B1 | 6/2004 | Goss | |
| 6,757,365 B1 | 6/2004 | Bogard | |
| 6,788,676 B2 | 9/2004 | Partanen et al. | |
| 6,826,559 B1 | 11/2004 | Ponte | |
| 6,826,597 B1 | 11/2004 | Lonnroth et al. | |
| 6,871,236 B2 | 3/2005 | Fishman et al. | |
| 6,996,076 B1 | 2/2006 | Forbes et al. | |
| 7,016,351 B1* | 3/2006 | Farinacci et al. | 370/392 |
| 7,027,818 B2 | 4/2006 | Bos et al. | |
| 7,035,923 B1 | 4/2006 | Yoakum et al. | |
| 7,149,287 B1 | 12/2006 | Burger et al. | |
| 7,177,642 B2 | 2/2007 | Sanchez Herrero et al. | |
| 7,181,537 B2 | 2/2007 | Costa-Requena et al. | |
| 7,248,577 B2 | 7/2007 | Hakusui | |
| 7,272,400 B1 | 9/2007 | Othmer | |
| 7,298,702 B1 | 11/2007 | Jones et al. | |
| 7,337,448 B1 | 2/2008 | Dalia et al. | |
| 7,471,653 B2* | 12/2008 | McConnell et al. | 370/328 |
| 7,509,425 B1 | 3/2009 | Rosenberg | |
| 7,525,955 B2 | 4/2009 | Velez-Rivera et al. | |
| 7,543,034 B2 | 6/2009 | Deshpande | |
| 7,610,328 B2 | 10/2009 | Haase et al. | |
| 7,694,127 B2* | 4/2010 | Adams et al. | 713/151 |
| 7,761,526 B2 | 7/2010 | Pounds et al. | |
| 7,761,871 B2 | 7/2010 | Edwards et al. | |
| 7,769,383 B2 | 8/2010 | Deshpande et al. | |
| 7,813,485 B2 | 10/2010 | Yin et al. | |
| 7,826,603 B1* | 11/2010 | Denman et al. | 379/202.01 |
| 7,849,205 B2 | 12/2010 | Pounds et al. | |
| 7,856,471 B2 | 12/2010 | Pounds et al. | |
| 7,864,673 B2 | 1/2011 | Bonner | |
| 7,975,011 B2 | 7/2011 | Pounds et al. | |
| 8,223,955 B2 | 7/2012 | Pounds et al. | |
| 8,463,872 B2 | 6/2013 | Pounds et al. | |
| 2001/0038624 A1* | 11/2001 | Greenberg et al. | 370/352 |
| 2002/0035605 A1 | 3/2002 | McDowell et al. | |
| 2002/0042826 A1* | 4/2002 | Gaus et al. | 709/227 |
| 2002/0042831 A1 | 4/2002 | Capone et al. | |
| 2002/0082938 A1 | 6/2002 | Borger et al. | |
| 2002/0087545 A1 | 7/2002 | Bright et al. | |
| 2002/0087704 A1 | 7/2002 | Chesnais et al. | |
| 2002/0103898 A1* | 8/2002 | Moyer et al. | 709/224 |
| 2002/0118809 A1 | 8/2002 | Eisenberg | |
| 2002/0176404 A1 | 11/2002 | Girard | |
| 2002/0194601 A1 | 12/2002 | Perkes et al. | |
| 2003/0006911 A1 | 1/2003 | Smith et al. | |
| 2003/0028889 A1 | 2/2003 | McCoskey | |
| 2003/0070167 A1 | 4/2003 | Holtz et al. | |
| 2003/0076815 A1* | 4/2003 | Miller et al. | 370/352 |
| 2003/0078928 A1 | 4/2003 | Dorosario et al. | |
| 2003/0093187 A1 | 5/2003 | Walker | |
| 2003/0105820 A1 | 6/2003 | Haims et al. | |
| 2003/0182451 A1 | 9/2003 | Grass et al. | |
| 2003/0185365 A1 | 10/2003 | Mansfield | |
| 2003/0200431 A1 | 10/2003 | Stirbu | |
| 2003/0217110 A1 | 11/2003 | Weiss | |
| 2004/0058652 A1 | 3/2004 | McGregor | |
| 2004/0062383 A1 | 4/2004 | Sylvain | |
| 2004/0068584 A1 | 4/2004 | Costa-Requena et al. | |
| 2004/0085949 A1 | 5/2004 | Partanen et al. | |
| 2004/0125933 A1 | 7/2004 | Jun | |
| 2004/0128344 A1* | 7/2004 | Trossen | 709/203 |
| 2004/0174971 A1 | 9/2004 | Guan | |
| 2004/0181706 A1 | 9/2004 | Chen et al. | |
| 2004/0230659 A1 | 11/2004 | Chase | |
| 2004/0242230 A1 | 12/2004 | Rue | |
| 2004/0248594 A1* | 12/2004 | Wren, III | 455/465 |
| 2004/0261115 A1 | 12/2004 | Bartfeld | |
| 2005/0002407 A1 | 1/2005 | Shaheen et al. | |
| 2005/0010475 A1 | 1/2005 | Perkowski et al. | |
| 2005/0050152 A1 | 3/2005 | Penner et al. | |
| 2005/0071361 A1 | 3/2005 | Hettish et al. | |
| 2005/0074102 A1 | 4/2005 | Altberg et al. | |
| 2005/0111441 A1* | 5/2005 | Koskelainen | 370/352 |
| 2005/0113649 A1 | 5/2005 | Bergantino | |
| 2005/0135315 A1 | 6/2005 | Sinha | |
| 2005/0198147 A1 | 9/2005 | Pastro et al. | |
| 2005/0198299 A1 | 9/2005 | Beck et al. | |
| 2005/0213724 A1 | 9/2005 | O'Brien et al. | |
| 2005/0232283 A1 | 10/2005 | Moyer et al. | |
| 2005/0249196 A1* | 11/2005 | Ansari et al. | 370/352 |
| 2006/0026629 A1* | 2/2006 | Harris et al. | 725/32 |
| 2006/0033809 A1 | 2/2006 | Farley | |
| 2006/0034266 A1 | 2/2006 | Harris et al. | |
| 2006/0117097 A1 | 6/2006 | Ogasawara et al. | |
| 2006/0136596 A1 | 6/2006 | Izumi | |
| 2006/0188080 A1 | 8/2006 | Terpstra | |
| 2006/0239242 A1 | 10/2006 | Huffschmid | |
| 2007/0039036 A1 | 2/2007 | Sullivan et al. | |
| 2007/0043829 A1 | 2/2007 | Dua | |
| 2007/0136441 A1* | 6/2007 | Chang et al. | 709/219 |
| 2007/0149135 A1 | 6/2007 | Larsson et al. | |
| 2007/0208837 A1 | 9/2007 | Tian et al. | |
| 2007/0250865 A1 | 10/2007 | Krakirian | |
| 2007/0294336 A1 | 12/2007 | Pounds et al. | |
| 2008/0049919 A1 | 2/2008 | Pounds et al. | |
| 2008/0063159 A1 | 3/2008 | Pounds | |
| 2008/0077446 A1 | 3/2008 | Korpman et al. | |
| 2008/0086564 A1 | 4/2008 | Putman et al. | |
| 2008/0095344 A1 | 4/2008 | Jachner | |
| 2008/0313265 A1 | 12/2008 | Pounds et al. | |
| 2009/0296623 A1 | 12/2009 | Kwon | |
| 2009/0305681 A1 | 12/2009 | Adkins | |
| 2010/0159967 A1 | 6/2010 | Pounds et al. | |
| 2010/0169263 A1 | 7/2010 | Korpman et al. | |
| 2011/0116419 A1 | 5/2011 | Cholas et al. | |
| 2011/0159852 A1 | 6/2011 | Pounds et al. | |

FOREIGN PATENT DOCUMENTS

| | | |
|---|---|---|
| WO | WO 00/18083 | 3/2000 |
| WO | WO 2006/014546 A2 | 2/2006 |
| WO | WO 2008/076905 A2 | 6/2008 |
| WO | 2011072306 A1 | 6/2011 |

OTHER PUBLICATIONS

Affidavit Pursuant to 37 CFR 1.56, submitted in related U.S. Appl. No. 12/636,586, signed by inventor Gregory E. Pounds, Dated Dec. 10, 2009, 1 page.

Affidavit Pursuant to 37 CFR 1.56, submitted in related U.S. Appl. No. 12/636,586, signed by inventor Jonathan Cho, Dated Dec. 10, 2009, 1 page.

Affidavit Pursuant to 37 CFR 1.56, submitted in related U.S. Appl. No. 12/636,586, signed by inventor Chris Koverman, Dated Dec. 11, 2009, 1 page.

Affidavit Pursuant to 37 CFR 1.56, submitted in related U.S. Appl. No. 12/636,586, signed by inventor Shivakumar Jayaraman, Dated Dec. 11, 2009, 1 page.

Boulet, et al.; *OmniPCX Office: Setting New Standards for Convergence in the SME Market*; Oct. 2002: Alcatel Telecommunications Review pp. 3-5.

Bakker, et al.; *Rapid Development and Delivery of Converged Services using APIs*; Published Online Aug. 28, 2002; In Bell Labs Technical Journal, vol. 5, No. 3, pp. 12-29, Retrieved on Mar. 29, 2008 from the internet: http://www.ecsl.cs.sunysb.edu/-srikant/papers/rapid_develop.ps.

Notice of Allowance and Fee(s) Due for U.S. Appl. No. 11/931,135 (Aug. 12, 2013).

Notice of Allowance and Fee(s) Due for U.S. Appl. No. 13/014,560 (Jul. 22, 2013).

(56) References Cited

OTHER PUBLICATIONS

Notice of Allowance and Fee(s) Due for U.S. Appl. No. 11/931,135 (Jun. 27, 2013).
Non-Final Office Action for U.S. Appl. No. 11/931,279 (Jun. 17, 2013).
Interview Summary for U.S. Appl. No. 11/931,359 (Jun. 5, 2013).
Interview Summary for U.S. Appl. No. 13/014,560 (May 16, 2013).
Non-Final Office Action for U.S. Appl. No. 11/931,359 (Apr. 12, 2013).
Notice of Allowance and Fee(s) Due for U.S. Appl. No. 12/636,586 (Feb. 28, 2013).
Communication Pursuant to Article 94(3) EPC for European Patent Application No. EP 05769220.4 (Feb. 15, 2013).
Final Office Action for U.S. Appl. No. 13/014,560 (Feb. 7, 2013).
Restriction Requirement for U.S. Appl. No. 12/636,586 (Nov. 21, 2012).
Non-Final Office Action for U.S. Appl. No. 13/014,560 (Jun. 22, 2012).
Notice of Allowance and Fee(s) Due for U.S. Appl. No. 11/931,208 (Apr. 25, 2012).
Notice of Allowance and Fee(s) Due for U.S. Appl. No. 11/931,208 (Mar. 16, 2012).
Final Office Action for U.S. Appl. No. 13/014,560 (Jan. 23, 2012).
Advisory Action for U.S. Appl. No. 11/931,208 (Jan. 12, 2012).
Advisory Action for U.S. Appl. No. 11/931,279 (Nov. 8, 2011).
Final Office Action for U.S. Appl. No. 11/931,208 (Nov. 3, 2011).
Final Office Action for U.S. Appl. No. 11/931,279 (Aug. 18, 2011).
Interview Summary for U.S. Appl. No. 11/931,208 (Aug. 10, 2011).
Non-Final Office Action for U.S. Appl. No. 13/014,560 (Aug. 9, 2011).
Advisory Action for U.S. Appl. No. 11/931,135 (May 19, 2011).
Non-Final Office Action for U.S. Appl. No. 11/931,208 (May 19, 2011).
Notice of Non-Compliant Amendment for U.S. Appl. No. 11/931,279 (May 16, 2011).
International Search Report for PCT International Patent Application No. PCT/US2010/060150 (Apr. 22, 2011).
Notice of Allowance and Fee(s) Due for U.S. Appl. No. 11/175,991 (Apr. 5, 2011).
Final Office Action for U.S. Appl. No. 11/931,135 (Mar. 2, 2011).
Interview Summary for U.S. Appl. No. 11/931,279 (Mar. 2, 2011).
International Preliminary Examination Report for PCT International Application No. PCT/US2007/087616 (Feb. 4, 2011).
Non-Final Office Action for U.S. Appl. No. 11/931,279 (Nov. 26, 2010).
Non-Final Office Action for U.S. Appl. No. 11/175,991 (Oct. 18, 2010).
Notice of Allowance and Fee(s) Due for U.S. Appl. No. 11/931,421 (Aug. 13, 2010).
Notice of Allowance and Fee(s) Due for U.S. Appl. No. 11/931,485 (Jul. 26, 2010).
Non-Final Office Action for U.S. Appl. No. 11/931,135 (Jun. 25, 2010).
Final Office Action for U.S. Appl. No. 11/931,359 (Jun. 7, 2010).
Interview Summary for U.S. Appl. No. 11/931,421 (May 14, 2010).
Notice of Abandonment and Interview Summary for U.S. Appl. No. 11/745,888 (Apr. 28, 2010).
Final Office Action for U.S. Appl. No. 11/175,991 (Apr. 16, 2010).
Notice of Allowance and Fee(s) Due for U.S. Appl. No. 11/931,043 (Mar. 25, 2010).
Notice of Non-Compliant Amendment for U.S. Appl. No. 11/931,485 (Mar. 17, 2010).
Interview Summary for U.S. Appl. No. 11/931,359 (Mar. 2, 2010).
Communication Pursuant to Article 94(3) EPC for European Patent Application No. EP 05769220.4 (Feb. 26, 2010).
Nin-Final Office Action for U.S. Appl. No. 11/931,359 (Nov. 27, 2009).
Non-Final Office Action for U.S. Appl. No. 11/931,421 (Nov. 9, 2009).
Non-Final Office Action for U.S. Appl. No. 11/745,888 (Oct. 21, 2009).
Non-Final Office Action for U.S. Appl. No. 11/931,043 (Sep. 17, 2009).
Non-Final Office Action for U.S. Appl. No. 11/175,991 (Aug. 18, 2009).
Non-Final Office Action for U.S. Appl. No. 11/931,485 (Aug. 18, 2009).
Advisory Action for U.S. Appl. No. 11/175,991 (Jul. 6, 2009).
Interview Summary for U.S. Appl. No. 11/175,991 (Jun. 12, 2009).
Final Office Action for U.S. Appl. No. 11/175,991 (Apr. 14, 2009).
Interview Summary for U.S. Appl. No. 11/175,991 (Feb. 3, 2009).
Non-Final Office Action for U.S. Appl. No. 11/175,991 (Oct. 16, 2008).
Written Opinion of the International Searching Authority for PCT International Application No. PCT/US2007/087616 (May 1, 2008).
International Search Report for PCT International Application No. PCT/US2007/087616 (May 1, 2008).
Extended European Search Report for European Patent Application No. EP 05769220.4 (Oct. 2, 2007).
Notification of European Publication Number and Information on the Application of Article 67(3) EPC for European Patent Application No. EP 05769220.4 (Mar. 21, 2007).
International Preliminary Report on Patentability for PCT International Application No. PCT/US05/24105 (Jan. 9, 2007).
International Search Report for PCT International Application No. PCT/US05/24105 (Mar. 15, 2006).
Campbell et al., "Session Initiation Protocol (SIP) Extension for Instant Messaging," Network Working Group, RFC 3428 (Dec. 2002).
Rosenberg et al., "SIP: Session Initiation Protocol," Network Working Group, RFC 3261 (Jun. 2002).
Berners-Lee et al., "Uniform Resource Identifiers (URI): Generic Syntax," Network Working Group, RFC 2396 (Aug. 1998).
Leiba, "IMAP4 IDLE command," Network Working Group, RFC 2177 (Jun. 1997).

* cited by examiner

METHOD AND APPARATUS FOR LEVERAGING A STIMULUS/RESPONSE MODEL TO SEND INFORMATION THROUGH A FIREWALL VIA SIP AND FOR RECEIVING A RESPONSE THERETO VIA HTML

CROSS REFERENCE TO RELATED APPLICATIONS

This application is a divisional of U.S. patent application Ser. No. 11/745,888, filed 8 May 2007 now abandoned, which claims priority to U.S. provisional patent application Ser. No. 60/870,349, filed 15 Dec. 2006, and is a continuation-in-part of U.S. patent application Ser. No. 11/175,991, filed 5 Jul. 2005 now U.S. Pat. No. 7,975,011, which claims priority to U.S. provisional patent application Ser. No. 60/585,375, filed 2 Jul. 2004, each of which is incorporated herein in its entirety by this reference thereto.

BACKGROUND OF THE INVENTION

1. Technical Field

The invention relates to a communications architecture. More particularly, the invention relates to a method and apparatus for interfacing an IM network from a network IM client to a remote interface device.

2. Description of the Prior Art

In today's connected world, the telephone stubbornly remains a key mode of communications that is not connected to all the information one needs to simplify their life. How many times is it necessary to look up a number on a cell telephone or PC just to dial it from a home telephone? How many times is a call placed into voicemail only to find unimportant or previously heard messages? How many times is a time critical e-mail from a school, sports team, or other organization missed? How often is it desirable to know whether someone was available before they were called? And, how many times are individuals late for an appointment because they didn't look at their calendar or because of traffic problems? It would be advantageous to use the most familiar and ubiquitous communications appliance—the telephone—to tie all of this information together in a manner that is both effortless for the user and seamless with regard to integration into existing infrastructure.

SUMMARY OF THE INVENTION

The presently preferred embodiment comprises a method and apparatus that turns an existing communications device, such as the home telephone system into a platform for delivery of web based content and services. The preferred embodiment of the invention comprises a broadband enabled telephone system for the home and a series of web servers that collect, package, and deliver personalized content and services to all of the telephone handsets throughout the home. With this end-to-end solution, any information or services available via the web can be delivered through a broadband enabled telephone system. Through the web, each member of a family can build a profile which defines what information and services they want available through the handset. In addition, each handset can be dynamically personalized for any family member. The color screens on the handsets become windows through which an individual can view and interact with a broad range of content and services. The audio channels thus become an extension of the voice based services, such as messaging and voice chat.

Extending Communications Services

With the disclosed inventive method and apparatus, it is no longer necessary for one to be tethered to a PC to look up telephone numbers, do instant messaging, or access voice and e-mail inboxes. Complete communications services are brought to individuals on any handset in the house. With the invention, it is possible to see a personal or network-based phonebook or an up-to-the minute buddy list from a home telephone. In addition, not only is it possible to read IMs and e-mails, but an individual can also reply to messages using either text or voice. Additionally, every handset in the house becomes a presence-enabled terminal for peer-to-peer voice calls.

Broadcasting Content

One embodiment allows an individual to identify what information he wants to see and when he wants to see it. For example, the telephone can be set to wake the individual up and deliver the current weather forecast, traffic conditions or daily horoscope right to his bedside. In another example, the telephone can notify the individual of the winning lottery numbers as soon as the lottery drawing is complete. In a further example, the telephone can remind you that the individual to take the kids to practice in ten minutes. Thus, this embodiment of the invention provides a web portal for each family member in which information preferences and triggers can be individually designed. Another embodiment of the invention provides delivery of local directory search (LDS) results, along with related ads, coupons, or other promotional items. The invention also comprises servers that update and deliver appropriately formatted information right to the individual's handset, when it is needed or wanted.

Personalizing the Device

In another embodiment, a device such as the telephone is an extension of the individual's personality. Each member of the family can customize ring tones and screen wallpaper to reflect their favorite sports team, rock band, or even their mood. An individual can pick up any handset in the house, identify who it is, and the telephone dynamically adopts all the elements of the individual's personality.

Controlling the Device

In another embodiment, the individual can also put himself in control of such devices as his telephones. The individual can block calls to his children that come too late or block calls to the family that are missing caller ID. The individual can also decide where in the house calls should ring. Another embodiment of the invention also allows the individual to add additional digital telephone lines and numbers easily and without any additional wiring whether or not a VoIP service is currently in use.

Method and Apparatus for Interfacing an IM Network from a Network IM Client to a Remote Interface Device A presently preferred embodiment of the invention relates to a method and apparatus for interfacing an IM network from a network IM client to a remote interface device.

DETAILED DESCRIPTION OF THE INVENTION

Figure 1:
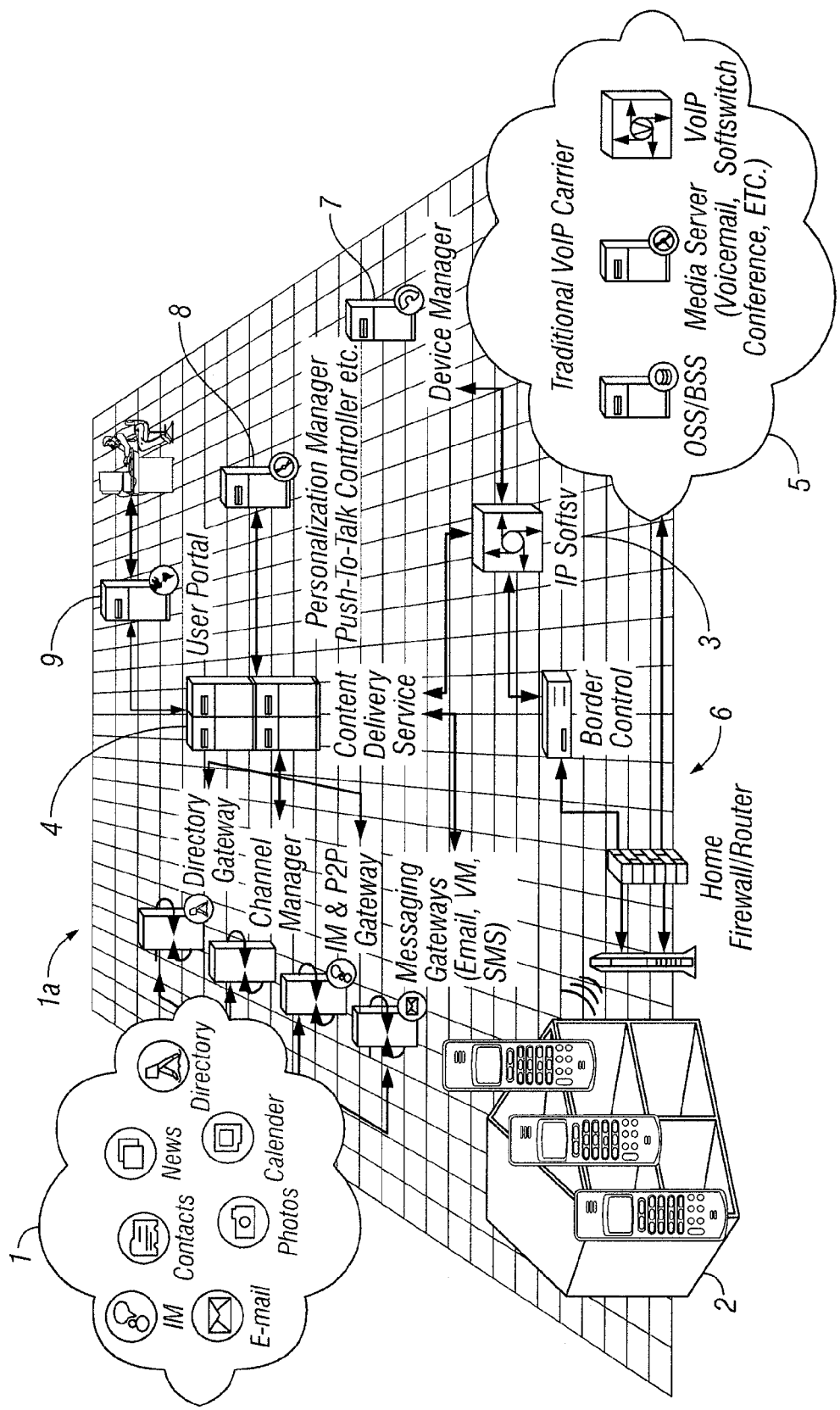
FIG. 1 is a functional block diagram showing a proxy-based communications architecture according to the invention.

A presently preferred embodiment of the invention relates to a method and apparatus for interfacing an IM network from a network IM client to a remote interface device.

A first embodiment of the invention provides a method and apparatus for using an existing device, such as a home telephone system, as a platform for delivery of Web-based content and services. A presently preferred embodiment of the invention comprises a broadband-enabled telephone system for the home and a series of Web service that collect, package, and deliver personalized content services to all of the telephone handsets throughout the home. While the discussion herein primarily addresses those embodiments of the invention that relate to home telephones, those skilled in the art will appreciate that the invention is readily practiced with any existing device that may be connected to an electronic network, such as cellular telephones, Bluetooth and other, e.g. 802.11, such wireless devices including, for example, printers, PDAs, and the like.

Another embodiment of the invention provides a proxy for translating standard Session Initiation Protocol (SIP; see, for example, RFC 3261) to multiple peer-to-peer (P2P) networks through network resources. This embodiment of the invention allows for access to multiple different P2P networks through a single telephone. This aspect of the invention provides a network-based, not client-based, solution. The invention uses standard SIP call handling for set up and tear down of media transmission.

Another embodiment of the invention provides a method for managing multiple endpoints through a single SIP user address and IP address. In this embodiment of the invention, a server is provided that acts as a proxy for multiple endpoints within a telephone system.

A further embodiment of the invention provides a method and apparatus for leveraging a stimulus/response model for sending network information through home firewalls via SIP, and for receiving responses thereto via HTML. This embodiment of the invention stimulates a network-based push using SIP messages with HTML addresses.

Another embodiment of the invention provides a method and apparatus for interfacing to an IM network through a network-based IM client and remote interface device. In this embodiment of the invention, the IM client is on the server. State in the system is maintained independent of the interface device. This embodiment of the invention uses event notification for synchronization. This allows multiple endpoints of presence independent of the IM network. Thus, multiple users can simultaneously access the same IM network from a single network interface device, such as a home telephone system base station.

Another embodiment of the invention provides a method and apparatus for delivering and tracking click-to-call information from PSTN and digital telephony networks. This embodiment of the invention provides a multi-modal interface for delivering local search information to a telephone handset. This embodiment allows tracking of calls initiated from a telephone handset and the placing of calls through a soft switch so that connectivity can be validated.

Another embodiment of the invention provides a method and apparatus for binding multiple user profiles and applications to a single telephone device through network control. This embodiment of the invention supports a variety of users at a single base station and applies a variety of personalities to any single telephone within the system. This invention is related to the IM presence embodiment of the invention discussed above.

A further embodiment of the invention provides for network configuration of calling and personalization of PSTN with network control. This embodiment of the invention routes calls to different handsets based on settings from the Web. Accordingly, the system can play ring tones based on calling information as configured by the Web. The system also allows users to download ring tones via the Web, and block calls by TOD and DOW. User actions on the handset, such as login, binds the handset to a profile data configured via the Web interface and maintained in a network database. Once this binding has occurred, the telephone system communicates with the network database to access user profile and to transfer any user-specific settings and resources. The user profile contains rules for handling incoming connections from other PSTN or VoIP endpoints. The telephone handset uses caller ID information and current environment, such as TOD, DOW, and user's presence, to determine whether and how the handset is to be alerted for the incoming connections.

A further embodiment of the invention provides a method and apparatus for navigating and accessing a network-based directory through a cordless telephone. In this embodiment of the invention a user may navigate through WML extensions and load AB as XML data. In this way the user may bring down pieces of the entire AB as needed.

The invention also provides a method and apparatus for bringing together multiple content and services from different sources to a single device via user selection. This aspect of the invention brings a variety of content to a single telephone device through selections via the Web.

The invention also provides a method and apparatus for storing network content in a bounded, demand-based cache storage in a network endpoint.

The invention further provides a method and apparatus for extending presence to communications devices connected to the PSTN network. In this embodiment of the invention, a single service keeps tracks of endpoint activity and reports activity to other devices registered to the service.

The invention also provides a loosely couple network for delivering and playing voice attachments from a media server to a VoIP client. This embodiment of the invention converts different protocols into the same VoIP codecs. Thus, this aspect of the invention provides the ability for a device to operate without having to support all encoding standards. In the preferred embodiment, standard SIP call handling is used for set up and tear down of media transmission.

The invention also provides a method and apparatus for using the Web to allow users to select a unique VoIP provider and then attach the provider to a generic VoIP hardware resource. In this embodiment of the invention, user may select a different VoIP provider from the network. The invention downloads protocol stacks as appropriate and the device phones home to register with generic network resource.

The invention also provides a system for SIP scalability and automatic signup. This embodiment of the invention provides dynamic DNS for updates and wizard entries. For example, a user's Mac address may be hashed in one embodiment and provided to the provisioner, which listens for registration requests. If a valid request is received, a dynamic DNS is assigned.

In contrast to known broadband and digital telephony services such as Vonage, Comcast, or P2P, the invention provides the user with access to applications that compliment telephony architecture. In the preferred embodiment, a thin framework is provided in a telephone device in the form of a small piece of software. The software operates in connection with the framework that provides a rendering engine for applications and services available through the network. This arrangement provides such elements as a security module that ties the system together using encryption keys and provides for initial device self registration. The invention provides for caching and content that manages information from the system, which is provided to the user handset. The information is stored in a content agnostic manner and is precached to a user base station in anticipation of user accounts. A preferred embodiment of the invention uses a XML format and templates.

The invention also provides personalization for such things as ring tones, wallpaper, and the like such that the user's home telephone experience is similar to that offered in a cell phone environment.

The invention provides call handling functionality similar to that of a PBX system. Thus, all typical functions such as ring tones and avatars for caller ID, call blocking and the like, are provided via a managed interface that is available on the network to the user.

In its broadest sense, the invention is a network offering that integrates and interacts with content and services on the network and provides this content and these services to devices via a proxy such that a many-to-many connection is established. A delivery engine accesses various applications or gateways such as IM, address book, content, and the like and provides these applications to a user portal and a media server, which are accessible from the user's handset via the software module mentioned above. A preferred embodiment of the invention uses an existing protocol such as SIP for session border control.

Discussion

The presently preferred embodiment of the invention comprises a proxy-based communications architecture which comprises a device-based thin client element and a server-based suite of applications. FIG. 1 is a functional block diagram showing a proxy-based communications architecture according to the invention.

The presently preferred embodiment of the invention comprises a method and apparatus that turns an existing device, such as the home telephone system, into a platform for delivery of web based content and services. The preferred embodiment of the invention comprises a broadband enabled telephone system for the home and a series of web servers that collect, package, and deliver personalized content and services to all of the telephone handsets throughout the home. With this end-to-end solution, any information or services available via the web can be delivered through a broadband enabled telephone system. Through the web, each member of a family can build a profile which defines what information and services they want available through the handset. In addition, each handset can be dynamically personalized for any family member. The color screens on the handsets become windows through which an individual can view and interact with a broad range of content and services. The audio channels thus become an extension of the voice based services, such as messaging and voice chat.

In FIG. 1, several content-based services 1, including IM, contacts, news, e-mail, photos, calendar, and directory, for example, are available to a content delivery service 4, via various related gateways 1a, i.e. a directory gateway, channel manager, IM and P2P gateway, and messaging gateways for such services as e-mail, voice mail, and SMS. In the preferred embodiment, the system is content agnostic. content may be accessed from the source via the content delivery service, or it may be precached at the content delivery service or at the user location in anticipation of user access. Standard techniques, such as XML and the like population of templates may used for content delivery to the end user.

The content delivery service is also in communication with a user portal 9 by which a user may access the overall system, and a personalization manager 8, which provides personalization for end user, for example providing a push-to-talk controller. The content delivery service provides content to end user via an P based soft serve switch 3 which is managed by a device manager 7 and which provides content and service to end user device 2, via a border control mechanism and a home firewall/router 6. The firewall/router also provides connectivity for the end user to VoIP carrier services 5, such as OSS/BSS, a media server for such services as voicemail and conferencing, and a VoIP soft switch. Standard telephone services (not shown) are also provided to the user device via the home firewall/router.

For purposes of the discussion herein, two elements of the above described architecture are considered in greater detail, i.e. the content delivery service, also referred to as a server, and the combination of the home firewall/router and end user devices, also referred to collectively as the client. The discussion herein also includes other elements of the architecture, although the interaction of these two elements is considered to be of greatest importance in understanding the invention.

Some advantages of the invention include:

Extending Communications Services

With the disclosed inventive method and apparatus, it is no longer necessary for one to be tethered to a PC to look up telephone numbers, do instant messaging, or access voice and e-mail inboxes. Complete communications services are brought to individuals on any handset in the house. With the invention, it is possible to see a personal or network-based phonebook or an up-to-the minute buddy list from a home telephone. In addition, not only is it possible to read IMs and e-mails, but an individual can also reply to messages using either text or voice. Additionally, every handset in the house becomes a presence-enabled terminal for peer-to-peer voice calls.

Broadcasting Content

One embodiment of the invention allows an individual to identify what information he wants to see and when he wants to see it. For example, the telephone can be set to wake the individual up and deliver the current weather forecast, traffic conditions or daily horoscope right to his bedside. In another example, the telephone can notify the individual of the winning lottery numbers as soon as the lottery drawing is complete. In a further example, the telephone can remind you that the individual to take the kids to practice in ten minutes. Thus, this embodiment of the invention provides a web portal for each family member in which information preferences and triggers can be individually designed. Another embodiment of the invention provides delivery of local directory search (LDS) results, along with related ads, coupons, or other promotional items. The invention also comprises servers that update and deliver appropriately formatted information right to the individual's handset, when it is needed or wanted.

Personalizing the Device

In another embodiment of the invention, a device such as the telephone is an extension of the individual's personality. Each member of the family can customize ring tones and screen wallpaper to reflect their favorite sports team, rock band, or even their mood. An individual can pick up any handset in the house, identify who it is, and the telephone dynamically adopts all the elements of the individual's personality.

Controlling the Device

In another embodiment of the invention, the individual can also put himself in control of such devices as his telephones. The individual can block calls to his children that come too late or block calls to the family that are missing caller ID. The individual can also decide where in the house calls should ring. Another embodiment of the invention also allows the individual to add additional digital telephone lines and numbers easily and without any additional wiring whether or not a VoIP service is currently in use.

The client in FIG. 1 is shown to include both the home firewall/router and the user devices. Typically, the user devices comprise handsets, printers, PDAs, and the like, and are communicatively coupled to the home firewall/router via a wireless transport mechanism, such as Bluetooth, 802.11, or the like. The home firewall/router (not limited to home applications) includes such elements as a security module that user encrypted keys for such activities as initial device registration to the system; caching and content facilities for managing information flow from the server, i.e. the content delivery service, to the user device; personalization modules for enabling such user selected features as ring tones, wallpaper, and the like; and call handling modules which provide functionality for the user that is similar to that of a PBX system.

The user devices incorporate a device-based thin client that provides, inter alia, the following:

Easily-integrated client services

Authentication with servers

Managed push/pull of browser content

Flexible cache of frequently accessed content

Integration with telephone system telephony functions, e.g. caller ID, custom ring tones).

Client Architecture

Figure 2:
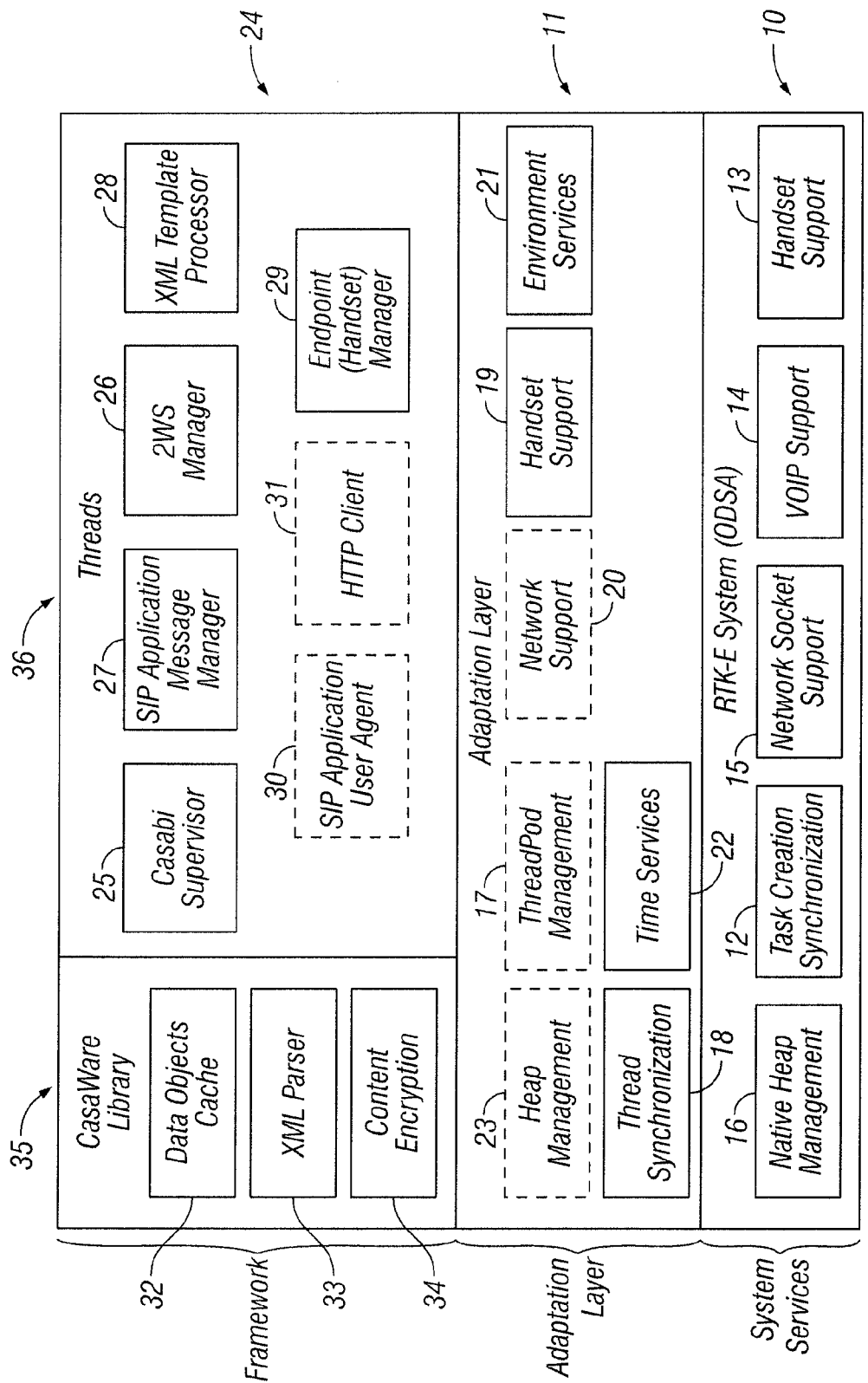
FIG. 2 is a functional block diagram showing the client architecture in a proxy-based communications architecture according to the invention.

FIG. 2 is a functional block diagram showing the client architecture a proxy-based communications architecture according to the invention. The client comprises, inter alia, an underlying system services layer 10 which is comprised of components that include modules for:

Task creation and synchronization support 12;

Providing support for controlling/monitoring handsets 14;

Providing SIP, RTP and CODEC support 14;

Generating WML content from XML data and templates 15;

Providing an interface to system information (not shown); and

Flexible heap management for applications 16.

The underlying system adaptation layer 11 is comprised of components that include modules for providing a common API layer between native services and the system, as follows:

Managing fixed tasks in a flexible thread pool 17;
Providing messaging, timer, mutual exclusion support 18;
Providing interface to handset controls, events, and browser 19;
Providing SIP UA, HTTP Client, DNS, and/or socket APIs 20;
System environment and status information 21;
Access to network time, locale, and system tick counter 22; and
Access to system-level or private heap storage 23.

The underlying system framework layer 24 is comprised of threads 36 that include modules for:

Supervising all other threads 25;
Communicating with the system server (2WS) for content 26;
Managing Application SIP UA connections to 2WS 27;
Generating WML content from XML data and templates 28;
Managing interactions with handset devices 29;
Managing an application SIP UA Socket 30; and
HTTP Client for content GET and POST actions 31.

Other system components include a library 35 containing modules for:

Managing cache of system content objects 32;
Parsing XML Content and Control Data from 2WS 33; and
Providing for encrypted authentication and content 34.

Figure 3:
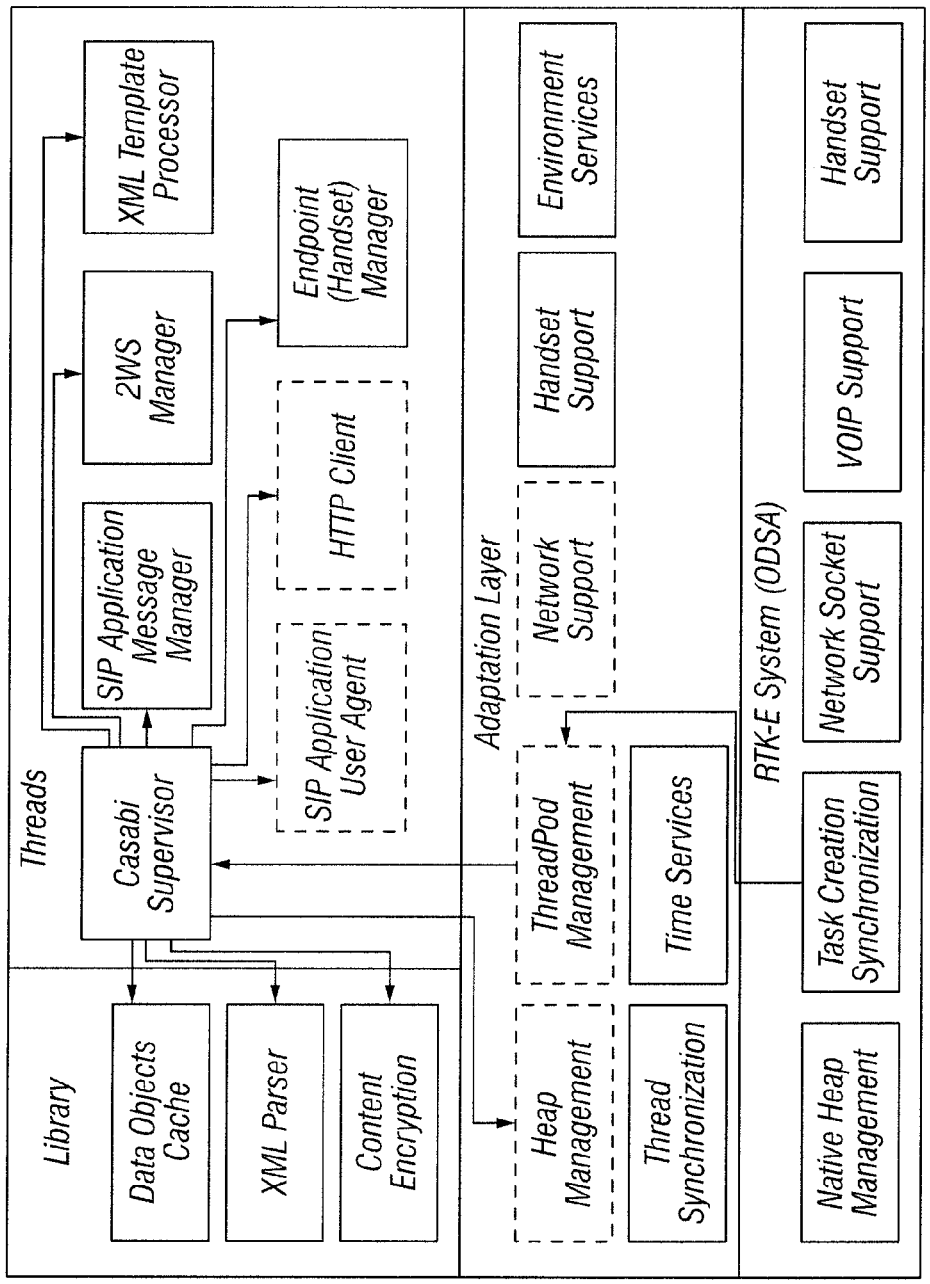
FIG. 3 is a functional block diagram showing a startup sequence for proxy-based communications architecture according to the invention.

FIG. 3 is a functional block diagram showing a startup sequence for proxy-based communications architecture according to the invention. In this phase of system operation, the arrows shown on FIG. 3 indicate the steps by which:

Step 1: A supervisor thread starts;
Step 2: Component initialization; and
Step 3: System threads are started.

Figure 4:
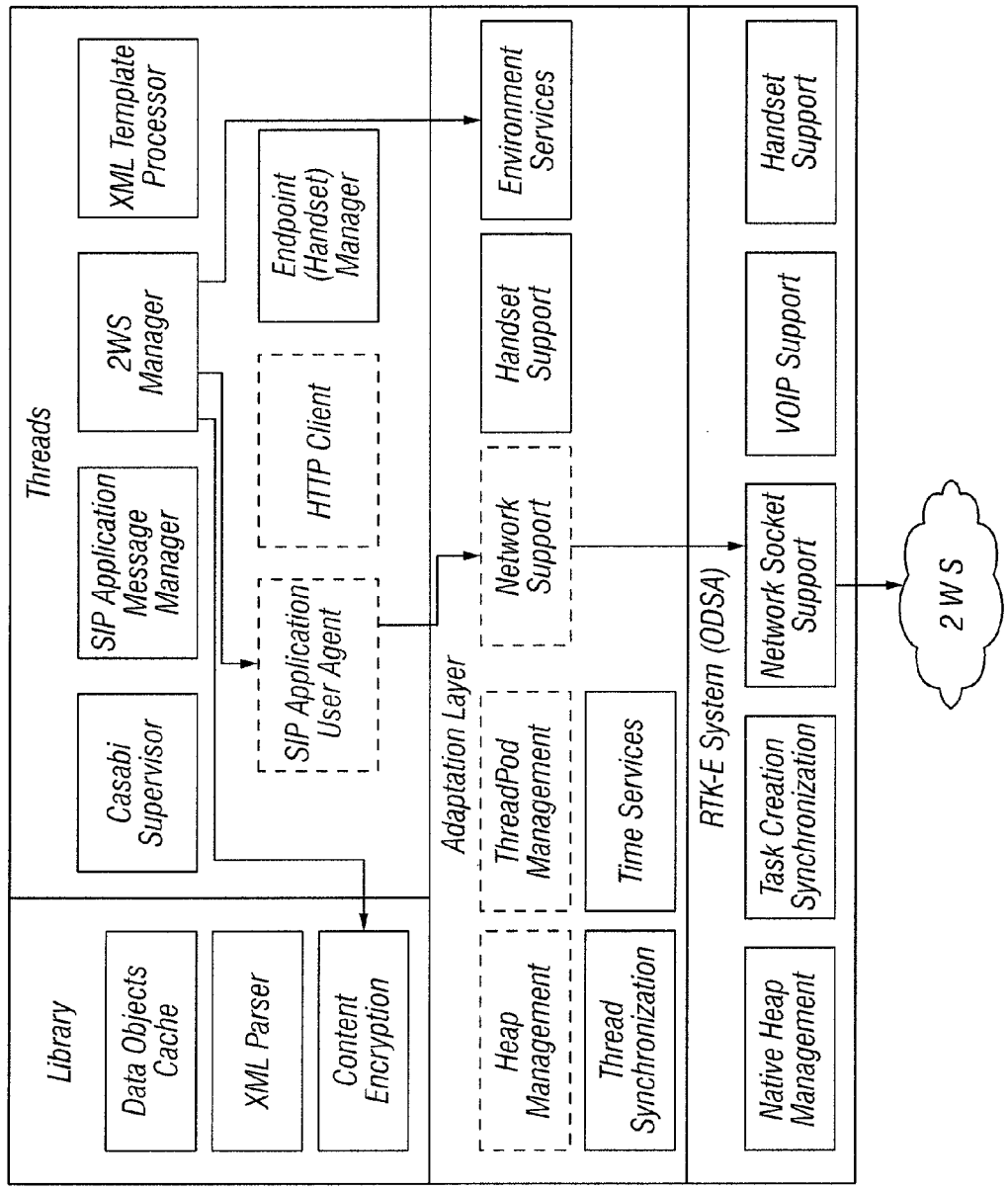
FIG. 4 is a functional block diagram showing an authentication with server sequence for proxy-based communications architecture according to the invention.

FIG. 4 is a functional block diagram showing an authentication with server sequence for proxy-based communications architecture according to the invention. In this phase of system operation, the arrows shown on FIG. 4 indicate the steps by which:

Step 1: Obtain system and user profile;
Step 2: Obtain encrypted hash; and
Step 3: Authenticate with Server.

Figure 5:
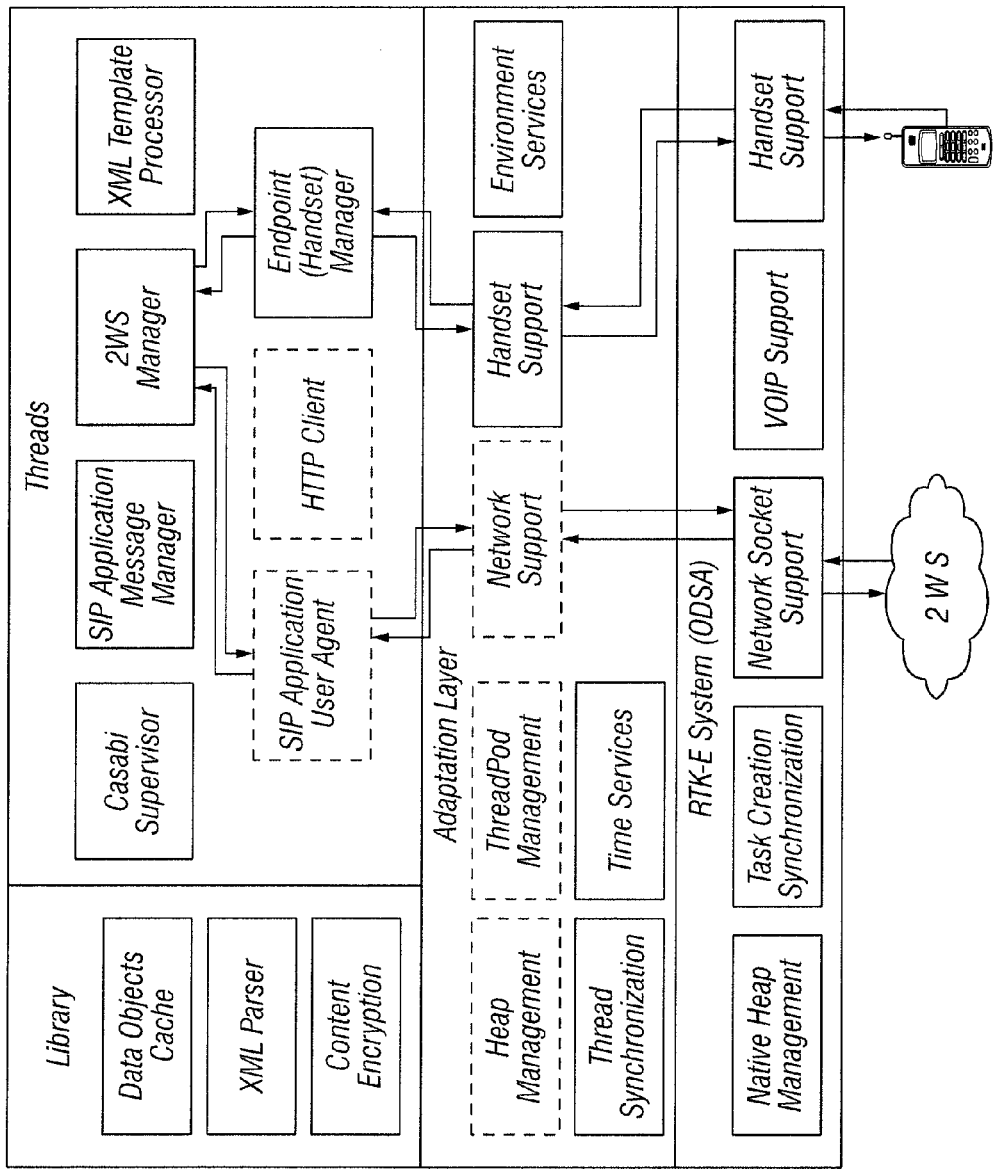
FIG. 5 is a functional block diagram showing an authentication with server sequence for proxy-based communications architecture according to the invention.

FIG. 5 is a functional block diagram showing an authentication with server sequence for proxy-based communications architecture according to the invention. In this phase of system operation, the arrows shown on FIG. 5 indicate the steps by which:

Step 1: Notify 2WS; and
Step 2: Respond with first deck.

Figure 6:
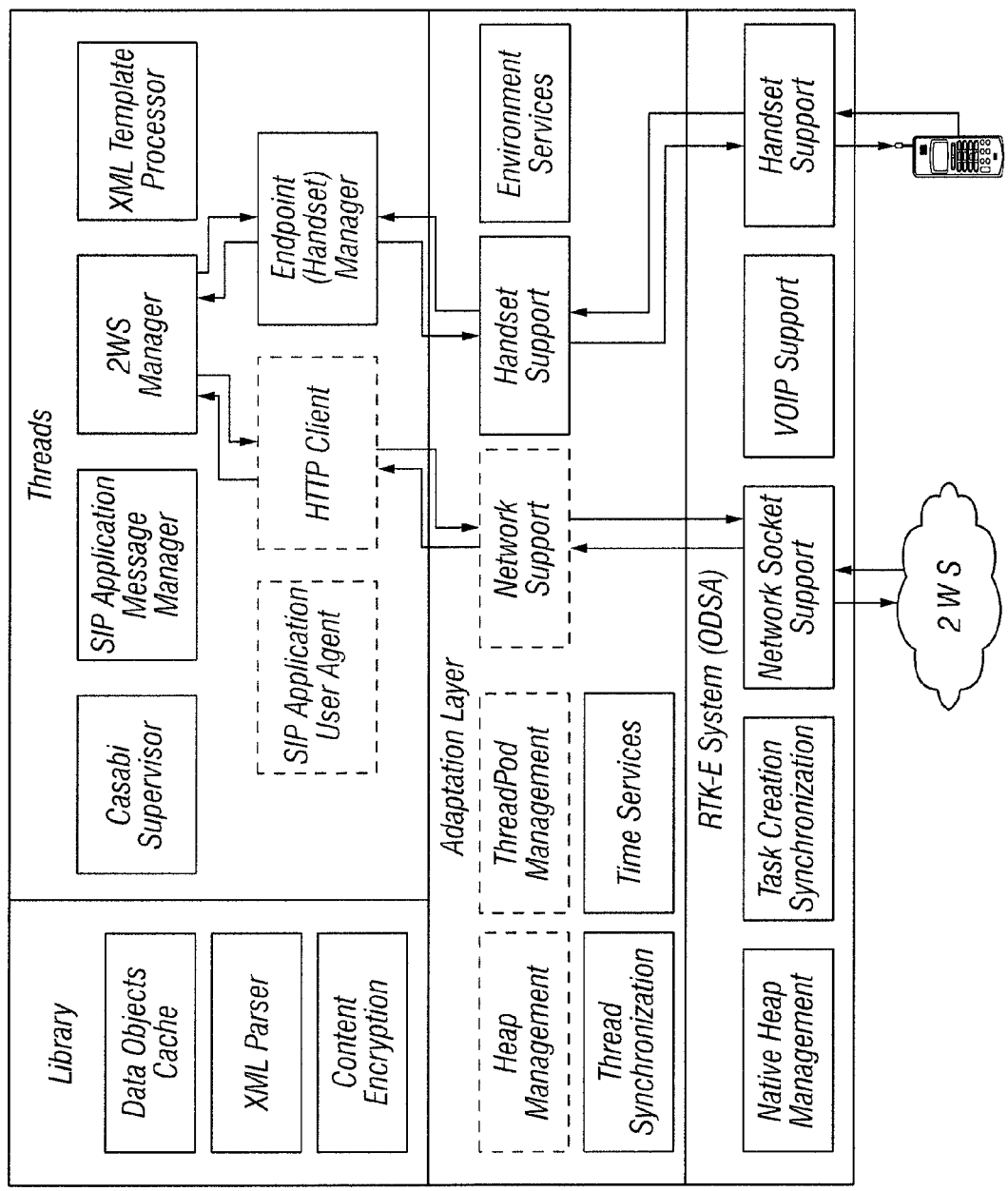
FIG. 6 is a functional block diagram showing a requesting content sequence for proxy-based communications architecture according to the invention.

FIG. 6 is a functional block diagram showing a requesting content sequence for proxy-based communications architecture according to the invention. In this phase of system operation, the arrows shown on FIG. 6 indicate the steps by which:

Step 1: Browser issues URI; and
Step 2: 2WS Responds via HTTP.

Figure 7:
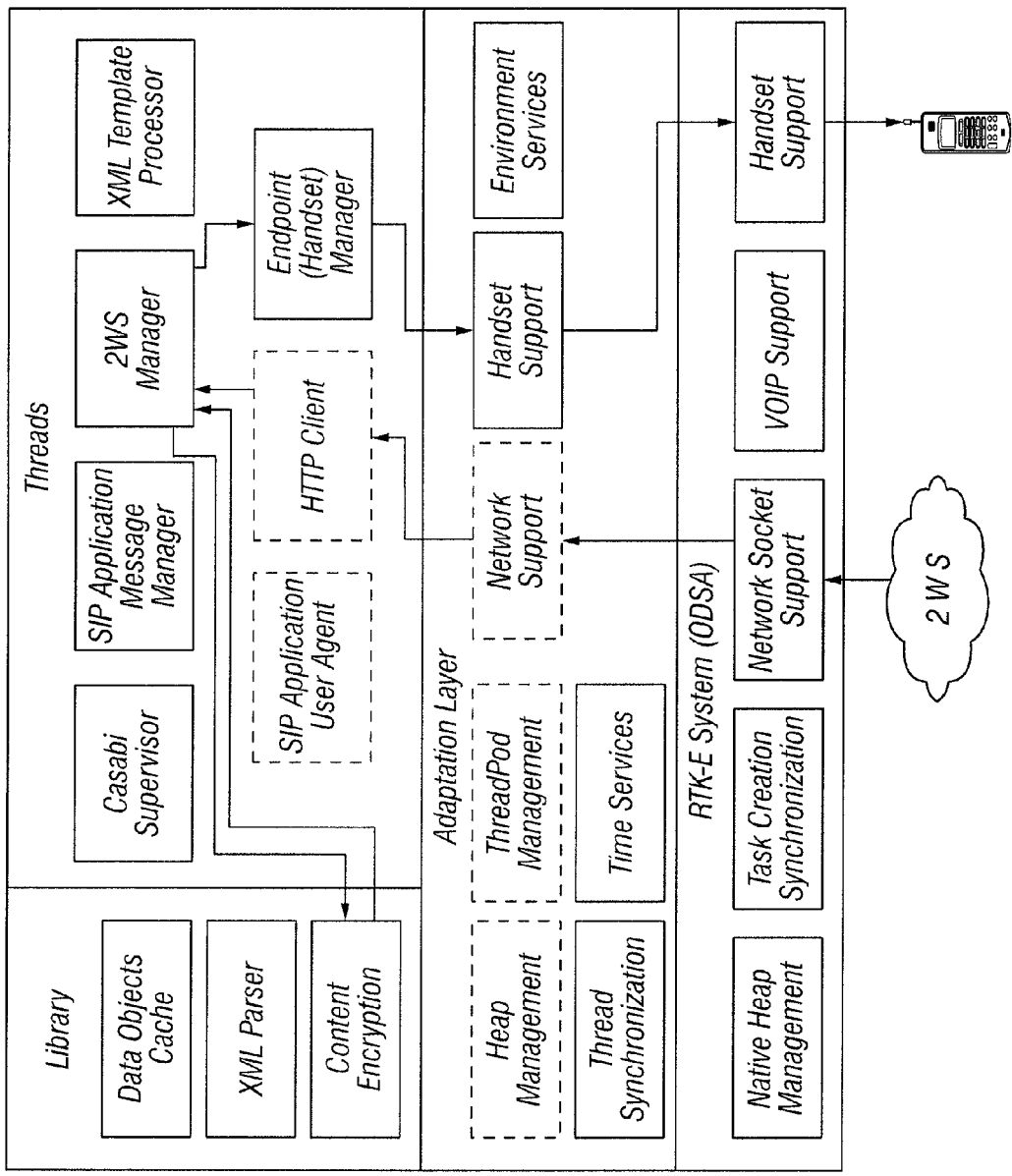
FIG. 7 is a functional block diagram showing a handling sensitive content sequence for proxy-based communications architecture according to the invention.

FIG. 7 is a functional block diagram showing a handling sensitive content sequence for proxy-based communications architecture according to the invention. In this phase of system operation, the arrows shown on FIG. 7 indicate the steps by which:

Step 1: Encrypted content received;
Step 2: Decryption step; and
Step 3: Deliver content to browser.

Figure 8:
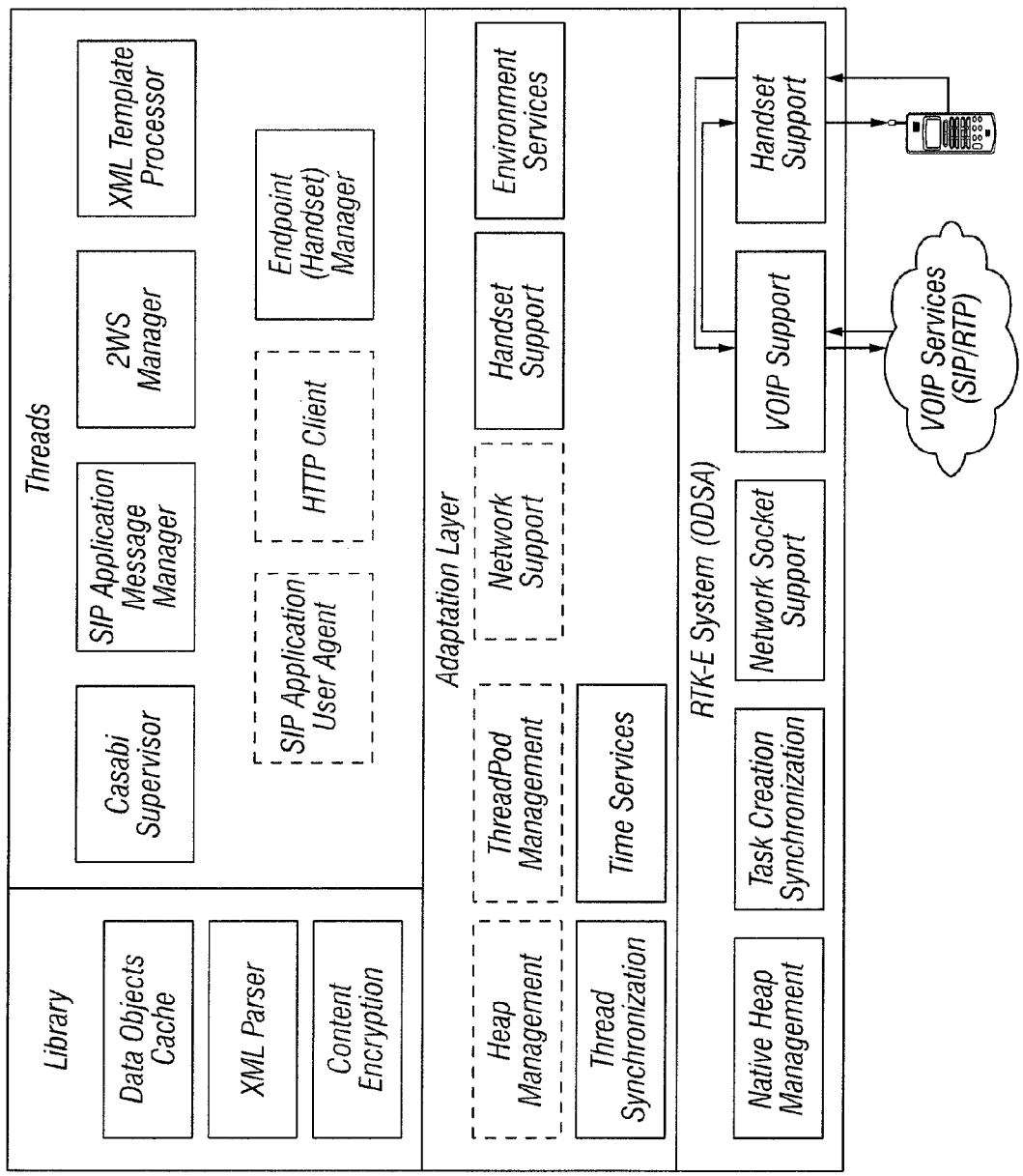
FIG. 8 is a functional block diagram showing a VOIP outcall via browser sequence for proxy-based communications architecture according to the invention.

FIG. 8 is a functional block diagram showing a VOIP outcall via browser sequence for proxy-based communications architecture according to the invention. In this phase of system operation, the arrows shown on FIG. 8 indicate the steps by which:

Step 1: SIP URI Routed to VOIP Services; and
Step 2: Call established w/o system.

Figure 9:
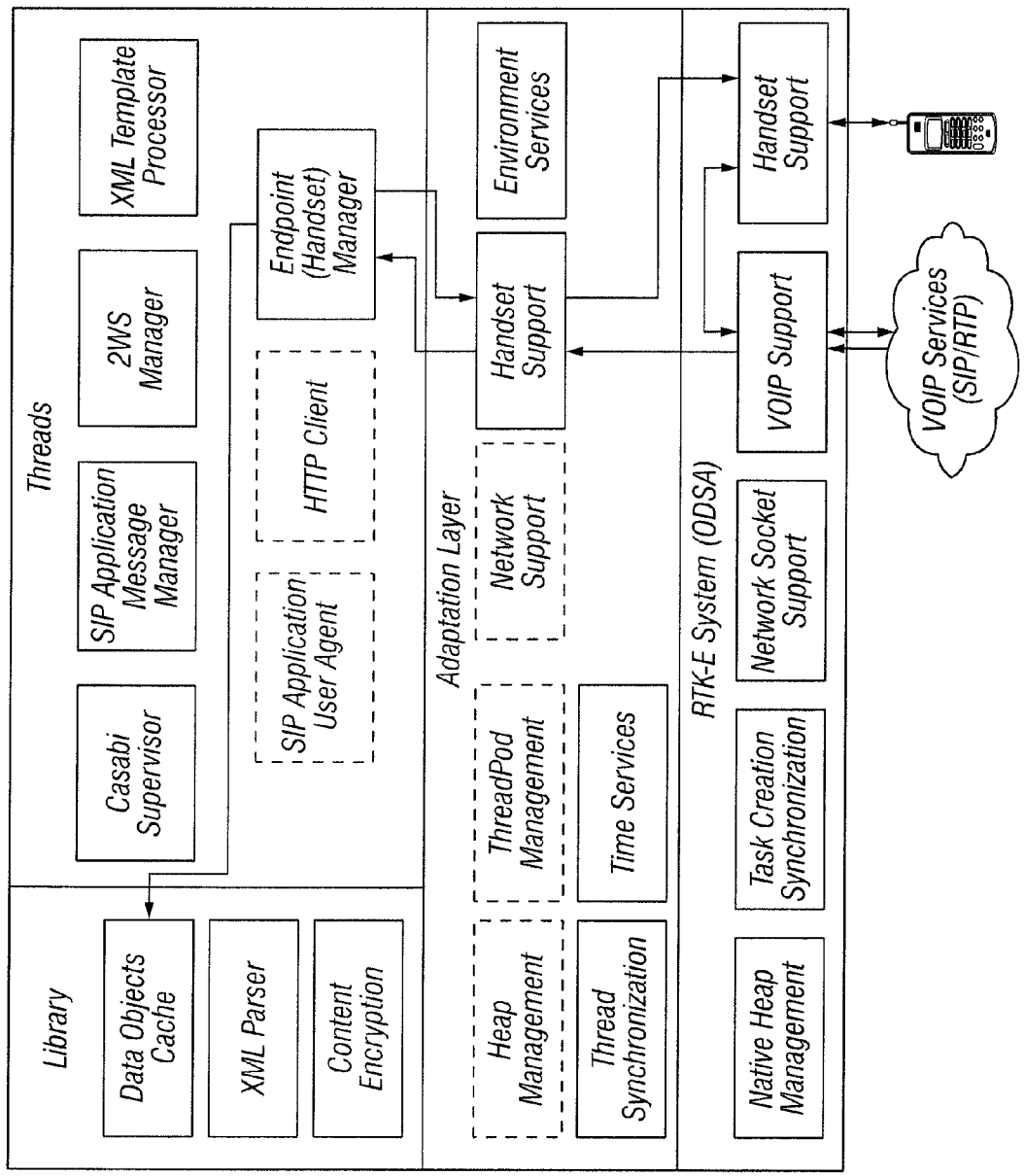
FIG. 9 is a functional block diagram showing a VOIP in-call with ring tone sequence for proxy-based communications architecture according to the invention.

FIG. 9 is a functional block diagram showing a VOIP in-call with ring tone sequence for proxy-based communications architecture according to the invention. In this phase of system operation, the arrows shown on FIG. 9 indicate the steps by which:

Step 1: In call notification sent to system;
Step 2: Ring tone located and played; and
Step 3: Call answered.

System Framework API

Threading Support API functions 12 (FIG. 2) include:

QfwCreateThread—Creates a new thread of execution
QfwSendThreadMessage—Sends an arbitrary message to a thread
QfwWaitForThreadMessage—Receives messages w/timeout
QfwSuspendThread—Pauses thread execution
QfwResumeThread—Resumes thread execution
QfwWaitForMutex—Waits on a mutex object
QfwReleaseMutex—Releases a mutex object
QfwEnterCriticalSection—Enters a critical section of code
QfwLeaveCriticalSection—Leaves a critical section of code
Plus additional thread support functions Telephone System Support API functions 13, 14 (FIG. 2) include:

QfwGetStatus—Determine status of handsets
QfwSendDisplayData—Sends data to handset browser
QfwSetDataEventCallback—Creates callback for browser events
QfwGetResourceList—Obtain handset resources (ring tones, tones)
QfwSetResource—Creates a new resource (ring tone)
QfwDeleteResource—Removes a resource (ring tone)
QfwPlayResource—Plays a handset resource (ring tone, tone)
QfwMakePSTNCall—Initiates a PSTN call
QfwMakeVOIPCall—Initiates a VOIP call
QfwSetCallProgressCallback—Creates callback for call progress events
QfwSetHandsetEventCallback—Creates callback for handset events (on/off hook, non-browser key press)

Network Socket and DNS support 15 (FIG. 2) includes:

Socket support required if SIP interface or HTTP client not provided in adaptation
socket—Creates a socket
bind—Binds a socket to local address
connect—Connects a socket to a network address
send, send to—Sends data via a socket
recv, recvfrom—Receives data from a socket
gethostbyname—Resolves a host name
Socket support must include TCP and UDP sockets. Only blocking calls are used.

Native Heap Management support 16 (FIG. 2) includes:

Allows system to use a separate heap space to prevent memory exhaustion in other subsystems
QfwMalloc—Allocates heap
QfwFree—Releases heap
QfwCalloc—Allocates and clears structures
QfwRealloc—Reallocates an existing allocated block
QfwStrdup—Duplicates a null-terminated string System Environment support includes:
Used to obtain static and dynamic information regarding the telephone system
QfwGetParameter—Obtain (relatively) static information regarding system
Hardware: Model numbers, hardware/firmware revisions, memory capacity
Network: MAC address, local IP address, SIP and 2WS server information
QfwGetStatus—Obtain dynamic status of system components
ODSA Status
Network Connectivity Status
Handset status
System Time (SNTP) and Tick Support—Usually supported natively by ODSA Web Service High Level Architecture For the purposes of the following discussion, a telephone system is configured as one base and one or more handsets, wi-fi handsets, or other devices. All interactions with the telephone system imply that the base acts as a proxy for the handsets. Also implied are the SIP entities, e.g. Proxies, Session Border Controllers, etc, that are required for SIP messages to be sent to and from a SIP end point. The term service provider is used in herein to indicate any vendor that provides the needed services. However, for the example herein, the service provider is a third party provider. Those skilled in the art will appreciate that the invention can be practiced with any service provider.

Figure 10:
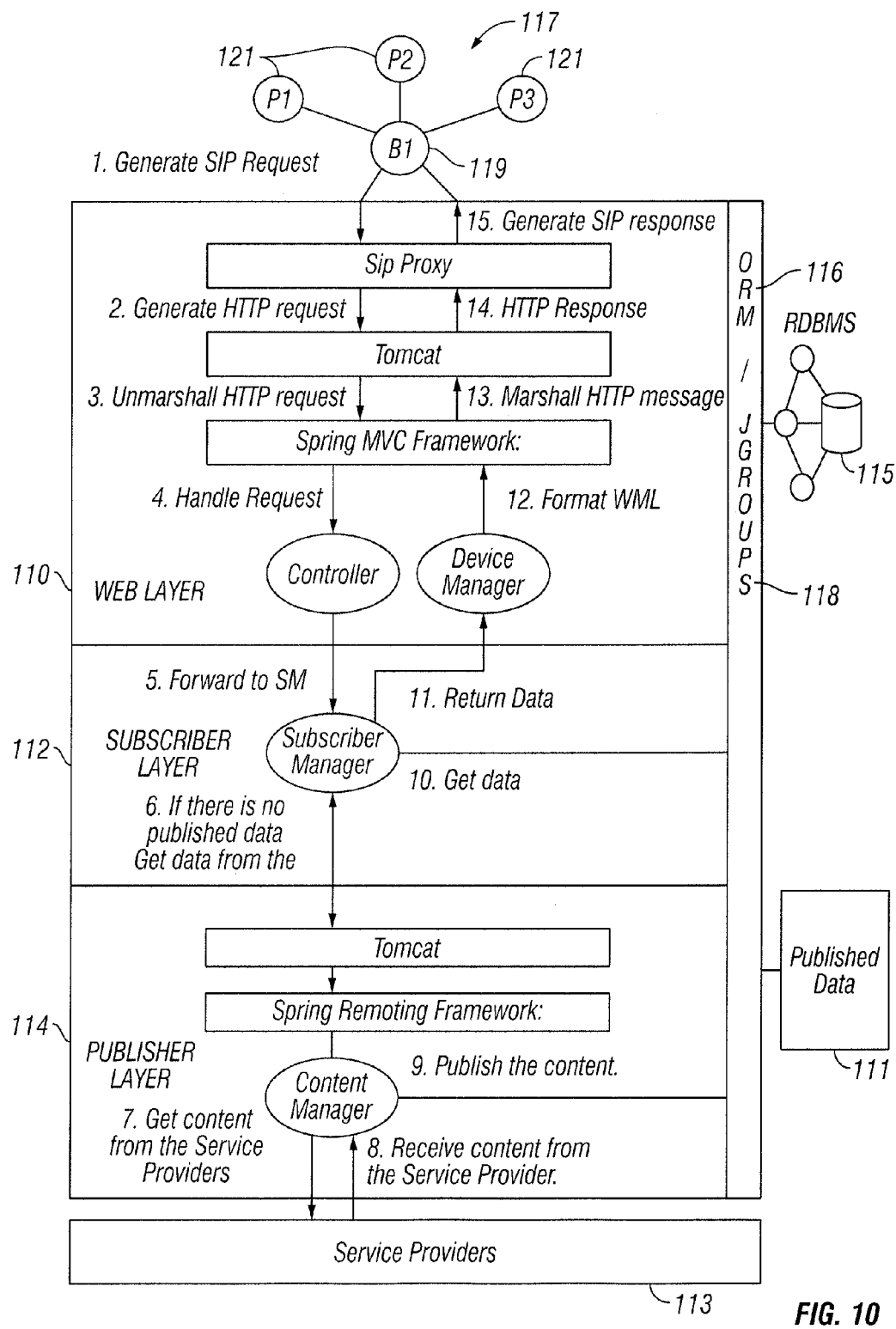
FIG. 10 is a block schematic diagram showing an architecture comprising a web service instance according to the invention.

FIG. 10 is a block schematic diagram showing an architecture comprising a web service instance (2WS). The instance shown in FIG. 10 is a multi-layered system that provides heterogeneous services to its clients. In this sense, a 2WS functions as a portal providing a single access point for many different services, such as Email, Voice Mail, Internet Messaging, Address Book, Local Search, etc. All the interactions in the following discussion of FIG. 10 and the web service high level architecture shown therein are based on the following:

2WS web layer 110—this layer handles all incoming requests from a client, marshals and un-marshals the request, performs access control and forwards the request to appropriate controllers that handle it.

2WS business/subscriber layer 112—this layer consumes the published data 11 from the publishers, e.g. content managers/gateways, email manager/gateways, IM managers/gateways, etc, and personalizes it for the users.

2WS publisher layer 114—this layer interacts with service providers 113 and retrieves content from them. This content can be, for example, email, weather, sports, address books, instant message groups, etc. The content is then published in well known repositories: It may be in the database 115 or in shared memory, e.g. using Java Spaces. Once the data is published, interested parties are notified, either by the publisher or the owner of the published data, e.g. Java Spaces.

DB Layer 116—This is the database persistence layer and it is where Object Relational Mapping takes place. The ORM engine in the presently preferred embodiment is Hibernate.

Figure 11:
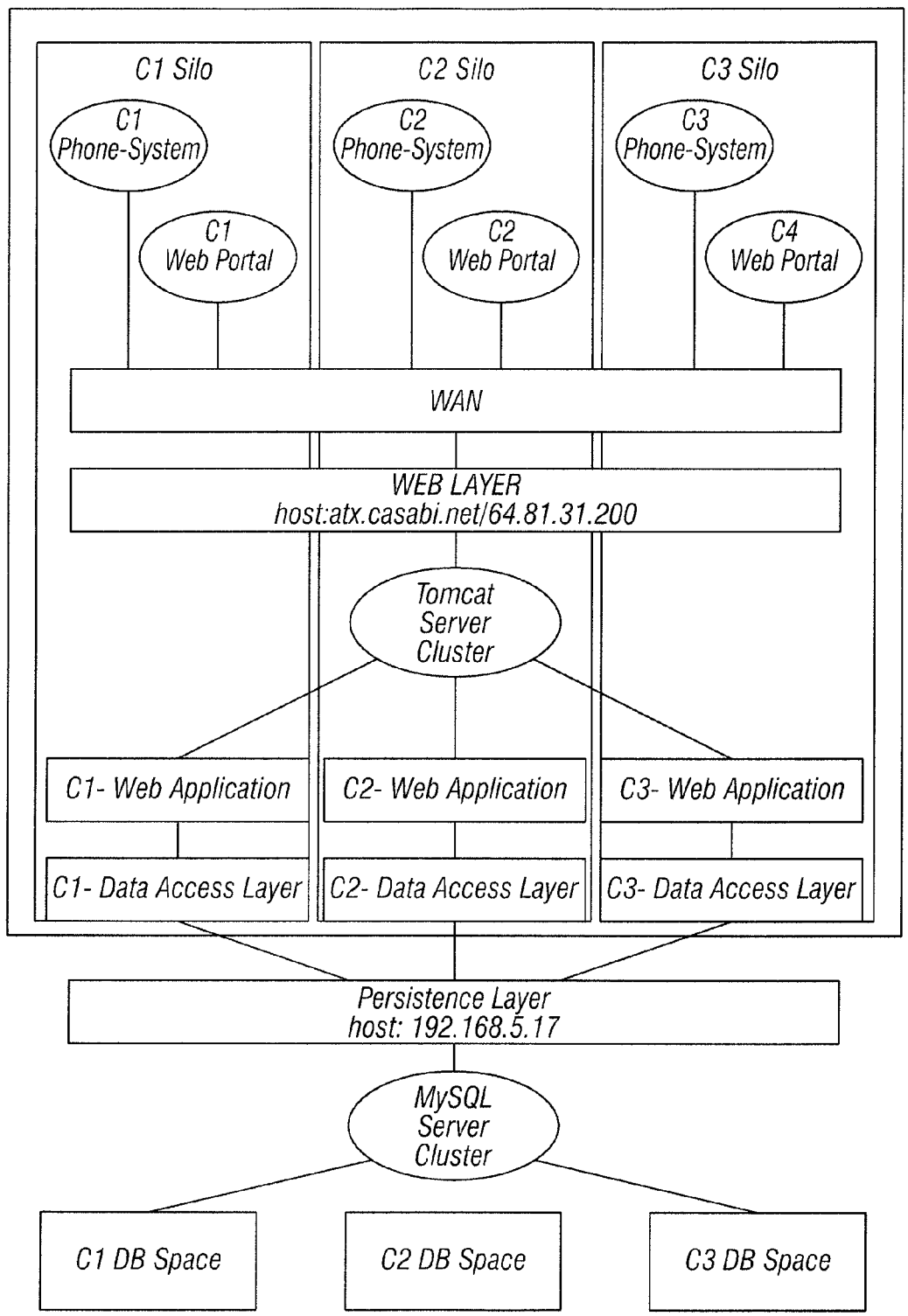
FIG. 11 is a block schematic diagram that illustrates how the 2WS architecture effectively creates silos for each web application according to the invention.

JGroups 118—This is a toolkit for multicast communication. In the inventive service, it is used for inter-process communication across LAN or WAN boundaries. This mechanism is not usually bundled with the database Layer. In FIG. 11 its inclusion in the same space as the database layer only indicates that it is accessible to all processes.

Multi-Tenancy in the 2WS

The following discussion addresses the inherent capabilities for multi-tenancy designed into the 2WS architecture. With regard to multi-tenancy, this means that any carrier, telephone vendor, or any other user can and will have a particular web application serving them. Each particular web application has its own context, including a persistent storage which is separate from every other web application. Multi-tenancy does not impact database clustering or server side load balancing. In fact, clustering or load balancing occurs at the web and persistent layers, and is a over-arching context within which all web applications run.

Figure 12:
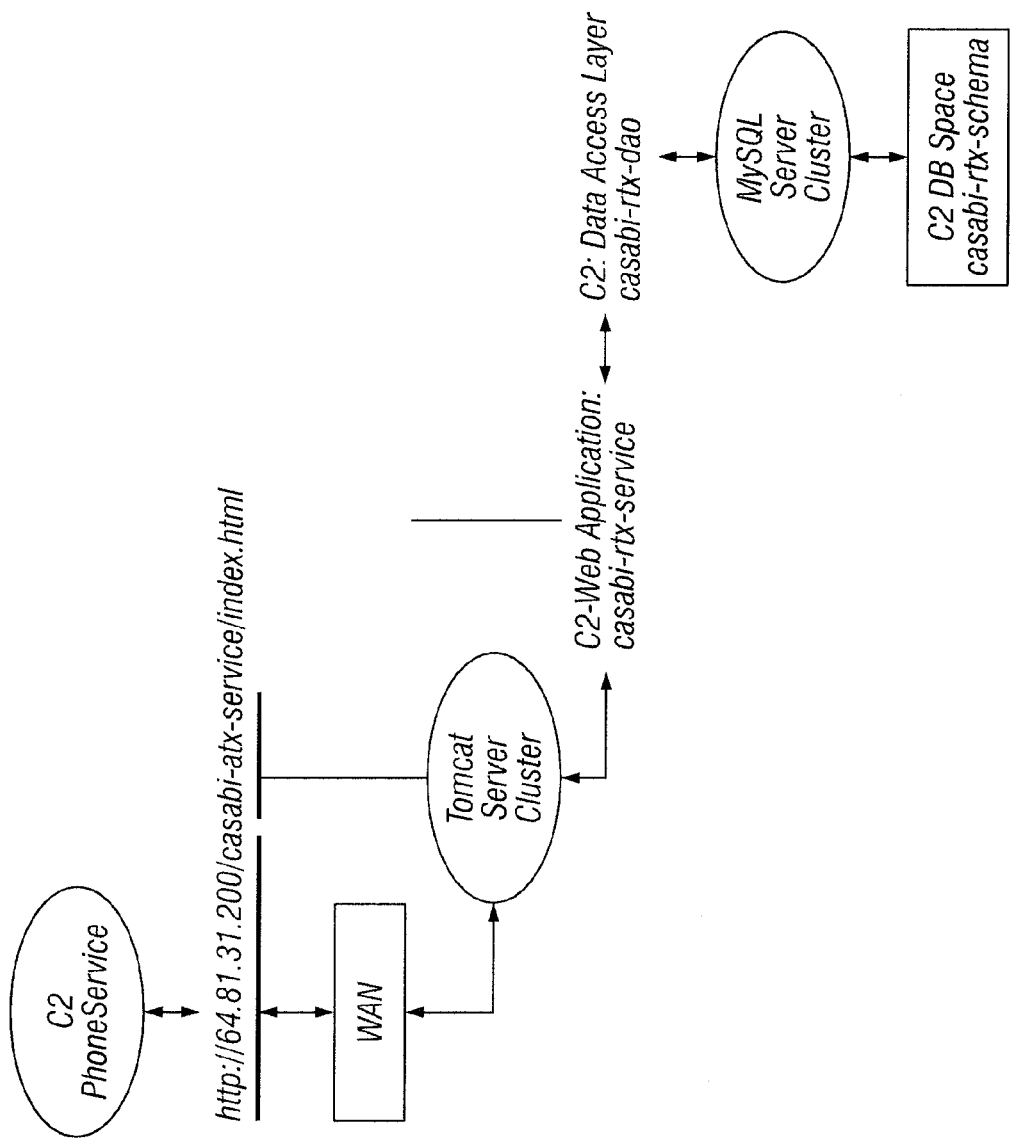
FIG. 12 is a block schematic diagram showing a WEB Portal URL Audit trail according to the invention.
Figure 13:
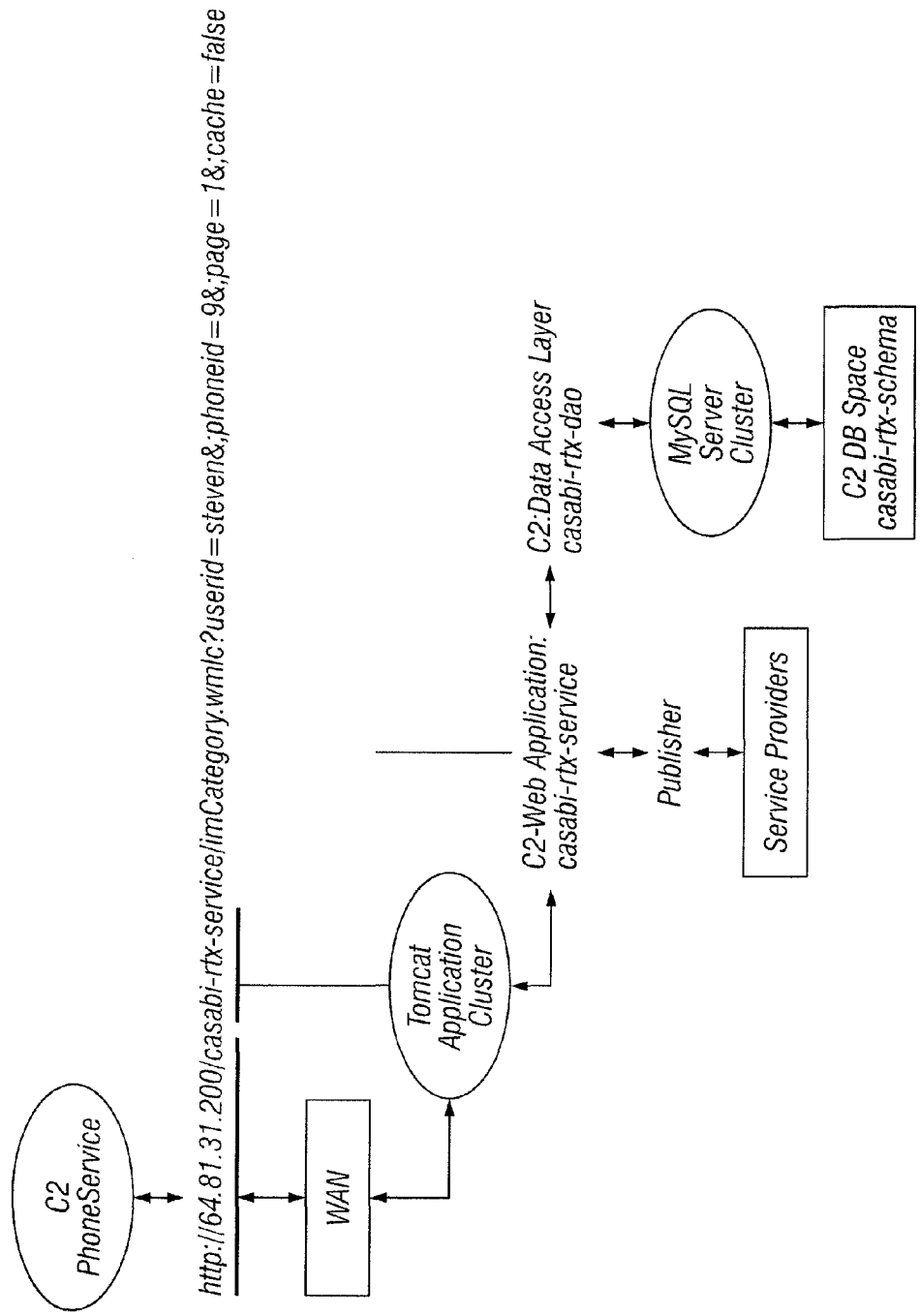
FIG. 13 is a block schematic diagram showing a Telephone-System URL Audit Trail according to the invention.

FIG. 11 illustrates how the 2WS architecture discussed above effectively creates silos for each web application. FIGS. 12 and 13 provide URL audit trails to indicate how a user request is dispatched to the appropriate application context. FIG. 11 indicates that the tomcat clusters and applications are on one machine. However, the database cluster is preferably on another machine. This does not impact the notion of the Silo, however, because each application has a data access layer that interacts only with the data source that is bound to it. The URI provided in FIGS. 11-13 is for clarity only. In a deployment scenario, the URI would not contain a raw IP address, such as 64.81.31.200, but would have a DNS resolvable authority, such as: atx-telephone-service; or atx-web-service; and so on.

Request Processing

The following discussion describes how URLs from the telephone or from a web portal are processed. As each element of the URL is consumed, it forms a trail. Following this trail demonstrates how each request is serviced by the appropriate web application. URLs are formatted according to RFC 2396' declaration for an absolute URI. The notion of a common DB API serving up result sets to various applications does not exist in this model. Each application has a data access object (DAO) which accesses data on behalf of the application. The DAO is bound to a single database space and no other. Each application has a direct line through its DAO to its data source. This methodology promotes the Silo effect, which reduces the possibility for data cross-pollination to near zero.

WEB Portal URL Audit Trail

URL: http://64.81.31.200/casabi-atx-service/index.html

First, the request is sent to the wide area network (WAN) which uses the scheme http: and the authority 64.81.31.200 to resolve the IP address and route the request to the appropriate host (see FIG. 12). Once the host gets the request, it is passed to the service that is listening for that request on a particular port. In this case, it is an HTTP request, so the port is 80 and the service is Tomcat. Once Tomcat gets the request, it process the path element which contains both the application that handles the request and a query string containing any parameters needed to process the request. Once the web application gets the request, it processes it appropriately. In this case, the request is to serve up the index or initial web page for the Portal. To do this, the web application must access the database to retrieve the appropriate user profile, channel data, and other properties used to form a users profile. Once the appropriate data values are retrieved, the web application formats them and sends them back to the requester, in this case an AT&T user accessing the portal.

Telephone-System URL Audit Trail

URL: http://64.81.31.200/casabi-rtx-service/imCategory.wmlc?userid=steven&;phoneid=9&;page=1&; cache=false First, the request is sent to the wide area network (WAN) which uses the scheme http: and the authority 64.81.31.200 to resolve the IP address and route the request to the appropriate host. Once the host gets the request, it is passed to the service that is listening for that request on a particular port. In this case it is an HTTP request, so the port is 80 and the service is Tomcat. Once Tomcat gets the request, it process the path element of the URL to forward the request to the appropriate application context. Once the web application gets the request, it processes it appropriately. In this case, the request is to serve up the IM Buddy list. The web application goes to the database to the user profile for the current user ID. It then forwards the IM Buddy List request to the publisher for this user. The publisher logs in on behalf of the user, gets the IM Buddy list, and returns it to the web application. The web application formats the data for the particular telephone and sends the IM Buddy list back to the request originator.

Every tenant in the 2WS is associated with a single application context that is unique for that tenant. This includes the name of the application, its deployed directory, its data source, and any other resources that it uses. By having a close association between the tenant and an application context, in fact they are virtually the same thing, the walls between tenants become non-permeable and secure. This creates a Silo effect. Each carrier feels that they are the sole users of a system, which gives them unique resources and branding to create product value in the market place.

SIP Proxy for Translating SIP to Multiple P2P Through Network Resources

This embodiment of the invention is a method and apparatus that comprises a SIP proxy for translating SIP to multiple peer-to-peer service providers. A user employs a client device, such as a telephone on which a SIP client is installed. The SIP client has no knowledge of the peer-to-peer service provider, but does have knowledge of the content delivery service, i.e. the server. The server comprises a SIP proxy for translating SIP requests from the client device to IM communications to multiple peer-to-peer service providers. Thus, the server translates SIP signaling such that the SIP client on the client device can make SIP calls to IM clients in the service provider's network.

The server keeps a mapping between client devices and peer-to-peer service providers. When a user identifies himself to the client device by logging in, an association of that particular handset to the service provider is invoked at the server. At that point, all messages from that client device to the server are associated with that user. If the user wants to initiate a peer-to-peer call to a peer-to-peer service provider, such as Yahoo, for example, the user operates the client device such that the server receives a SIP message that initiates the SIP call. The SIP proxy knows the identity of the user because of the mapping and, therefore, can retrieve information about the user. In this case, pertinent information, such as the user's IM identity is retrieved from a database associated with the server. For example, when a user who has a Yahoo IM account logs into a client device, the server user knows the user's identity. When the user accesses to the IM application, the server logs him in to the IM application at the service provider and redirects any IM session text between the service provider IM application and the client device.

The SIP proxy registers the user with the peer-to-peer servers. This makes an association between the service provider's peer-to-peer client and the SIP proxy. Thus, when a person using a PC want to make a peer-to-peer call to a user, he initiates a peer-to-peer call and the message goes to the peer-to-peer service SIP server. The SIP server knows to forward that message on to the SIP proxy because the user is now registered there.

This translation is executed because the SIP proxy is aware of who the user is. From the user, the system gets information from the database about the user's IM and peer-to-peer calling identity, as well as their passwords and other information. Based on that, the server translates the message before it is sent to the peer-to-peer service provider so that appears to the peer-to-peer service provider as if it is coming from one of their clients, and vice versa when a message is sent the other way. Thus, this embodiment of the invention interfaces the IM network from a network IM client to remote interface device.

Key to this embodiment of the invention is the fact that the client device, i.e. the telephone handset, has no knowledge of the IM protocol. The client device is, however, associated with the user. As part of the user profile, there may be an IM service provider associated with that user. If the user has an IM service provider and wants to access the IM service through the client device, he configures his profile on the server so that the server knows the identity of his IM service provider and has the credentials necessary so the user can log in tot he service provider's IM application.

The client device has a thin client that has no awareness of the IM protocol that is used by the user's IM network. In fact, it has no knowledge that it is actually providing an IM service. The server interacts with the IM servers on behalf of the IM user associated with the client device in such a way that it implements the IM protocol between the client device and the IM server. The server also sends the proper display messages to the client device, such that it appears to the user that there is an IM client on the client device. In other words, there is a virtual IM client running on the server and the rendering device is the client device, so the user can have IM functionality in a lightweight platform. The session information is passed from the client device to the server for the IM session, but the IM session is managed at the server. Thus, the server is really the IM client and all that is sent to the user are the messages that are exchanged back and forth between the server and the client device.

SIP Registration

Figure 14:
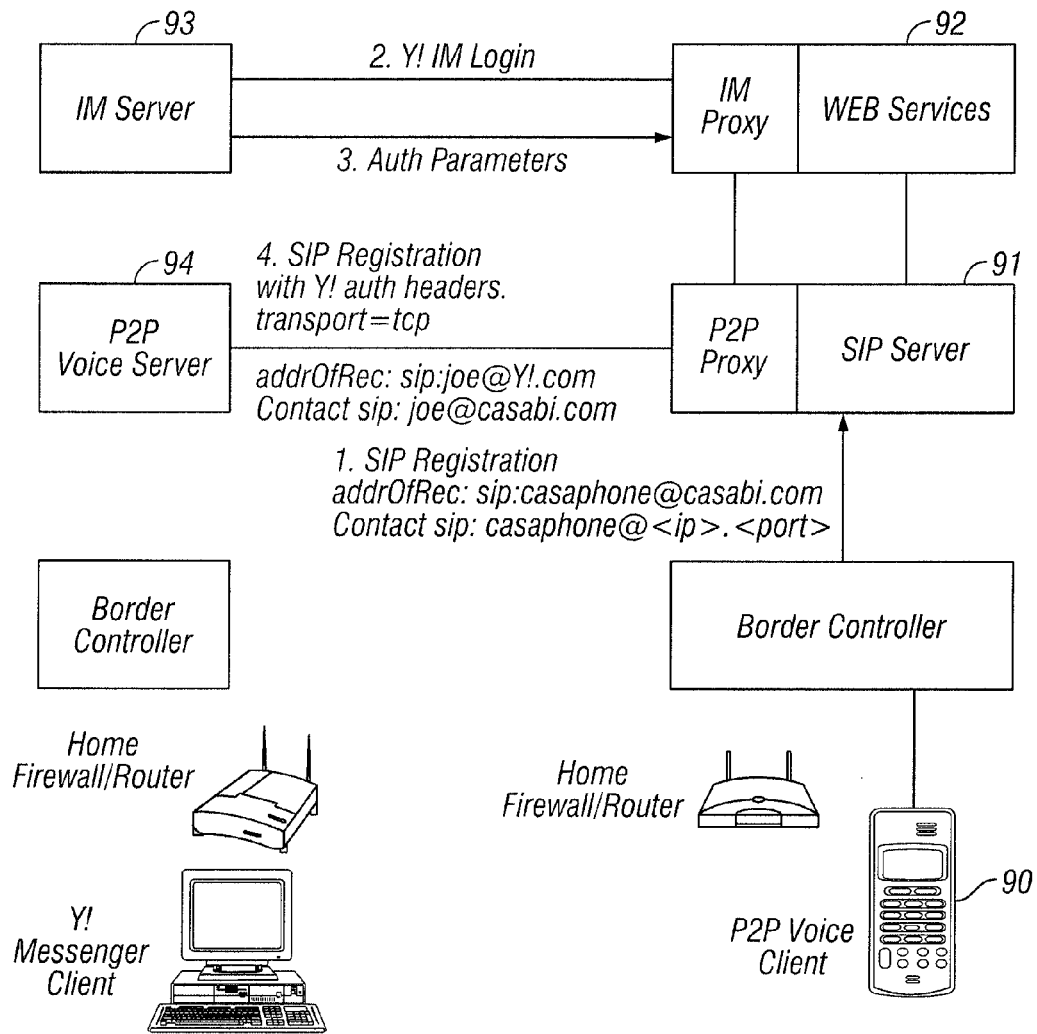
FIG. 14 is a block schematic diagram showing a SIP registration sequence according to the invention.

FIG. 14 is a block schematic diagram showing a SIP registration sequence according to the invention. In FIG. 14, a SIP Voice User Agent (UA) on subscriber's home telephone 90 registers with the SIP server 91 (Step 1). Web Services 92 act as a proxy for the telephone and logs into the third party IM server 93 (Step 2; the third party server and other elements are given by way of example only; those skilled in the art will appreciate that the invention operates readily with any such service). As part of a successful login, the IM server returns authentication parameters (Step 3). The system uses the authentication parameters to SIP REGISTER with the P2P SIP server 94 (Step 4). Although the telephone registers to the SIP server with a generic SIP ID, the SIP server registers with IM with the actual IM User ID. This allows multiple users to logon via multiple handsets and to send and receive IM P2P calls using the same SIP UA on the telephone.

Voice Call

Figure 15:
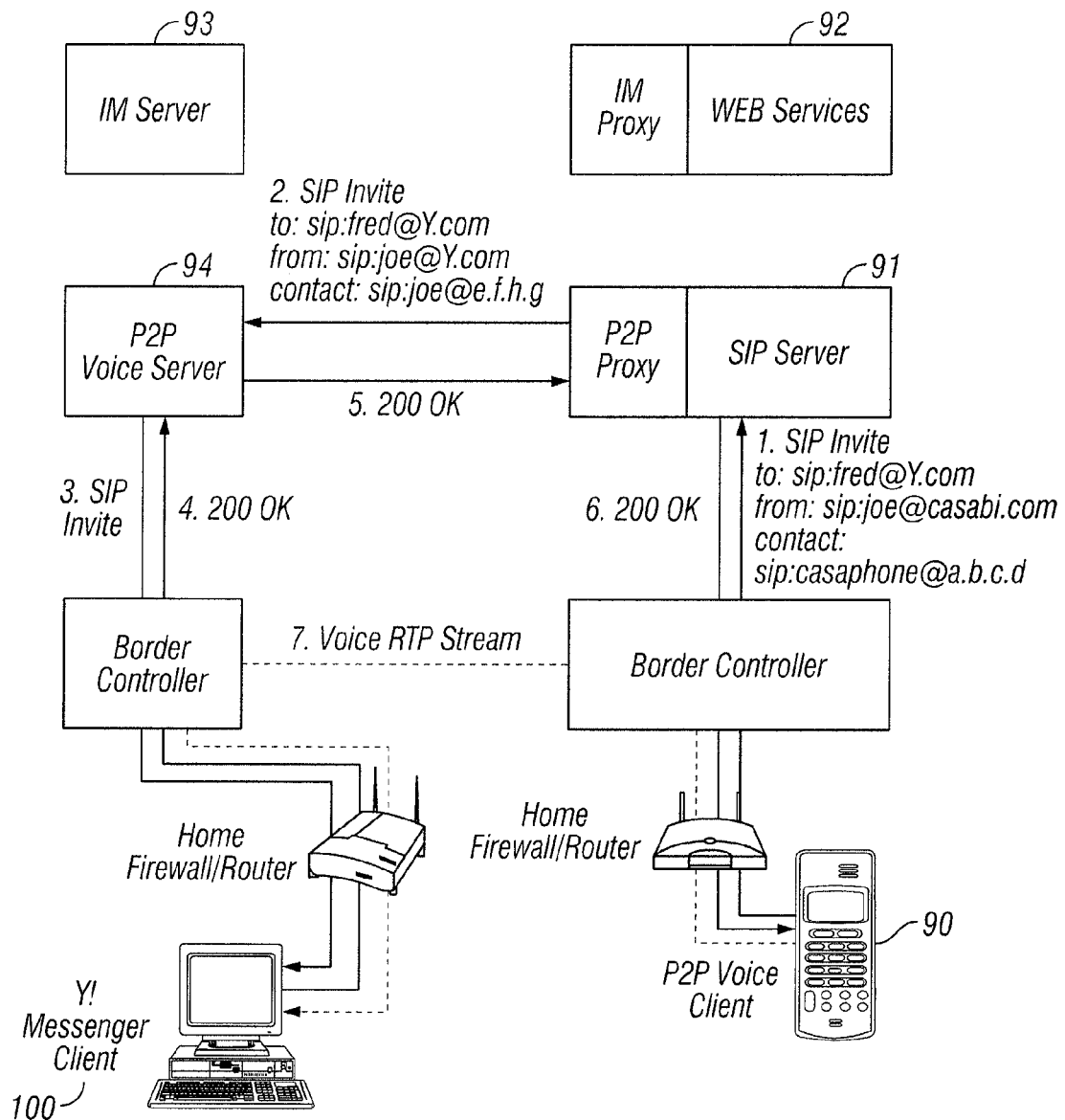
FIG. 15 is a block schematic diagram showing a voice call sequence according to the invention.

FIG. 15 is a block schematic diagram showing a voice call sequence according to the invention. The following is simplified view of a P2P SIP call originating from the cordless telephone system to a third party IM user on another PC. The telephone 90 initiates a P2P SIP call to an online IM Buddy (Step 1). The call is proxied to the P2P server (Step 2). An invite is sent to the IM client 100 (Step 3). The IM client accepts the call (Step 4). A response is proxied to the system (Step 5). The telephone receives a response (Step 6). A voice connection is established and the call proceeds (Step 7).

Device and End-User Registration
User-2WS Interactions

The following are the high-level scenarios detailing the presently preferred, but not the only possible, interaction between a telephone system, i.e. base station and hand sets, with the herein disclosed service instance.

Registration

The goal of the registration process is to bind a user to a system, such as a telephone system. A telephone system is composed of a base and its hand sets. The role of a base is to act on behalf of the hand sets. As such, the base is a proxy for its hand sets. All interaction with the telephone system preferably occurs solely through the base. It should be appreciated that, while the invention is described herein in connection with hand sets, any IP enabled device may be used in practicing the invention such as, for example but not by way of limitation, printers, PDAs, and the like.

To activate an account, two separate interactions must take place:

Telephone registration: This consists of making the telephone known to the service. Once it is complete, the service has stored the telephone system persistently.

Account creation: This process consists of creating an account in the service, which then binds the account to the telephone system.

Only when these two interactions are completed successfully, does the service consider the account active. These interactions are detailed as follows:

Telephone Registration

Figure 16:
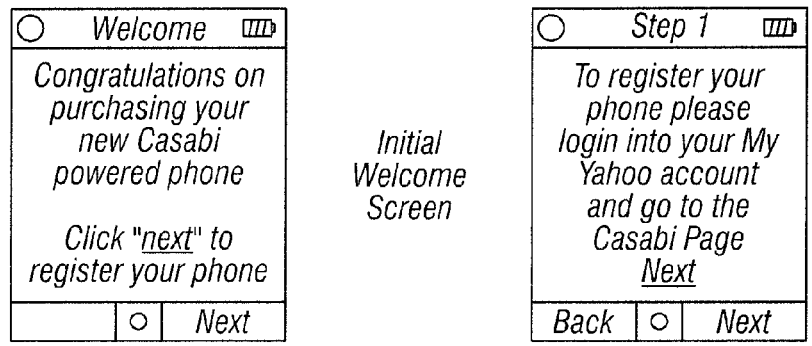
FIG. 16 is a screen shot showing a first step in a telephone registration procedure according to the invention.
Figure 17:
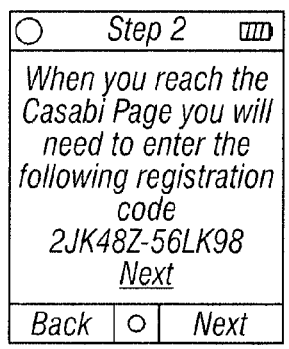
FIG. 17 is a screen shot showing a step in a telephone registration procedure that displays a registration key according to the invention.

With telephone registration, the service becomes aware of a telephone system and provides a way for a client to link that telephone system to their account. In this procedure, a client installs the telephone system 117 (FIG. 10), i.e. the base 119 and handsets 121. As soon as the telephone system comes on line, it contacts the 2WS indicating that a telephone system must be registered. A registration wizard comprising a series of screens appears on all handsets (see FIG. 16). The client presses the registration icon on any one handset. The telephone system sends a registration message to the service. The registration message is received by the service which: authenticates the registration; stores the telephone system persistently; generates a six digit registration key and sets up a time to live for this registration; and returns this information back to the handset. The handset displays the registration key to the client (see FIG. 17). It also informs the user that their service must be activated by logging into the service provider and creating an account.

Account Creation

Figure 18:
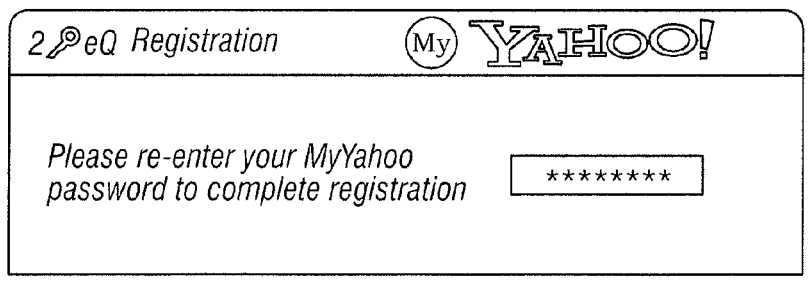
FIG. 18 is a screen shot showing a step in a telephone registration procedure that displays a password entry dialog according to the invention.

During account creation, the service becomes aware of a client's account and links the telephone system to the account. A client creates or logs into his service provider's account. As part of the account creation, the client is redirected to the web service's web pages. At this time the client must re-login to the web service by entering the service provider's user name and password (see FIG. 18).

Figure 19:
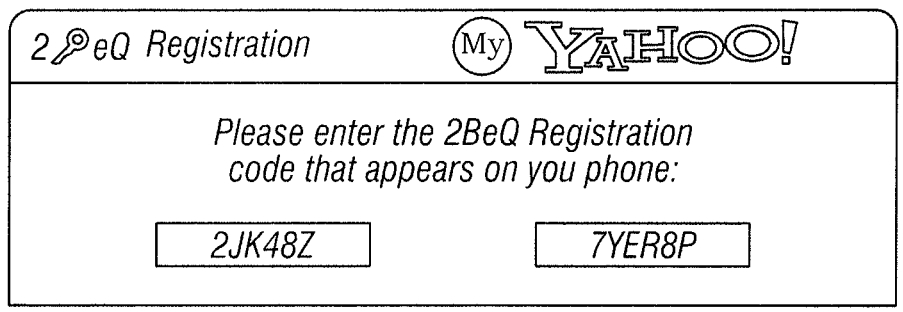
FIG. 19 is a screen shot showing a step in a telephone registration procedure that displays a registration code entry dialog according to the invention.

The account creation web page requests the following information: Service Provider's name, Service Provider's password, Registration Key which was provided by the telephone registration, and PIN, which is an identifier that uniquely identifies a client (see FIG. 19).

Figure 20:
FIG. 20 is a screen shot showing a step in a telephone registration procedure that indicates successful registration with a service according to the invention.

Service profiles comprise the customized services that the client wishes to use, such as Mail, IM, Enhanced Idle Screen, etc. For these services, the client submits the request to the web service. The web service performs the following actions: Authenticate the client user name and password with the service provider, e.g. in the case of Yahoo!, logging into the service provider results in a token which can be used to access all the clients properties handled by Yahoo!; Create the user's account with its associated service profiles; Link the telephone system to the client through the registration key; and Send a web page back to the user indicating a successful account registration (see FIG. 20).

Figure 21:
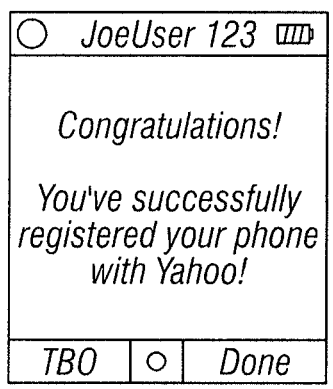
FIG. 21 is a screen shot showing a step in a telephone registration procedure that indicates successful registration to the client according to the invention.

The web services then forwards an initial response back to the telephone system (see FIG. 21). After the initial response has been sent to the clients, the service activates all of the services for the user, which consist of, for example: Email/Voice Mail showing the number of messages in the in-box; IM which establishes the users presence on the Internet; Address book with a list of addresses; and an Enhanced idle screen with scrolling Headline News.

Hosted Service—Integration Protocol

The invention comprises, in part, a hosted service. FIGS. 28-33 provide detailed flow diagrams that illustrate various processes in connection with the hosted service aspect of the invention. A less detailed discussion of these processes is provided above.

Figure 28:
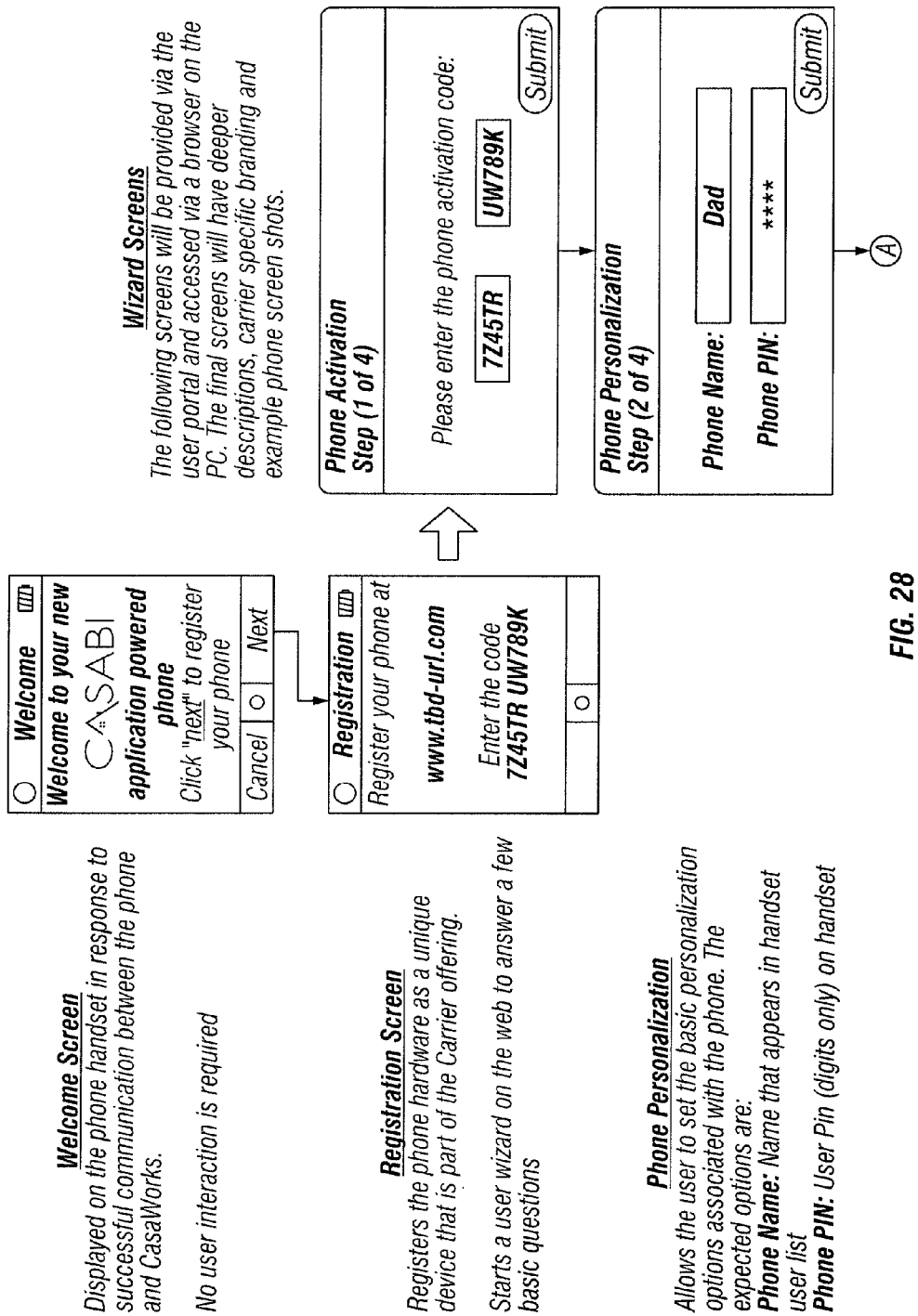
FIG. 28 is a flow diagram showing a new user registration process according to the invention.
Figure 28:
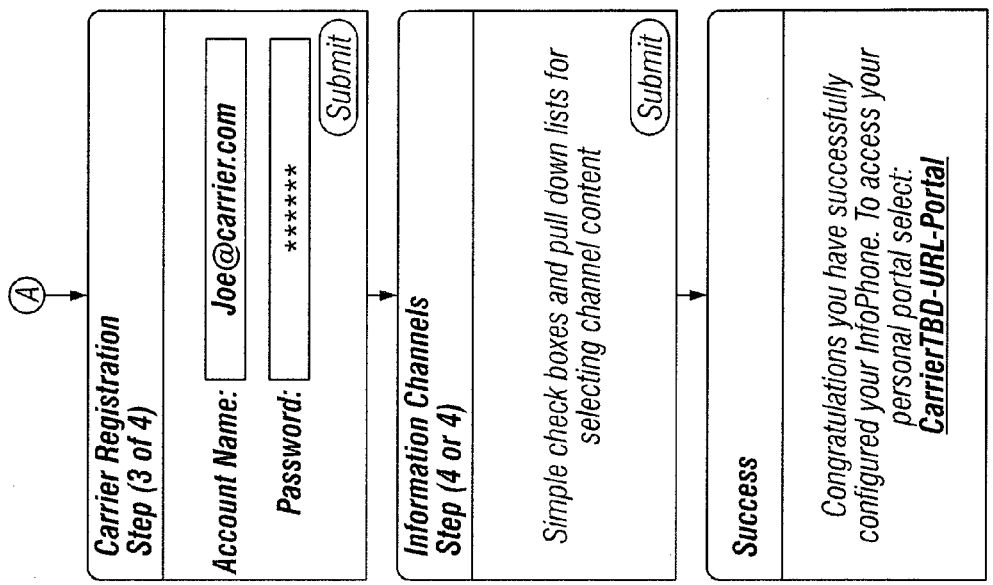
Figure 28:
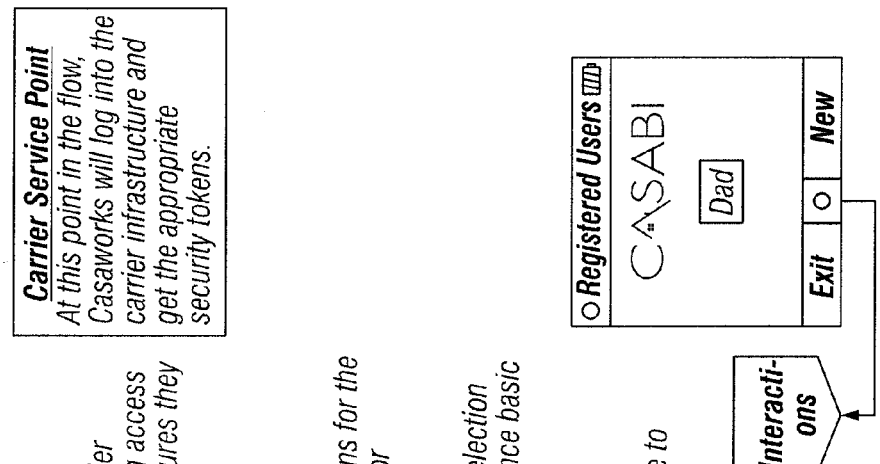

FIG. 28 is a flow diagram showing a new user registration process according to the invention. In FIG. 28, when a service enabled telephone contacts the hosted service for the first time it provides the user with an initial registration screen The screen points the user to a web-based wizard that is used to walk the user through a basic system configuration. Once the registration process is complete, the user has access to the carrier branded portal, which allows the user to access additional configuration options and other information.

Figure 29:
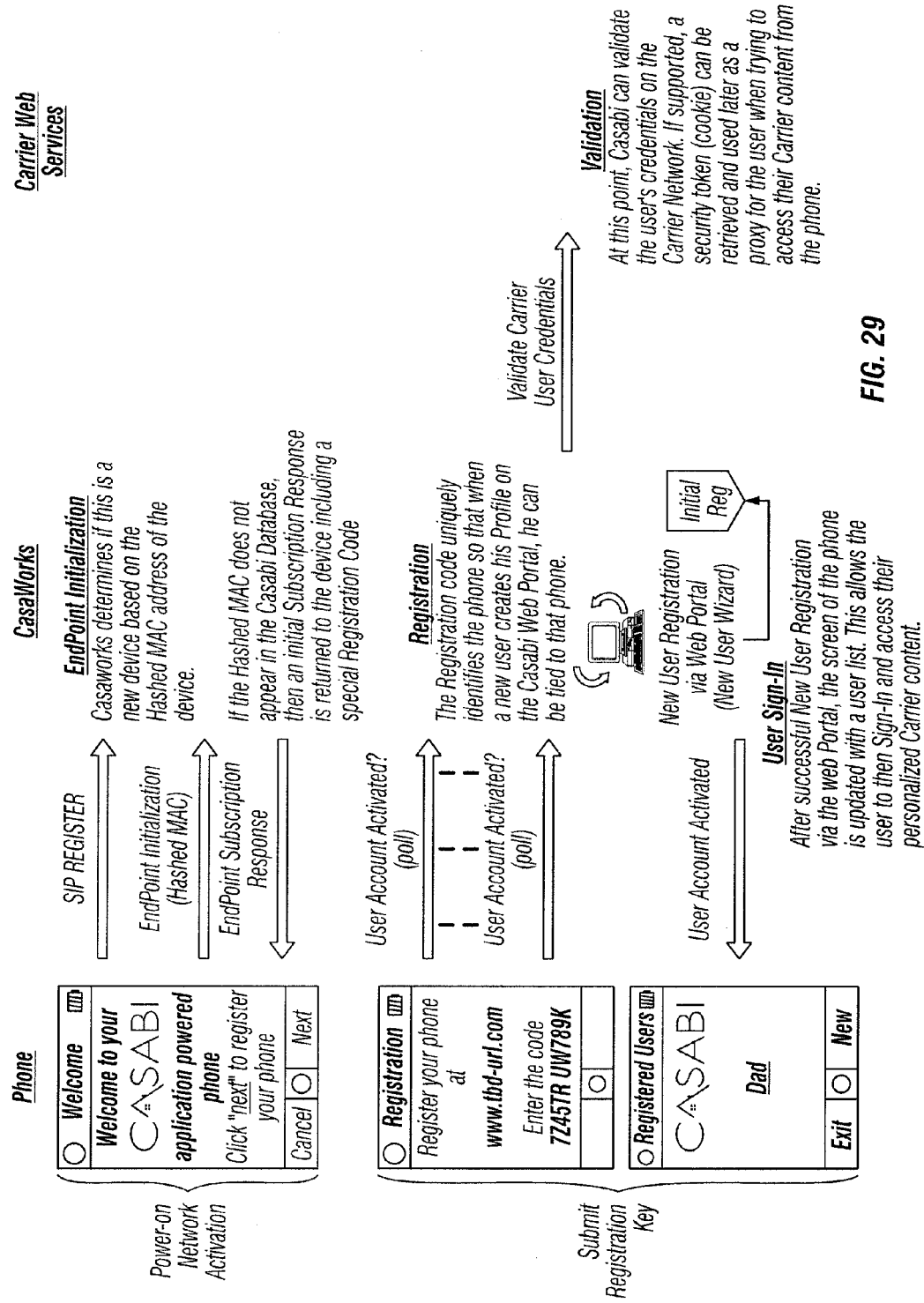
FIG. 29 is a flow diagram showing network interaction during a new user registration process according to the invention.
Figure 29:
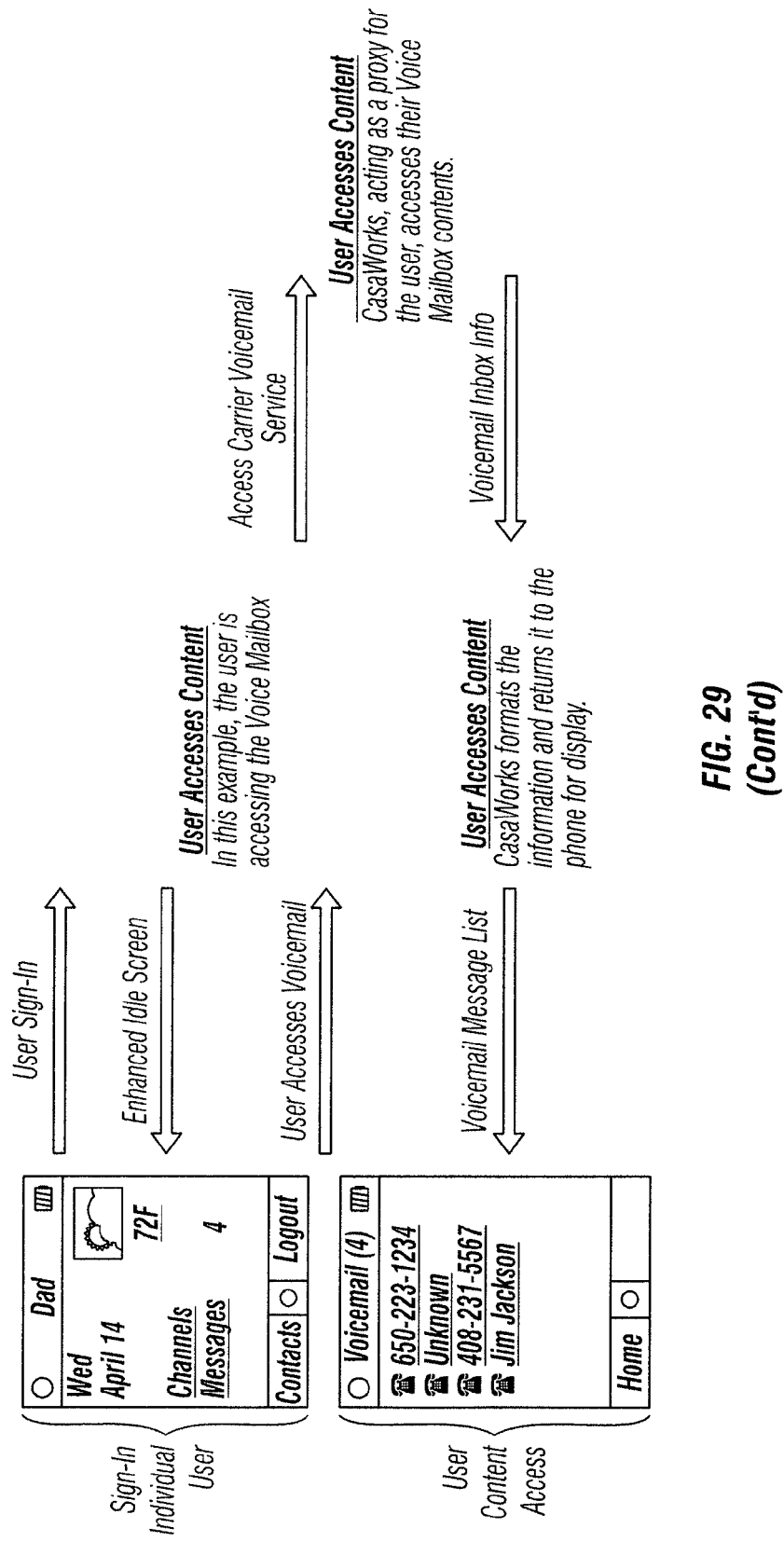

FIG. 29 is a flow diagram showing network interaction during a new user registration process according to the invention. In FIG. 29, a high level view is provided of the network interactions that take place during the new user registration process, initial user sign-on, and user access of application content. The inventive web service manages the telephone devices and users by acting as a proxy for the user when the user wants to access carrier originated application content.

Figure 30:
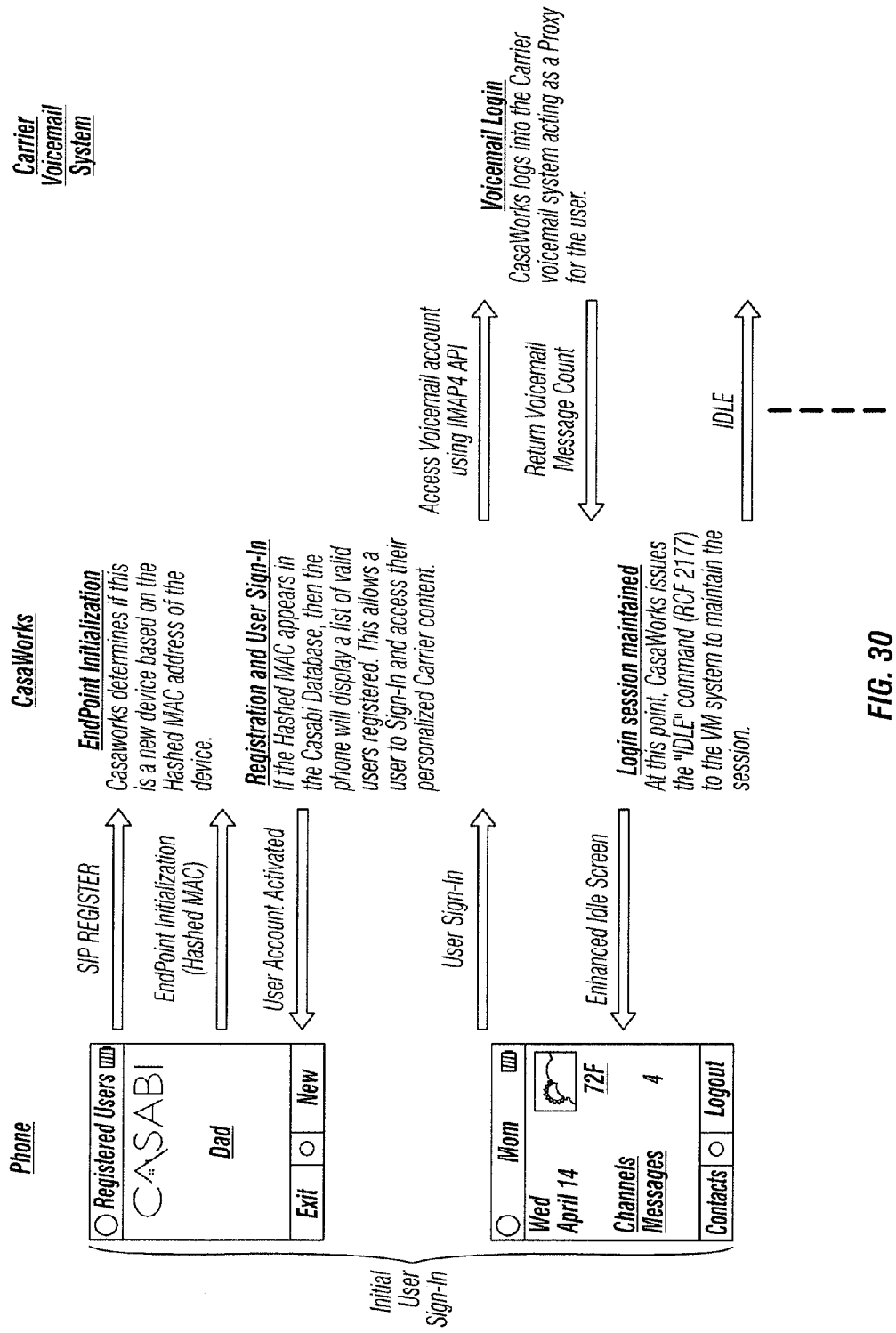
FIG. 30 is a detailed flow diagram showing voicemail integration according to the invention.
Figure 30:
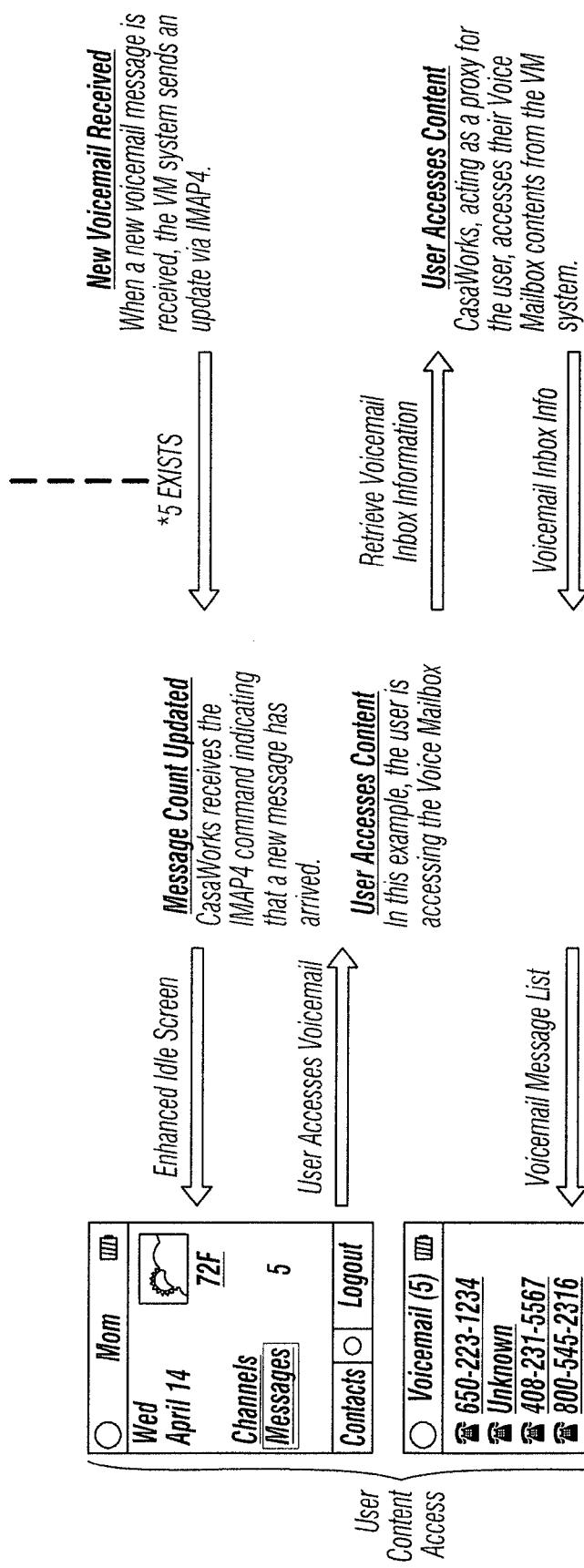

FIG. 30 is a detailed flow diagram showing voicemail integration according to the invention. In FIG. 30, network integrations for voicemail use are shown. In the example of FIG. 30, it is assumed that the voicemail message store supports the IMAP4 protocol, as well as the RFC 2177 extension (IMAP4 IDLE command). RFC2177 allows a mail client to get real-time updates for a selected mailbox, in this case the arrival of new messages.

Figure 31:
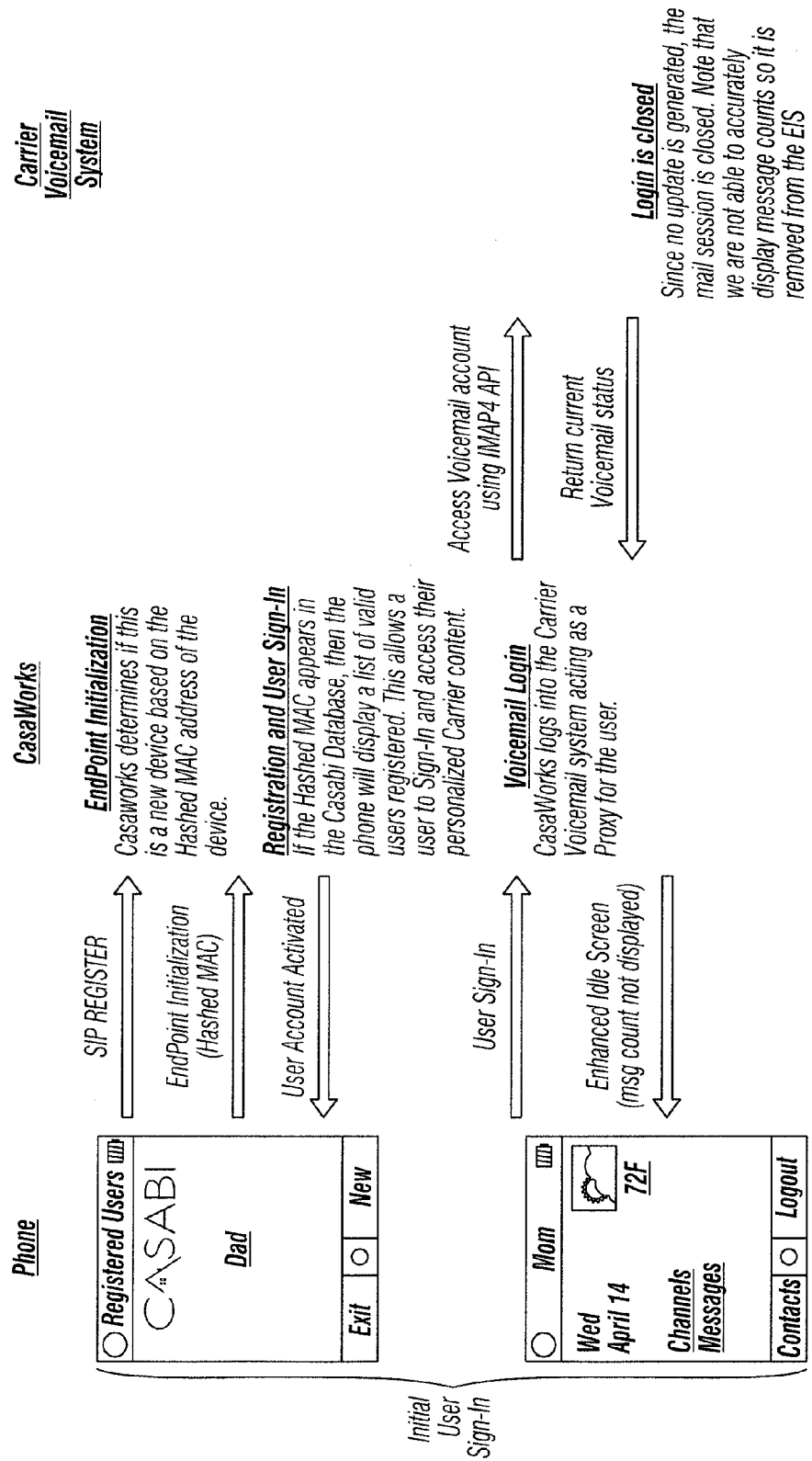
FIG. 31 is a flow diagram showing voicemail integration without asynchronous notification according to the invention.
Figure 31:
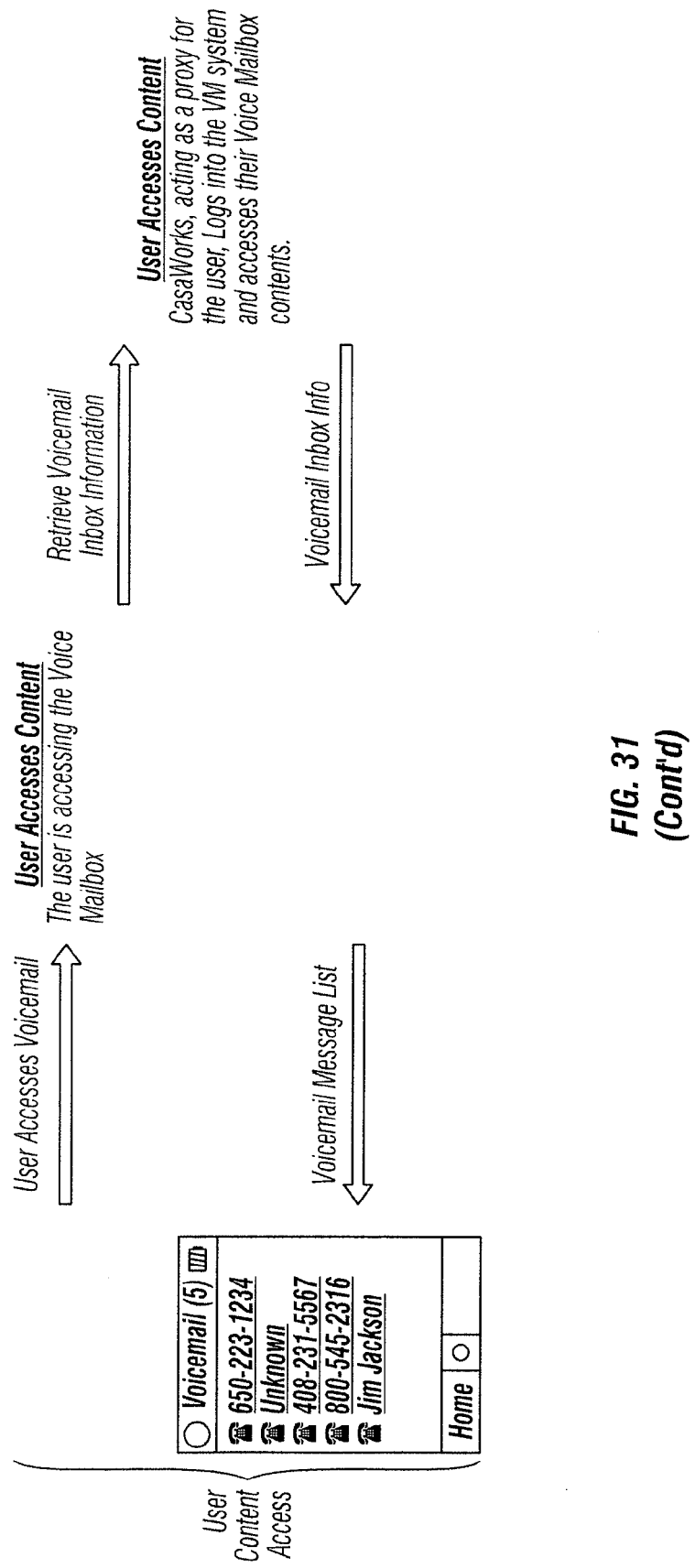

FIG. 31 is a flow diagram showing voicemail integration without asynchronous notification according to the invention. In FIG. 31, the network interaction for voicemail is simplified if the voicemail system has no way to notify a client asynchronously of the arrival of new messages. That is, if the RFC 2177 protocol, or an equivalent protocol is not supported, then the service cannot dynamically update the message count for the user.

Figure 32:
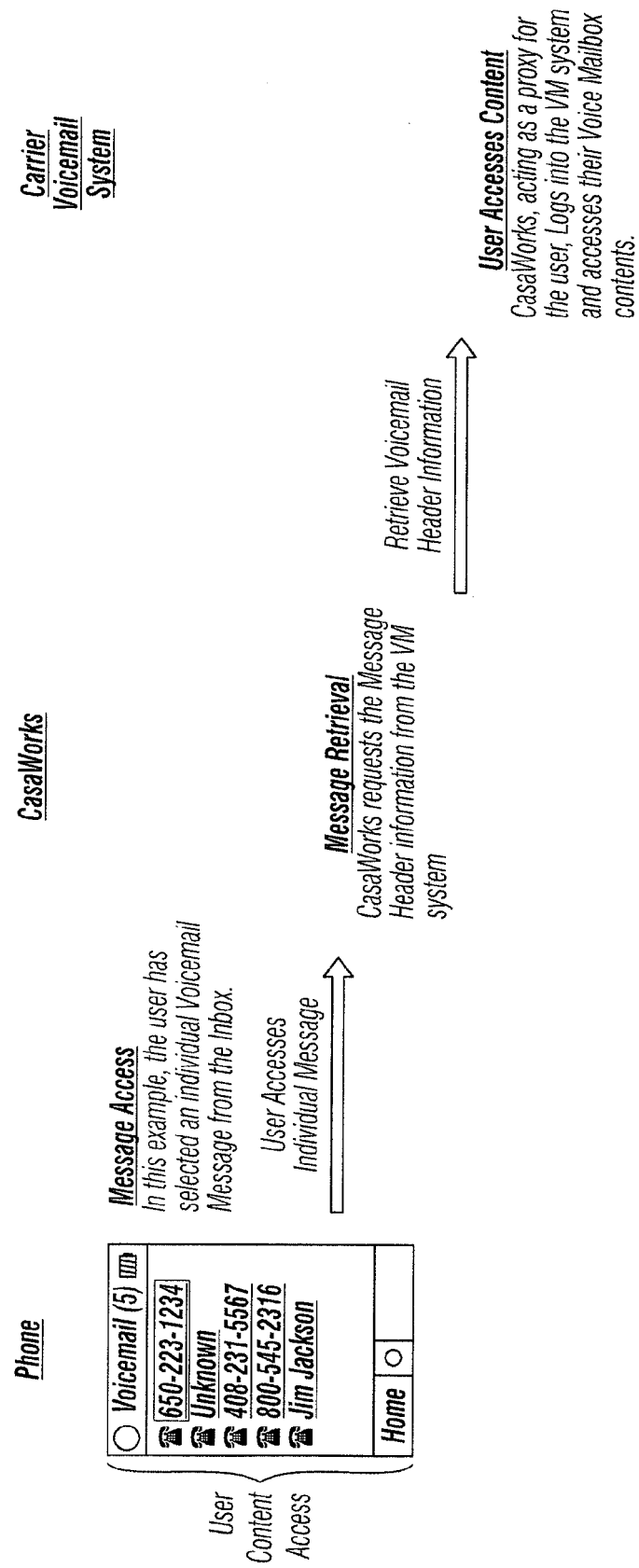
FIG. 32 is a flow diagram showing a voicemail delete process according to the invention.
Figure 32:
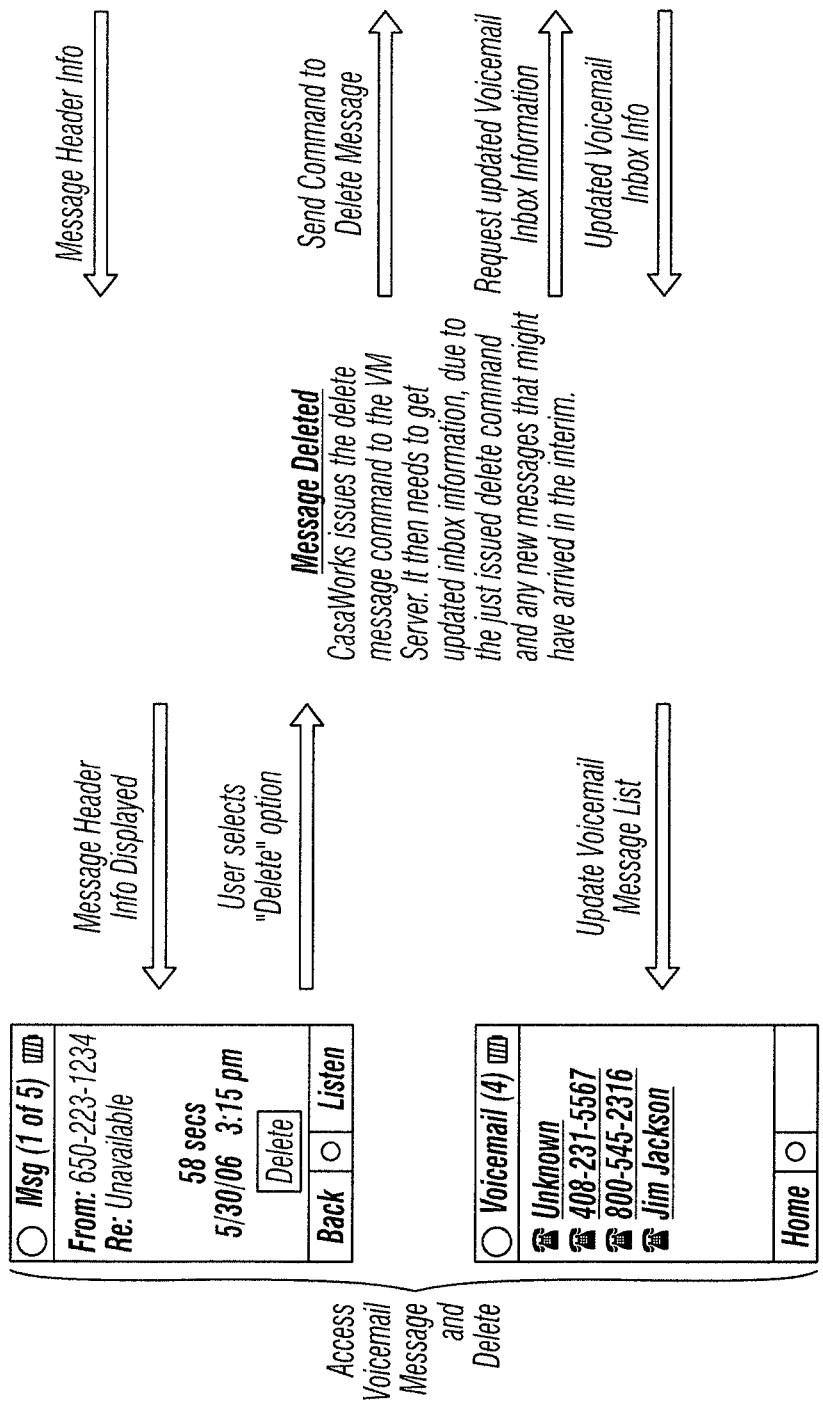

FIG. 32 is a flow diagram showing a voicemail delete process according to the invention. In FIG. 32, network interaction for voicemail deletion is shown as a straightforward IMAP session with the voicemail system. Once the user selects a voicemail message to view, the user is given the option to delete it. The delete option causes the service to send the appropriate IMAP command to the voicemail system to delete the message. The service then refetches the mailbox contents and sends the updated information to the telephone for display to the user.

Figure 33:
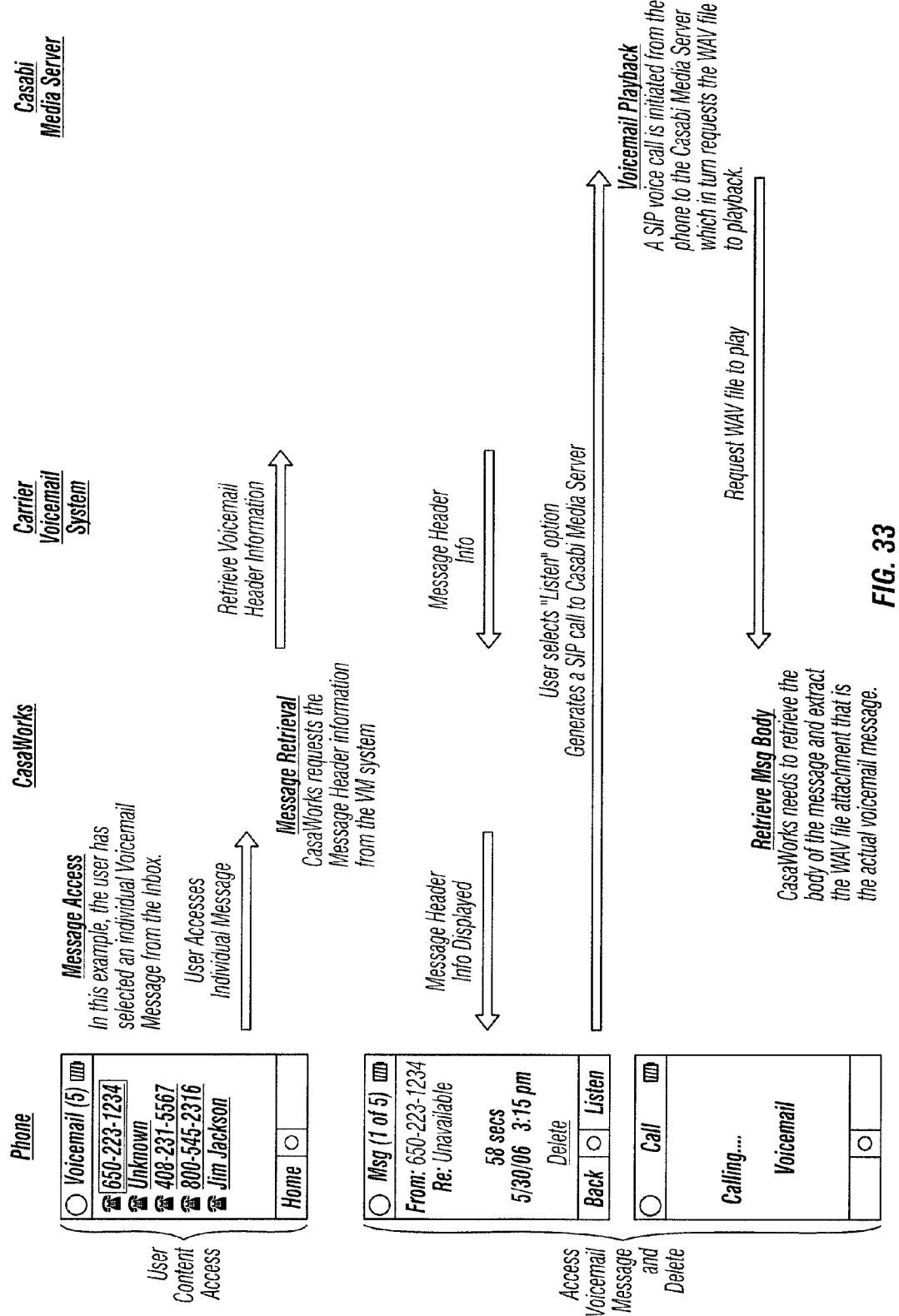
FIG. 33 is a flow diagram showing a voicemail listen process according to the invention.
Figure 33:
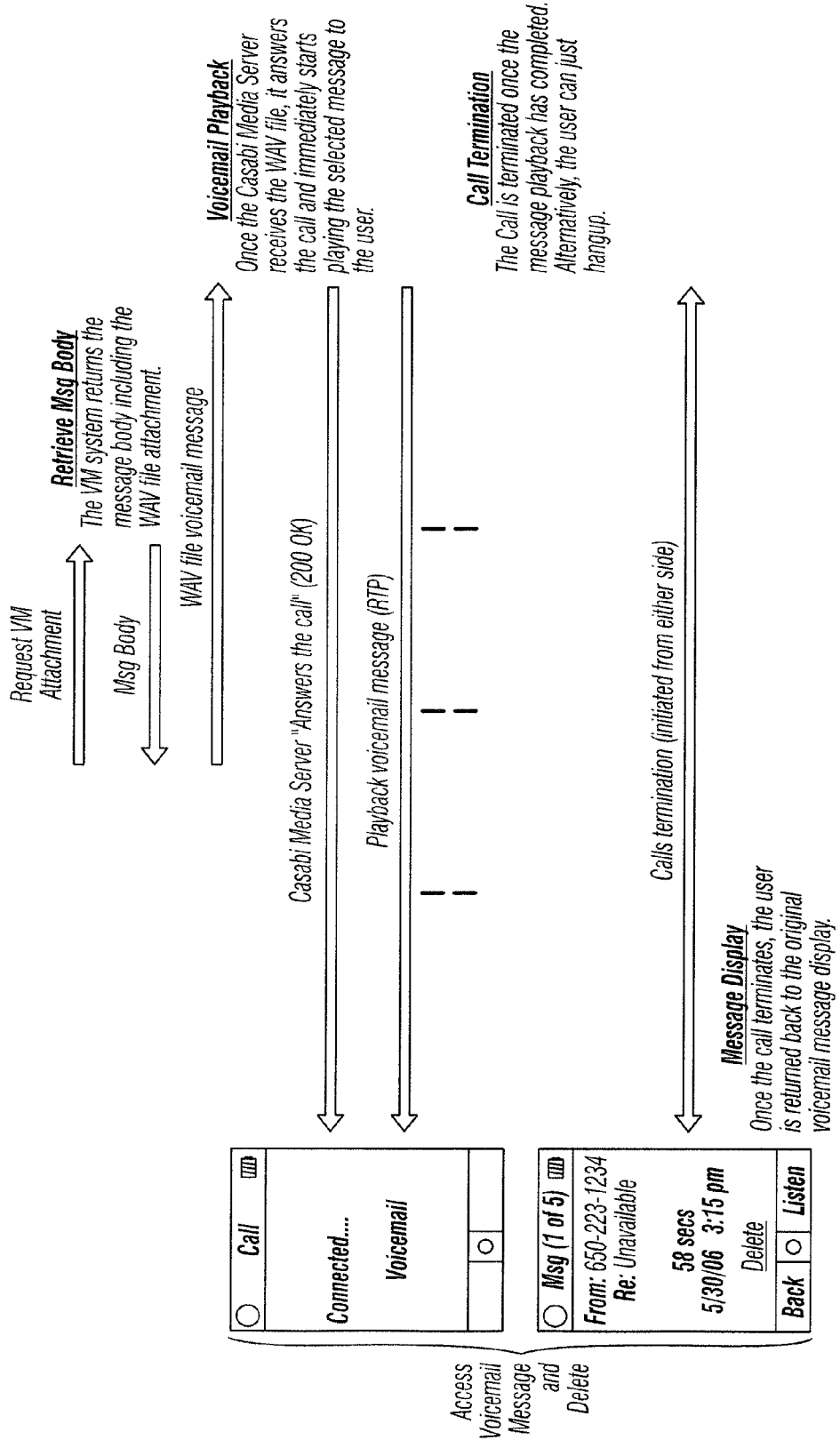

FIG. 33 is a flow diagram showing a voicemail listen process according to the invention. In FIG. 33, The network interaction for voicemail listen includes the calling of the service media server to playback the selected message to the user. When a SIP call is placed to the media server, the service downloads the message body containing the voice message, which in this example is assumed to be a WAV file attachment. The file is then transferred to the media server, which then plays the message back to the connected user.

Protocol State Machine

The following protocol state machine describes the bring-up, i.e. cold start, of the QFW from a network point of view. The term runlevel is borrowed from OS start-up procedures. Their granularity is intentionally coarse and they are presented as a basis for discussion only.

Proxy Protocol State Machine (Cold Start)

Figure 22:
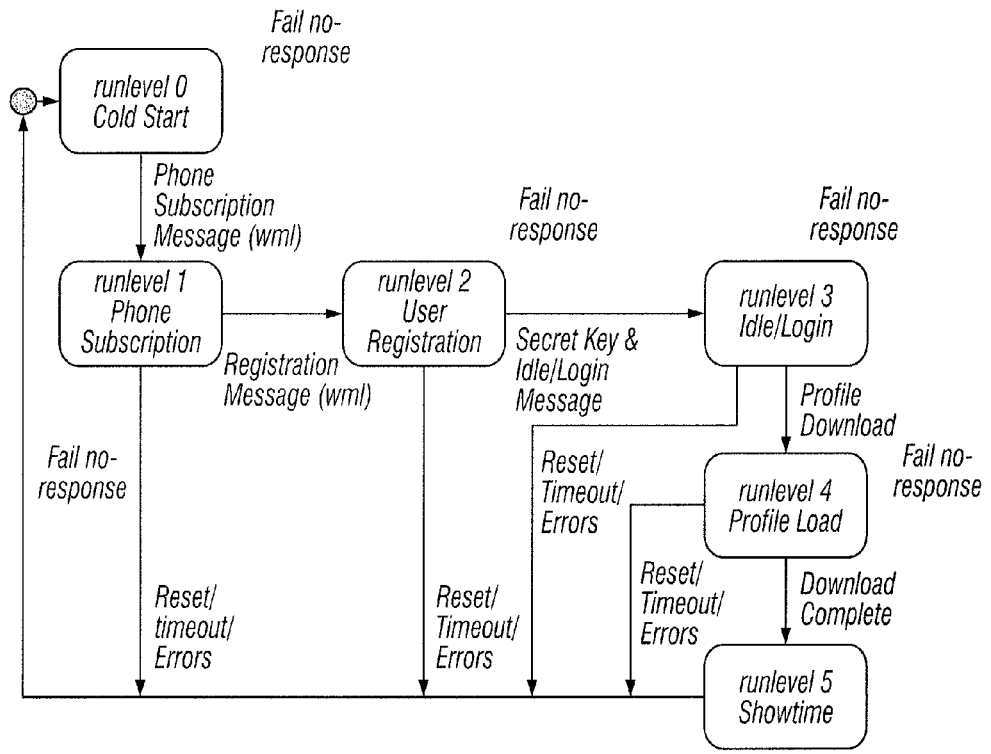
FIG. 22 is a block schematic diagram showing a Proxy Protocol State Machine (Cold Start) according to the invention.

This state machine (see FIG. 22) indicates the initialization sequence of the telephone system and how a handset is bound to a user.

runlevel 0:

End Point Update—The QFW sends a SIP Register message to CSIP. The SIP message contains the telephone system ID as a hashed MAC address. CSIP forwards the hashed telephone system identifier and the IP address to the 2WS.

The 2WS checks the telephone system ID and the IP address and if necessary updates the persistent storage with the IP address. It responds back to CSIP with a 200 OK and CSIP, in turn, forwards this 200 OK back to the QFW.

End Point Initialization—The QFW then sends a start-up message to the 2WS. This start-up message contains the hashed telephone system ID. The 2WS stores this info and then responds with the telephone proxy WML page.

runlevel 1:

Telephone Proxy—the user hits the proxy link, the QFW forwards this to the 2WS. The 2WS registers that telephone system and sends back a registration page (WML) with a registration code, e.g. six digits. The QFW takes the registration code, generates a secret, combines this key with the registration code and presents this as a single registration key, e.g. twelve digits, to the user.

runlevel 2:

User Registration/Secret Key Verification—The user uses the ID and secret key to register through the Web. Once this is complete, the 2WS binds the user and the telephone system in the DB.

runlevel 3:

Idle/login: Once registration is complete, the 2WS uses a secret key handshake with the QFW to validate the secret key. Once the secret key is validated and, once established, the secret key is used for all message validation. The 2WS sends the user a login/idle screen. This screen is continually updated until the user logs in.

runlevel 4:

User login-profile load—The user logs into the 2WS using buttons in the idle screen. The 2WS responds by pushing the users profile, e.g. services, to the telephone system.

runlevel 5:

Showtime—This is the runtime operation between the telephone system and the 2WS. This state contains all the runtime operations between the user and the 2WS, including the ability to log out of the system.

Login/Logout Protocol State Machine

Figure 23:
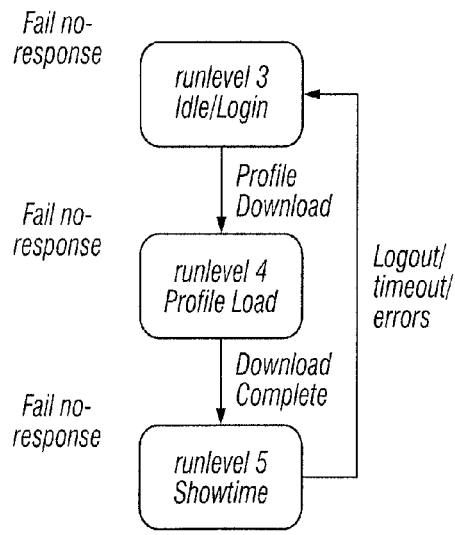
FIG. 23 is a block schematic diagram showing a Login/Logout Protocol State Machine According to the Invention.

The following finite state machine (see FIG. 23) indicates the states of a telephone system when a user log into and out of a handset. It begins with a user logging in and then logging out. The states iterate between runlevel 3 and runlevel 5.

runlevel 5:

Showtime—User logs out of the handset. The 2WS receives this and sends the user an idle or login screen.

runlevel 3:

Idle/login: The 2WS sends the user a login/idle screen. This screen is continually updated until the user logs in.

runlevel 4:

User login-profile load—The user logs into the 2WS using buttons in the idle screen. The 2WS responds by pushing the users profile, e.g. services, to the telephone system.

runlevel 5:

Showtime—This is the runtime operation between the telephone system and the 2WS. This state contains all the runtime operations between the user and the 2WS, including the ability to log out of the system.

Power Clear Protocol State Machine (Warm Start)

Figure 24:
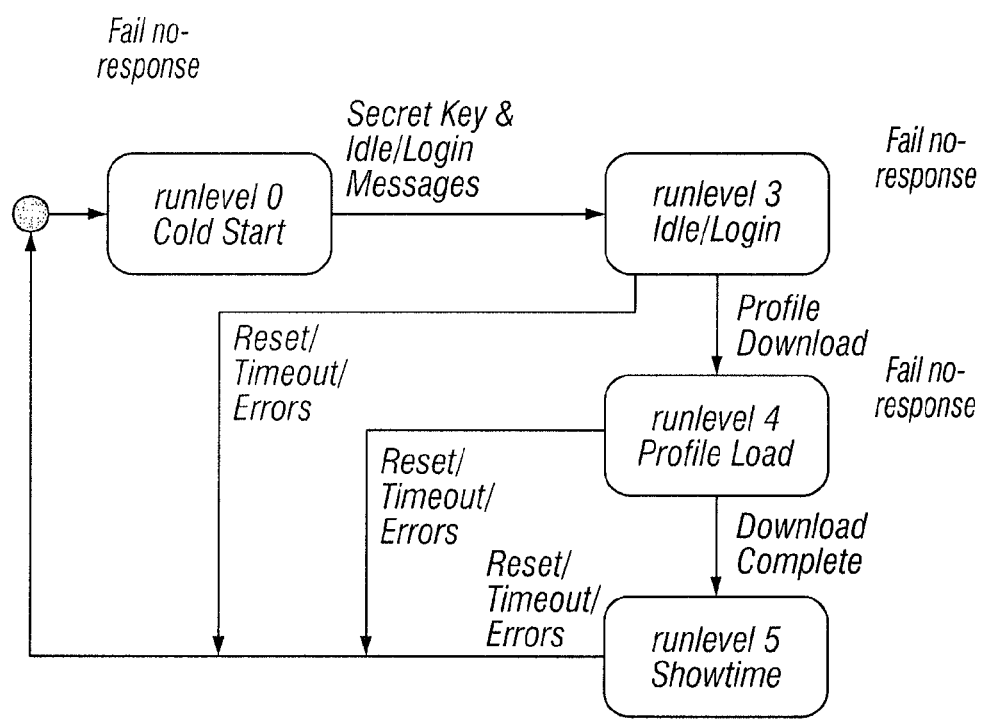
FIG. 24 is a block schematic diagram showing a Power clear Protocol State Machine (Warm Start) according to the invention.

This state machine (see FIG. 24) details the events that occur if an active user power clears the telephone system. The telephone system comes up as though it is performing a cold start but, because the user is already known and active, the 2WS considers the QFW to be in the Idle/Login state and all subsequent interactions with the QFW begin from there.

runlevel 0:

Cold Start—The QFW sends the MAC address of the telephone system base station to the 2WS. The 2WS checks this information. It sees that a user is bound to this telephone system. Consequently, user registration is not required. It goes to runlevel 3 in which the secret key handshake is performed and the idle screen is sent to the QFW.

runlevel 3:

Idle/login: The 2WS sends the user a login/idle screen. This screen is continually updated until the user logs in.

runlevel 4:

User login-profile load—The user logs into the 2WS using buttons in the idle screen. The 2WS responds by pushing the users profile, e.g. services, to the telephone system.

runlevel 5:

Showtime—This is the runtime operation between the telephone system and the 2WS. This state contains all the runtime operations between the user and the 2WS, including the ability to log out of the system.

Runtime Operations

Email/Unified Messaging

The goal of the email interactions are to provide the client with standard email features, such as, for example, In-box status; reading and deleting messages; and writing messages, if the handset provides adequate support for this functionality.

Reading Email

From the EIS, a client selects UM. The telephone system requests UM information from the service. The service gets the UM information, e.g. email headers, and sends this to the handset. If the number of email headers exceeds a predetermined value, the service sends a sub-set of the total email headers. To see all the remaining messages, the telephone system must request more email headers upon user request. The telephone system next updates the handset display. The user selects a message to read. The telephone system sends this request to the service. The service, gets the email content, either from the service provider, or from stored cache, i.e. Published Data. The service sends the email content, formatted in WML, to the telephone system. The telephone system displays the email content to the user.

Deleting Email

The user has retrieved his email headers from the 2WS web layer. This layer handles all incoming requests from a client, marshals and un-marshals the request, performs access control, and forwards the request to appropriate controllers that handle it. To this point, the service operates as described above in connection with reading email. The user then selects a message to delete and depresses the delete key. The telephone system sends a delete request to the service. The service logins into the service provider and deletes the message. The service returns the status back to the telephone system, with a re-ordered list of email headers. The telephone system displays the current page/card with a re-ordered list of email headers from which the deleted message has been removed.

Voice Mail

Voice mail allows a user to listen to voice mail messages stored in their voice mail service. In voice mail, the user selects UM from the icons on-screen. The telephone system issues a request to the service. The service returns a list of voice mail entries to the telephone system. The user chooses the voice mail entry he wishes to hear and presses the submit key. The telephone system issues the request to the service. The service gets the wave file from the service provider. The service then loads the wave file onto the media player/gateway. The service provides the address of the media gateway to the telephone system. The telephone system initiates a SIP session with the Media Gateway. Once the session is established, the media gateway plays the wave file for the user, who hears the voice mail on his handset.

Address Book

The address book feature provides a user with a list of customized addresses, e.g. name, telephone numbers, email addresses, etc. At service activation (see the Registration discussion above), the service downloads the whole address book to the base, together with a WML template. The service refreshes the address book on the base whenever it changes in the service provider. When the user depresses the address book icon, the base formats the WML pages and serves them up to the handset. The handset displays the address book content to the user.

Local Search

Local search provides the user with "Yellow Pages" functionality, allowing them to look up resources, such as, for example, movie theaters, malls, restaurants, etc. In the local search function, the user selects the Local Search icon. The base sends the request to the service. The service responds with a WML page listing the search categories. The user selects an entry from the search categories and clicks on the submit button. The telephone system then sends a request to the server indicating the selected item. The service goes to the service provider, which performs the search and returns the results. The service stores the results and sends them back to the telephone system. The handset then displays the results.

One embodiment of the invention provides a pay per call feature for merchants who are located by a user of a Local Directory Search. In this embodiment of the invention, an overlay is provided for the user search, in which various results are listed in preferential order based upon payment of a placement fee by a merchant, such as a local plumber. The user calls one of the listed merchants and the system uses CSIP to track the user call to completion. The merchant pays the service for each call it receives via the local directory search. To facilitate contacting the subscribing merchant, the search results are returned to the user with a link displayed that, upon selection, connects the user directly to the merchant to establish a voice call with the merchant.

Instant Messaging

The instant messaging function provides the user with a list of buddies that are on line. To start, the user selects the IM icon on the handset. The telephone system submits the request for the IM service from the service. The service returns the buddy list to the telephone service. In the preferred embodiment, the Buddy List contains E.164 information and a SIP end point. The user selects a buddy. The Handset places a call to that buddy.

Message Format

The following discussion provides is a generalized notion of a message. These messages can be used between the QFW and 2WS. Only the essential elements are included and extensions can be added as needed. In the presently preferred embodiment of the invention, the message schema is expressed in XML.

A generalized message can be expressed as follows:

```
<message>
    <header/>
    <content/>
</message>
```

Header

A header always has an operation and modifiers for the operation. Modifiers are any attributes defined, or required by, the operations. For instance, if the operation is to download WML, the operation is "DownloadTextFile and the modifiers are fileName and fileType. An example of this is:

```
<header>
    <op>DownloadTextFile</op>
        <fileName>/Mom/AddressBook/Home</fileName>
            <fileType>wml</fileType>
</header>
```

A header also contains elements, such as hash, which is constructed from a secret key; and name, which may or may not be needed in the finalized version. However, these fields are not being used for CES and, for the sake of clarity, are not included. The header can contain other elements, such as length, etc, if necessary.

Content

Content is the object of the operation. It is the thing operated on, used by the operation, or needed by the operation. In fact, it can be any thing defined or required by, the operation. For example the content can be a wml file, xml templates, data, or even a formatted string. In this example, it contains wml wrapped in a CDATA construct. For example:

```
<content>
    <![CDATA [ <wml>......................</wml> ]] >
</content>
```

Putting it all together we have a message constructed as follows:

```
<message>
    <header>
        <op>DownloadTextFile</op>
            <fileName>/Mom/AddressBook/Home</fileName>
                <fileType>wml</fileType>
    </header>
    <content>
        <![CDATA [ <wml>......................</wml> ]] >
    </content>
</message>
```

In this model, the message only specifies that it must have a header and a body or content. What is in the header and content depends on the operation taking place. For instance, to send templates we could do the following:

```xml
<message>
    <header>
        <op>DownloadAddressBookTemplates</op>
        <fileName>/Mom/AddressBook/Page1</fileName>
        <fileType>xml</fileType>
    </header>
    <content>
        <![CDATA [ <xml>template....</xml> ]] >
    </content>
</message>
``` or to download user data:

```xml
<message>
    <header>
        <op>DownloadAddressBookData</op>
        <userName>Bill Joy</userName>
        <displayName>JavaGuru</displayName>
    </header>
    <content>
        <![CDATA [
            <xml>
                <contact>
                    <name>Scott McNeally</name>
                    < telephone>
                        <type>work</type>
                            <number>1-800-call-sun</number>
                    </contact>
            </xml>
        ]] >
    </content>
</message>
```

QFW-2WS Interactions

EndPointUpdate

Figure 25:
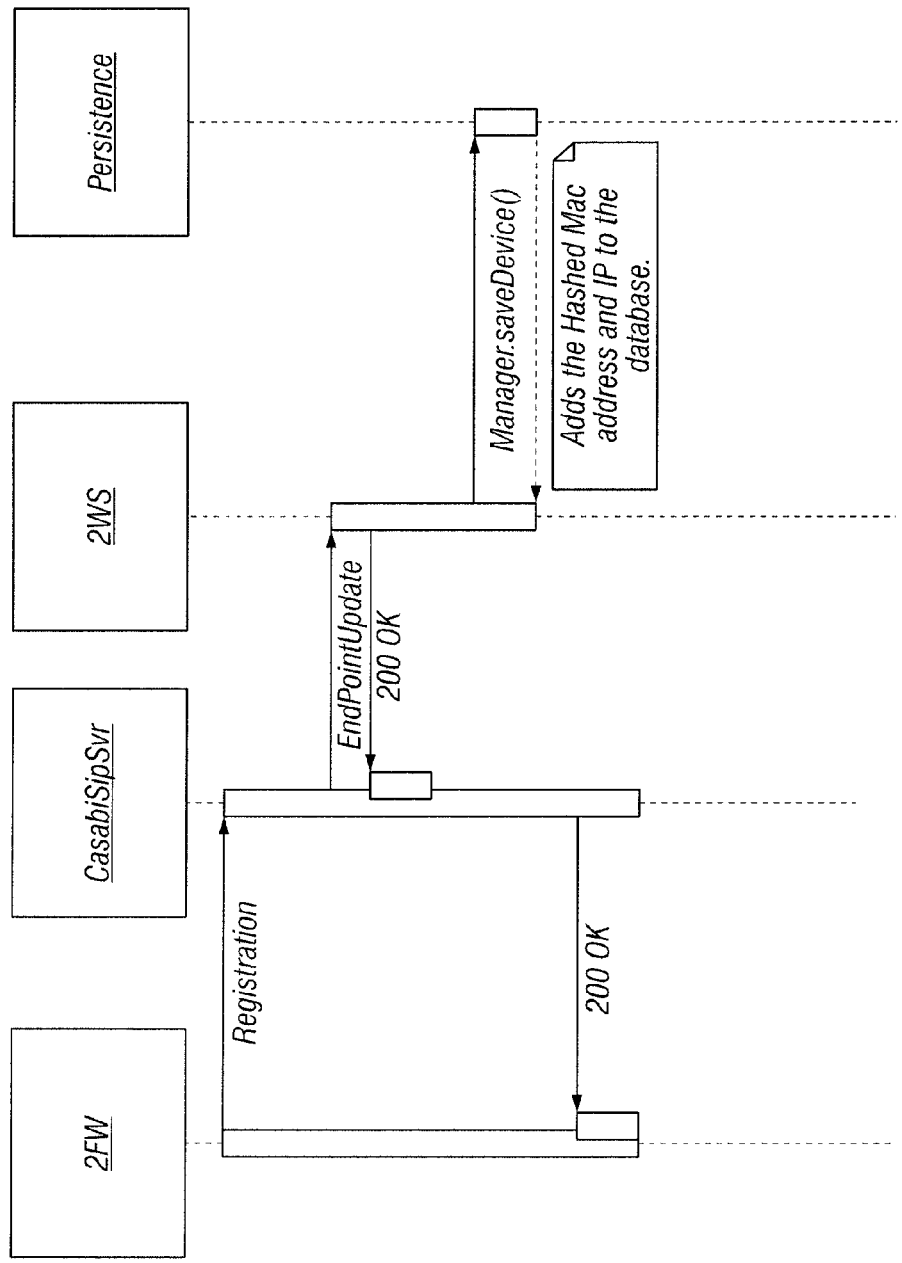
FIG. 25 is a block schematic diagram showing an EndPointUpdate according to the invention.

This message (see FIG. 25) is sent by the SIP Server when it receives a SIP register message for a telephone system and the IP address of that telephone system has changed. The following are the details/format of the EndPointUpdate message. The ID tag is the telephone System ID. The AOR (address of record) is the SIP address of the info push user agent of the telephone system.

EndPointUpdate

```xml
<message>
    <header>
        <op>EndPointUpdate</op>
    </header>
    <content>
        <phoneSystem>
            <ID>CadCExuNJrKu</ID>
            <aor>sip:userId@IpAddress:Port</aor>
        </phoneSystem>
    </content>
</message>
``` runLevel 0: EndPonitInitialization

Figure 26:
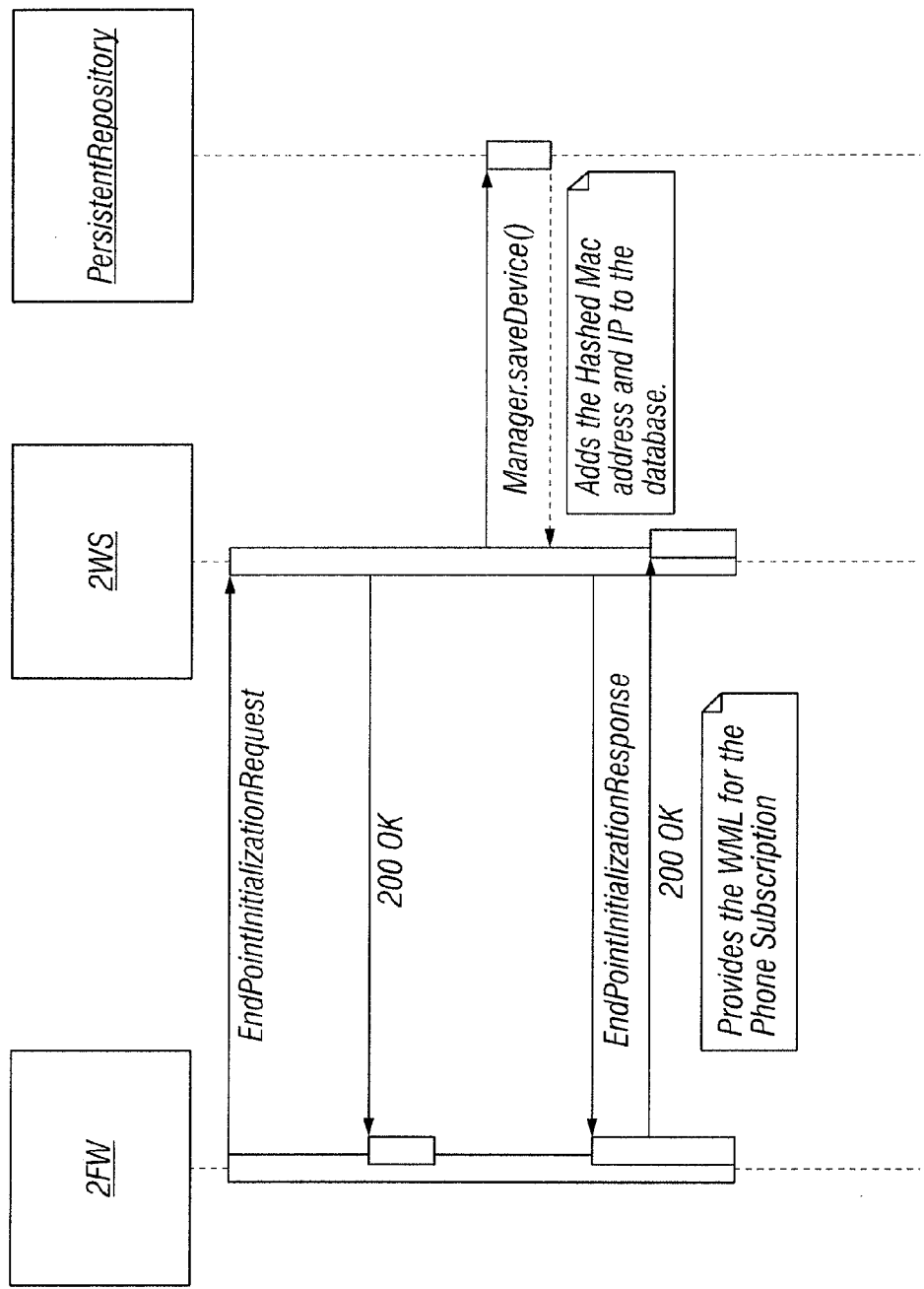
FIG. 26 is a block schematic diagram showing a runLevel 0: EndPonitInitialization according to the invention.

The following interaction between the QFW and 2WS (see FIG. 26) occurs at runLevel 0. The note in FIG. 26 provides details of the message structure used in the interaction. The following are the details of the EndPonitInitializationRequest and EndPonitInitializationResponse messages.

EndPointInitializationResponse

```xml
<message>
    <header>
        <op>EndPointInitializationRequest</op>
        <endPointId>HashedMacAddress</endPointId>
    <header/>
</message>
```

EndPointInitialization Response

```xml
<message>
    <header>
        <op>EndPointProxy</op>
        <fileName>/<userName>/EndPointProxy</fileName>
            <fileType>wml</fileType>
        <handSetStrId>All</handSetStrId>
        <pushOption>
            <enabled>true</enabled>
        </pushOption>
    </header>
    <content>
        <![CDATA [ <wml>......................</wml>
]] >
    </content>
</message>
``` runLevel 1: EndPointProxy

Figure 27:
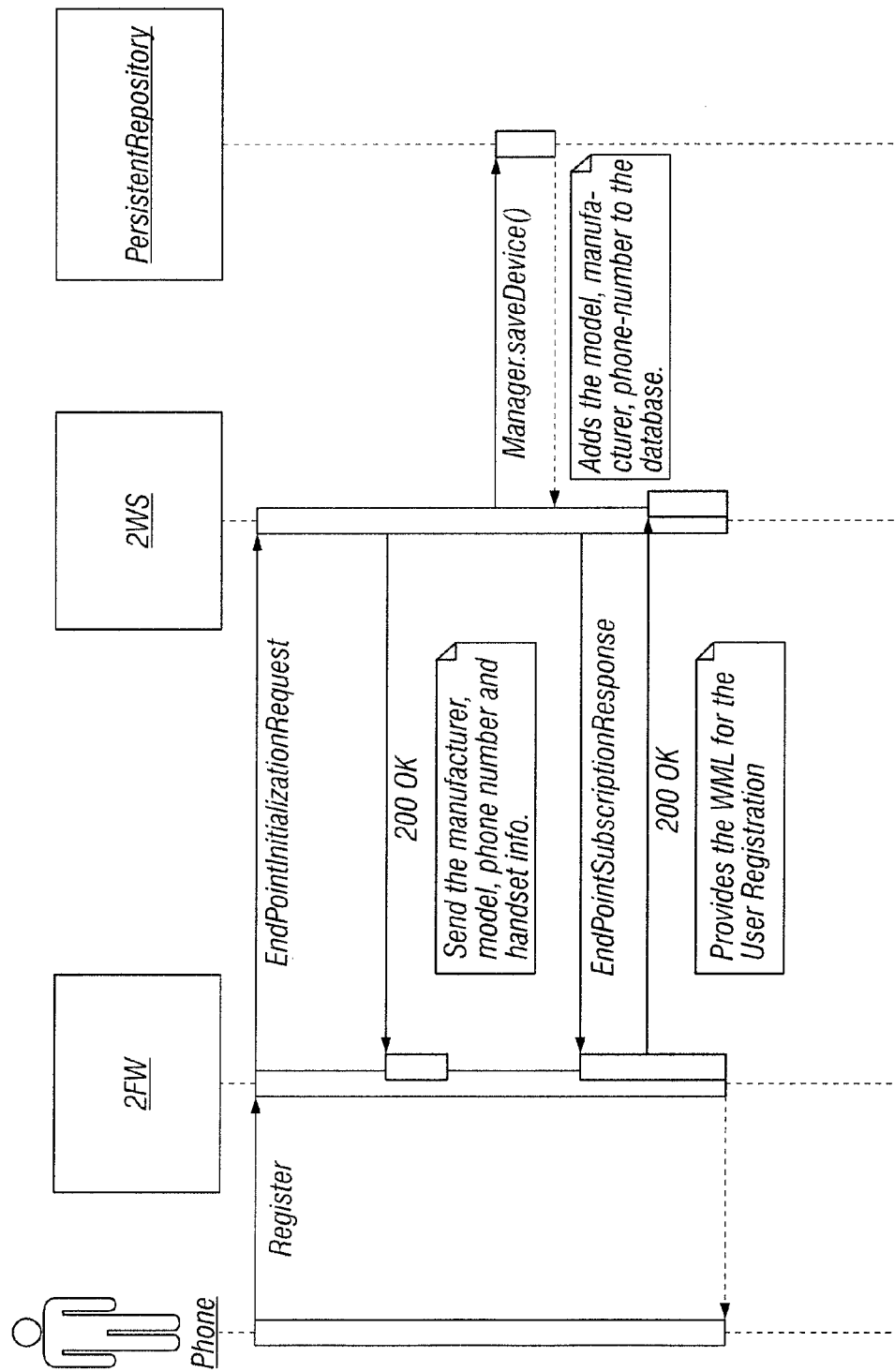
FIG. 27 is a block schematic diagram showing a runLevel 1: EndPointProxy according to the invention.

The following interaction between the QFW and 2WS (see FIG. 27) occurs at runLevel 1. The note in FIG. 27 provides details of the message structure used in the interaction. The following are the details of the EndPointProxyRequest and EndPointProxyResponse messages.

EndPointProxyRequest

```xml
<message>
    <header>
        <op>EndPointProxy</op>
        <endPointId>HashedMacAddress</endPointId>
    </header>
    <content>
        <phoneSystem>
            <base>
                <manufacturerName>IDT</manufacturerName>
                <modelNo>1</modelNo>
            </base>
            <handSet>
                <handSetStrId>HS1</handSetStrId>
            </handSet>
            <handSet>
                <handSetStrId>HS2</handSetStrId>
            </handSet>
            <handSet>
                <handSetStrId>HS3</handSetStrId>
            </handSet>
        </phoneSystem>
    </content>
</message>
```

EndPointProxyResponse

```xml
<message>
    <header>
        <op>EndPointProxyResponse</op>
        <fileName>/<userName>/UserRegistration"</fileName>
            <fileType>wml</fileType>
        <handSetStrId>All</handSetStrId>
```

```
       <pushOption>
           <enabled>true</enabled>
       </pushOption>
   </header>
   <content>
           <![CDATA [
<wml>......................</wml> ]] >
   </content>
</message>
```

2WS-QFW
UserAccountActivation

```
   <message>
       <header>
           <op>UserAccountActivation</op>
           <fileName>/UserAccountActivation</fileName>
               <fileType>wml</fileType>
           <handSetStrId>All</handSetStrId>
           <pushOption>
               <enabled>true</enabled>
           </pushOption>
       </header>
       <content>
           <authority>www.somename.com</authority>
           <![CDATA [ <wml>......................</wml> ]] >
       </content>
   </message>
```

Within the wml in this message there is an href containing a URI. This URI is formatted as follows:

```
       sip:/casabi-idt-
       service/signIn?userId=someUser&password=somePwd
```

When the user hits the submit button this uri is sent in the following message:
QFW-2WS
DataRequest

```
       <message>
           <header>
               <op>DataRequest</op>
               <endPointId>hashedMacAddress</endPointId>
               <handSetStrId>HS1</handSetStrId>
           </header>
           <content>
       <uri>sip:/casabi-idt-
       service/signIn?userId=someUser&password=somePwd</uri>
           </content>
       </message>
```

2WS-QFW
The 2WS receives the message and responds with the following message:
Data Response

```
   <message>
       <header>
           <op>DataResponse</op>
           <fileName>/userId/signIn.wml</fileName>
           <fileType>wml</fileType>
           <handSetStrId>HS1</handSetStrId>
           <pushOption>
```

```
           <enabled>true</enabled>
       </pushOption>
   </header>
   <content>
           <![CDATA [ <wml>......................</wml>
]] >
   </content>
</message>
```

QFW-2WS HTTP Interactions

Within the wml in the above message, there are URIs for the various services, channels, etc. These URIs are formatted according to RFC 2396s declaration for an absolute URI. In effect the URI format works out to:

<scheme>:<path><query>

When the user clicks on any of the links in the WML pages, the telephone sends the URI to the QFW which uses the scheme, e.g. SIP, HTTP, etc, to determine what action needs to be taken and what protocol needs to be used. In this case, the action is to request a resource from the 2WS and the scheme/protocol is HTTP. The QFW then builds the URL from the URI and sends this URL to the 2WS. The 2WS uses the URL to access/get the appropriate resource and sends it back to the QFW. This interaction is repeated for all Services that use HTTP.

The methodology for constructing a URL from the URI is to insert the authority, e.g. www.some-casabi-service.com, between the scheme and the path. This action converts an absolute URI with a file path into an absolute URI with a network path. This can be stated as follows:

File Path—<scheme>:<path><query>
Network Path—<scheme>:<authority><path><query>

The following examples detail the URI to URL conversion:
Address Book
URI—http:/casabi-idt-service/addrBook?userId=someUser
URL—http://www.some-casabi-service. com/casabi-idt-service/addrBook?userId=someUser
Channels—Weather
URI—http:/casabi-idt-service/weatherChannel?userId=someUser
URL—http://www.some-casabi-service.com/casabi-idt-service/weatherChannel?userId=someUser
Channels—News
URI—http:/casabi-idt-service/newsChannel?userId=someUser
URL—http://www.some-casabi-service.com/casabi-idt-service/newsChannel?userId=someUser
Channels—Horoscope
URI—http:/casabi-idt-service/horoscope?userId=someUser
URL—http://www.some-casabi-service.com/casabi-idt-service/horoscope?userId=someUser
Email
URI—http:/casabi-idt-service/email?userId=someUser
URL—http://www.some-casabi-service.com/casabi-idt-service/email?userId=someUser SIP Agent Application Interaction FIGS. 34-37 are flow diagrams showing SIP agent application interaction during various processes within the service.

Figure 34:
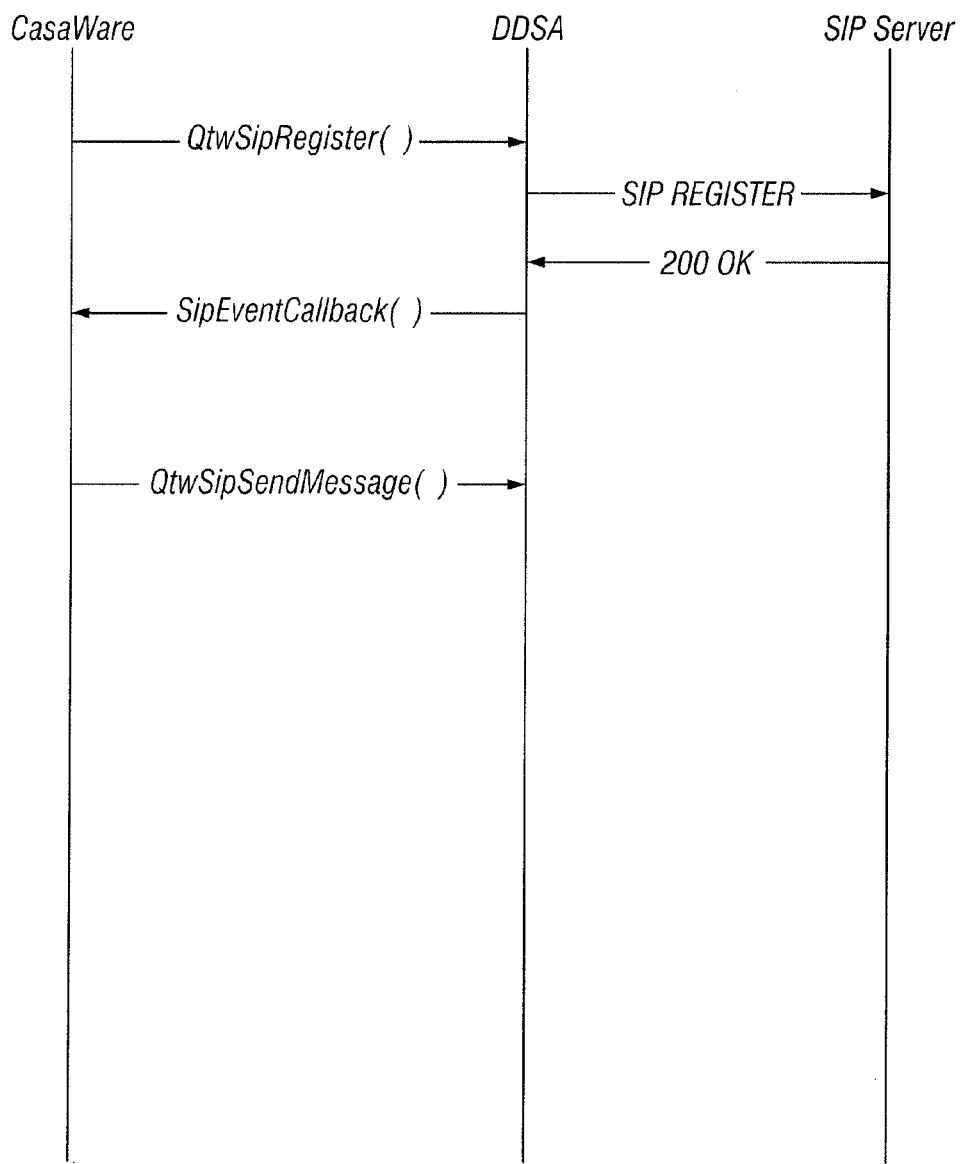
FIG. 34 shows SIP application user agent interaction during registration according to the invention.

FIG. 34 shows SIP application user agent interaction during registration. The service does not issue any SIP commands (QfwSipRegister, QfwSipSendMessage) while waiting for acknowledgement (callback) of the previous command. The service does not attempt to send a SIP MES- SAGE (QfwSipSendMessage) unless it has received positive acknowledgement of a SIP REGISTER.

Figure 35:
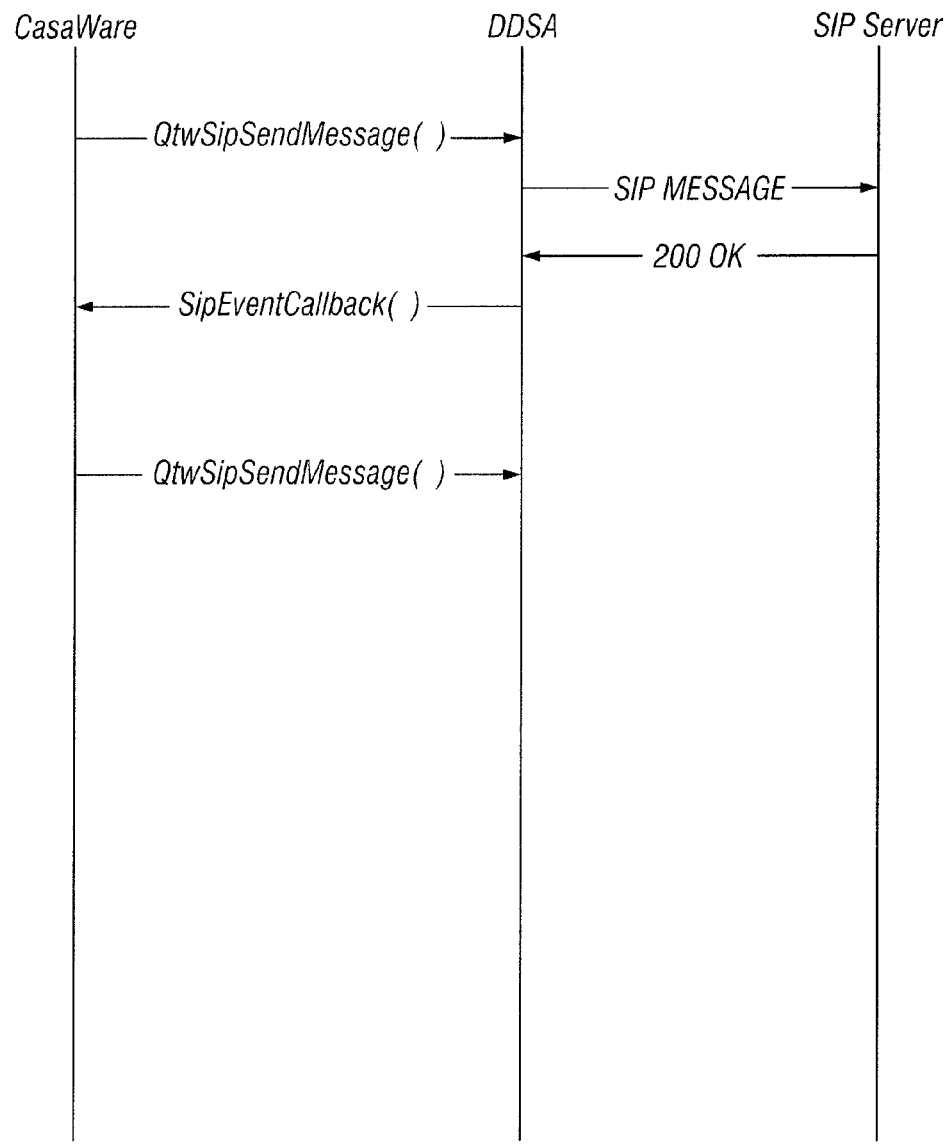
FIG. 35 shows SIP application user agent interaction for an outgoing MESSAGE according to the invention.

FIG. 35 shows SIP application user agent interaction for an outgoing MESSAGE. The service does not issue any SIP commands (QfwSipRegister, QfwSipSendMessage) while waiting for acknowledgement (callback) of the previous command. The service does not attempt to send a SIP MESSAGE (QfwSipSendMessage) unless it has received positive acknowledgement of a SIP REGISTER.

Figure 36:
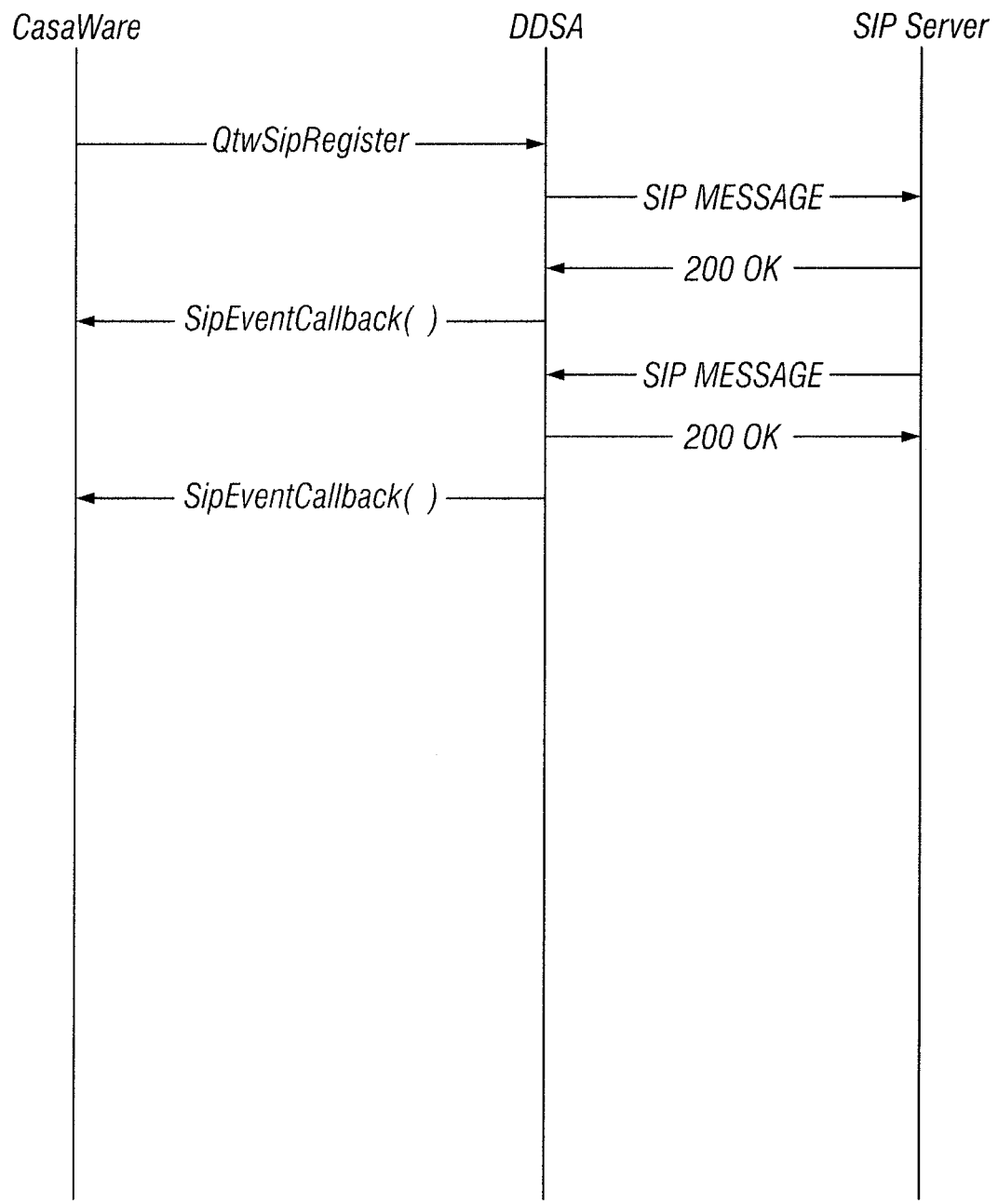
FIG. 36 shows SIP application user agent integration for an incoming MEASSAGE according to the invention.

FIG. 36 shows SIP application user agent integration for an incoming MESSAGE. The service does not issue any SIP commands (QfwSipRegister, QfwSipSendMessage) while waiting for acknowledgement (callback) of the previous command. The service does not attempt to send a SIP MESSAGE (QfwSipSendMessage) unless it has received positive acknowledgement of a SIP REGISTER.

Figure 37:
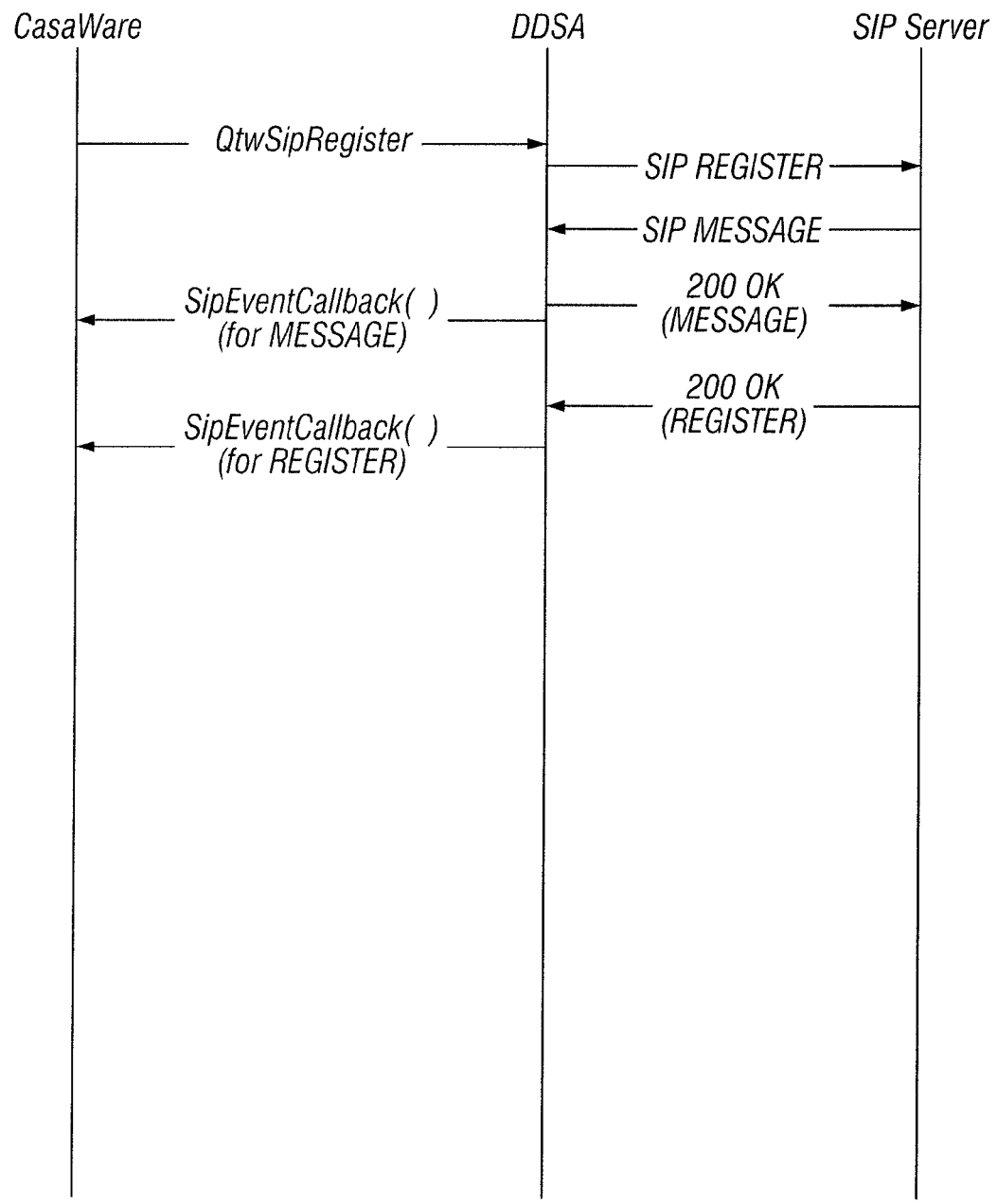
FIG. 37 shows SIP application user agent integration for a REGISTER with incoming MESSAGE process according to the invention.

FIG. 37 shows SIP application user agent integration for a REGISTER with incoming MESSAGE process. This use case scenario demonstrates the process when an incoming MESSAGE is received while the service is waiting for acknowledgement of a renewal REGISTER request. The service accepts the incoming MESSAGE and processes it normally. The service accepts the incoming acknowledgement of the REGISTER and processes it normally.

Using the Web to Select a VoIP Provider and Attaching the Provider to a Generic VoIP Resource.

Currently, when an individual goes into a store and buys a piece of hardware for a VoIP service, such as Vonage, that hardware is dedicated to the particular service. When the user connects that hardware, its initialization process connects it uniquely to the particular service, e.g. Vonage. A disadvantage for hardware manufacturers, as well as for retailers, is that if the next VoIP provider, e.g. Sun Rockets or Call-Vantage, wants to get store shelf presence, the retailer must stock a unique piece of hardware for that vendor as well. The hardware is exactly the same, except for where it initially boots up and communicates. There might be some protocol differences in the VoIP service.

To address this issue, the invention provides a service that is the first point of contact for such hardware devices. The invention comprises a backend service that has a portal associated with it that a user can go to and select which VoIP provider they want to use. Thus, they can select from a list of VoIP providers and then manage the interaction with the hardware device, download any protocol that may be required, make whatever configuration changes are required and then the hardware device is uniquely tied to the VoIP service selected by the user.

An advantage of this apsect of the invention is that it is not necessary to have unique hardware device for any of the several VoIP service providers. The device manufacturers need only build one version that communicates with the inventive system and the system then manages the interaction of the hardware device with the VoIP service provider. The invention essentially disaggregates the hardware device from the VoIP service and allows the user, the device manufacturer, and the retailer to have more flexibility.

With the invention, the user need not buy any other hardware. The user may have their PSTN service with a service provider, such as AT&T and have their long distance service or second line from another service provider. The user may buy a second PSTN line service from another service provider, or they may buy such service from a VoIP service providery. In all cases, the user does not need to get another piece of hardware. Thus the invention, unlike dedicated VoIP hardware devices can manage all services from all service providers through a single interface, and the user need not worry about buying a specific piece of hardware that's tied to a particular service. Henceforth, if a user wants to buy another service, it is not necessary for the user to buy another piece of hardware. Rather, the user can change service providers by changing their profile through the interface provided by the invention, and then download their current profiles for the new service, or the user4 could have more than one service by maintaining multiple profiles. For example, if a user had other people living in their home with them who wanted to have their own accounts, e.g. a child, spouse, and/or a roommate, then the invention would allow that residence to have multiple vendors in the same system. This is due to the fact that the invention allows a user to have a different profile for each hardware device, e.g. handset, and/or for each user of each handset. Because the invention provides the backend service that enables multiple hardware devices and multiple users, each such hardware device and each such profile is a network based resource that has attributes which can be changed without having to change the hardware device itself.

As discussed elsewhere herein, the invention also comprises a browser element and website that can be accessed from a conventional PC. Some of the features discussed are more complicated in nature to set up. In such cases, it is more appropriate to go through a PC interface rather than the limited interface provided, for example, by a handset. Thus, one aspect of this feature of the invention is the provision of a portal that is used when configuring such services as VoIP.

Leveraging a Stimulus/Response Model to Send Information Through a Firewall Via SIP and Receiving a Response Via HTML An overview of the traditional use of SIP and http is first provided. http is a ubiquitous protocol used by Web browsers in a typical network topology by a generic Internet user. Such topology comprises the following: a browser which runs on a computing device, where the computing device is assigned a network address, for example by a router. The network address is a term used to describe a private IP address, i.e. an address assigned by the router and that is valid only within the domain of the router, within the network controlled by the router, e.g. within the user's home. The IP address is only valid within the local LAN supported by the router, while other devices on the Internet may or may not have a global IP address that is valid across the whole of the Internet. Thus, the local address used by a user device according to the invention has no meaning in the global address base. Accordingly, a computing device in the global Internet cannot send a message directly to the local IP address of the user device because the computing device and the user device reside in different address bases.

As stated above, the local IP address of the user device has no meaning in the global IP address space. This is not a problem for the http protocol which is used for Internet browsing because a browser running on a user device, e.g. in the home, initiates a session with a server running in the global IP address space, e.g. wwww.yahoo.com, which translates to a global IP address somewhere in the Internet. The router that controls the local IP address space allows the browser to initiate a session. In other words, the session is initiated from inside the local IP address space. Typically, a firewall runs in the router that allows a computing device on the user side of the router to initiate an http session. The firewall does not allow computing devices outside of the private IP address space, for example Yahoo, to initiate a session with the local computer. Thus, a remote server cannot push content past a firewall to a PC.

The Session Initiation Protocol (SIP) is an application-layer control (signaling) protocol for creating, modifying, and terminating sessions with one or more participants. These sessions include Internet telephone calls, multimedia distribution, and multimedia conferences (see RFC 3261). SIP clients use TCP or UDP to connect to SIP servers and other SIP endpoints. SIP is primarily used in setting up and tearing down voice or video calls. Thus, SIP messages must be able to be pushed into the local IP address space from the outside. Otherwise, it would not be possible for someone to call into a VoIP device. Thus, SIP networking solves problem of initiating a session from a global IP address space to a local IP address. For purposes of the discussion herein, this is referred to as a stimulus response model. This embodiment of the invention leverages the ability of SIP to push content to user devices that operate in connection with the inventive server discussed herein. To this end, the invention provides a mechanism that pushes an event and an address to a user device via SIP. The event announces that there is content for the user and the address identifies where the user goes to get the content. The address is an http address, typically in the form of a URL. When the SIP message is received at a user device that is enabled by the invention, the user device uses http to pull the content from the address contained in the SIP message.

In the invention, the URL is not something that the user sees. It is interpreted automatically by the inventive server. For example, consider the case where traffic alerts are to be pushed to a user's telephone, i.e. a user device connected to the inventive server. Rather than try to push a large packet to the user device that contains the traffic alert itself in a markup language that can be displayed on the user device, because SIP is not meant to transfer large packets, it is not necessary to set up a session with SIP, but instead a simple SIP message is exchanged to tell the user device that there is content that needs to be displayed. The server to which the user device is registered receives an http address, e.g. a URL, and then, unbeknownst to the user, without any user intervention, the inventive server pulls the content using http. In this example, the inventive server receives the SIP message, but in terms of the server, externally, there is a SIP call coming in that is to be used to push content such as a traffic alert or a weather alert. What the server sees is an indication or a control signal that says a URL is being sent and the server should go out and follow it. The server then follows the URL, gets the information associated with the URL, and then renders and presents the information to the user on the user device. Specifically, in this example software running on a system comprising the inventive server and a user device receives a SIP content retrieval message. The address is in the message is used to retrieve the content, which is then rendered and displayed on the user device.

Managing Multiple Endpoints Through a Single SIP User Agent (UA) and IP Address

SIP is a peer-to-peer protocol, in which SIP endpoints originate and terminate SIP messages. A SIP user agent is an application that runs on top of the SIP messaging protocol. An endpoint generally refers to a SIP address, which comprises a logical part, which is referred to as the user part, and a host, which is, for example, an IP address or a domain name, which would result in an IP address. An example of a SIP user agent is the software required to effect SIP voice calling. Generally, the user part of the SIP address specifies to the SIP endpoint which user agent is handling the address. Thus, in SIP there is a one-to-one mapping between SIP endpoint addresses and the SIP user agent.

In this embodiment of the invention, a single user agent handles multiple SIP addresses, rather than one user agent associated with a given endpoint. For purposes of the discussion herein, the terms "endpoint" and "address" are used interchangeably. In the known art, there is one user application per SIP address. Thus, for a telephone that is enabled for SIP based voice calling, there is a user agent and endpoints associated with the voice functionality. Similarly, if the telephone performed other SIP-based function, another endpoint in SIP user agent would handle that function.

In this embodiment of the invention, there is a single user agent that handles SIP messages for multiple endpoints. That is useful because there is a certain expense associated with supporting endpoints, not only on the device itself in terms of addresses, but in the SIP network itself, especially with respect to the part of the SIP infrastructure that allows penetrating firewalls, there are resources associated with every endpoint. By managing multiple endpoints through a single UA, the invention reduces the need for such resources.

Binding Multiple Profiles and Applications to a Single Device Through Network Control This embodiment of the invention comprises a telephone system as per the invention described herein, which consists of a telephone base station running system software in accordance with the invention described herein and multiple handsets which have simple rendering devices, such as a screen for browser-like rendering. In the network, there is a network based control for these devices. The network comprises users and, associated with the user, a profile which indicates features, functionality, and content to which a user has subscribed. Uniquely, in this embodiment the user device can take on multiple personalities. In fact, if the system is considered the user device, then the device can take on multiple personalities simultaneously. For example, if the system comprises more than one handset, each handset can be associated to a different user, such that each handset can be behave differently simultaneously. This is enabled by the data model in the network which lists the users and their profiles and the fact that the invention binds the handsets to particular users at log-in time.

The binding is part of the registration process which is discussed elsewhere in this document. There is registration of a telephone system and there is registration of the handsets. Telephone registration involves profile creation, and takes advantage of the fact the invention allows one to create profiles at the time of telephone registration. The system knows that for each handset there can be a different registration and a different profile, e.g. a different user source or endpoint. When the user registers a telephone handset for the first time, it is necessary to create one user, but the invention allows registration of subsequent users subsequently.

Delivering and Tracking Click/Call Information for PSTN and Digital Telephone Networks This embodiment of the invention concerns sending the results of a click-to-call or pay-per-call type search to a user of a handset according to the invention herein disclosed, where a search is performed against a local directory feed, e.g. local directory searches or generic Yellow Pages, for example as provided by Yahoo. At the same time that the search is performed, the system accesses multiple pay-per-call vendors who have specific advertisements in specific categories. The system performs a category search for the generic search requested by the user against a local directory, such as the Yellow Pages. The category is sent to the list of pay-per-call vendors and a matching list of vendors is returned to the user with the search results.

thus, this embodiment of the invention comprises a combination of Yellow Page ads and unique pay-per-call entries. The system combines these onto a screen such that a user can search on those screens. Uniquely, this embodiment of the invention combines these search results from disparate sources onto a single screen that a user can then use to browse between the local directory and a pay-per-call listing. When the user clicks on a listing, a call is made directly to the listed service over the PSTN line. Today, pay-per-call is performed on a PC, where a user clicks on a link displayed a PC and the network makes a call in the network. In this case, the user must dial a telephone number uniquely from the screen of the PC onto his phone. In contrast, this embodiment of the invention allows the user to select a listing directly on a handset and a call is made automatically over the PSTN line. Thus, the user device, in combination with the inventive server, provides the interface by which the user performs the search, receives the results, selects a listing from the results, and is connected to the listed service for voice communications. Because the invention combines the pay-per-call ad accessed, for example, from the Web, directly with a user device that is connected to a PSTN network, the step of dialing the pay-per-call number is eliminated.

For example, in a session a user might want to find information about a florist. The user enters information on the his handheld device about searching for a florist. Through the inventive server, the user entered information is translated into a search, for example, on the Internet or other servers. A search result on florists is returned to the user that has two types of information: It has both the advertising information and also the pay-per-call information. This information is presented to the user by the inventive server onto the user's handheld device as a list, for example, that might be ordered based on how much advertisers were paying to be on the list. When the user selects an item from the list, the inventive server makes a call on the PSTN for the user. Thus, the server recognizes the search results and the telephone numbers contained within such search results, and renders those telephone numbers onto the screen of the user device, such that when the user accesses the information, the system then know to make a PSTN call to the user selected service. IN some embodiments, the system may place a call either over the PSTN line or it can also place the call over a VoIP network and connect directly to the advertiser, as well, bypassing the PSTN network. With this embodiment, it is possible to track whether the call is connected uniquely to then report to an advertise that a call was connected for an amount of time. Thus, this embodiment allows the system to track the metrics of the call, e.g. for product revenue or ad revenue purposes. click throughs are also collected in this way.

Address Book Stored on Service

A presently preferred embodiment of the invention comprises a network based address book that appears on the user devices as if this address book exists on the user device but, in fact, it is located on the network. One benefit of this embodiment is that address book size is not limited by the memory available on the user device. In this way, a user can store a much larger address book, and can synchronize it with other network-based address books and other devices, such as cell phones.

In one embodiment, the address book is stored on a service, in effect virtualizing a network based address book out onto a user device, e.g. a handset. The invention keeps the network based address book synchronized with the handset, but preferably does not move the entire address book to the handset.

One embodiment moves the address book into the inventive server, e.g. the handset base station, where it is rendered and presented to the handset. The handset base station also has a limited amount of memory. If the address book is small, the entire address book is moved to the handset base station. If the address book is large, then portions of the address book are moved to the handset base station in response to user navigation within the handset. Thus, in one embodiment, the system moves a list to the handset and/or handset base station depending on the types of keys a user selects on the handset. This aspect of the invention mimics what a user would expect to do when accessing addresses in a cell phone, e.g. select a key on the keypad and view listings associated with the selected character. If the user's address book is large, only the set of addresses associated with the user selected key are moved to the handset, and the user can further navigate within that set of addresses. Thus, this embodiment of the invention permits user access to a virtually unlimited size of address book on a handset, where the addresses are stored in the network but rendered on the handset.

The invention also allows the user to have multiple address books on the handset base station for different users at any one time. When a user logs onto a handset, the system downloads the appropriate address book for that user. In other embodiments, it is not necessary to keep all address books on the handset base station, which would otherwise limit the amount of memory available for other system features, but the address books can be located on the network and are fetched by the handset base station in whole or in part as needed.

This embodiment of the invention also provides the ability to have both shared and personal address books. A shared address book is one that anybody within a particular group, e.g. a family, can access. In this case, when a user makes an address book change, such change is stored in the address book and the address book repopulated in such a way that whoever is logged into their own personal account and has their own personal address book, for example, also has access to the shared address book and is able to see all changes made to the shared address book, as well as make changes to the shared address book themselves. The shared address books are commonly visible to everybody within a group, while personal address books are only for a user's personal access. In contrast to state of the art network based address books, which essentially keep a local contact list on a user device synchronized with the user's network based contacts, the invention maintains the network based address book as the user's true list of stored contacts, and only moves that portion of the list of contacts contained in the address book that is presently required from the network based address book to the user's local device, e.g. the handset. In this way, the size of the user's address book, as well as the number of address books that the user can access, is not limited by the amount of memory on the user device.

As discussed above, one embodiment of the invention provides multiple address books, some of which may be personal to a particular user. Thus, when a user scrolls through a list of names, the user sees names that other users do not see when they scroll through a list of names, and vice versa. Thus, the invention integrates all of the multiple address books into a single address book for each user, but the address book is a personal subset of the entire universe of addresses. Accordingly, each user can have addresses in common with other users and can have addresses that are specific only to them.

As also discussed above, user gestures are used to determine the portion of the address book that the user wants to access. The system renders only that portion of the address book that the user appears to need. In this way, the user only receives the portion of the address book that he is currently navigating. Thus, the invention provides a means for interpreting navigation to provide a limited portion of the address book consistent with the navigation. For example, if the user is scrolling very quickly through the alphabet, the system would render portion of the address book that corresponds to the letters of the alphabet, e.g. A, B, C and so forth, on the user device when the user stops scrolling. Until the user stops scrolling, the system skips the list of contacts associated with each letter of the alphabet. As the user slows down the speed at which he is scrolling, for example, scrolling through D, the system starts rendering more information to the user device. Thus, there are any number of heuristics involved in interpreting user gestures. For example, if the user device includes a scroll wheel, the heuristics can include such factors as how quickly the user is scrolling. If the user is scrolling quickly, the system provides a more limited subset of the address book. As the user slows down the rate at which scrolling occurs, the system makes the stops between entries on the contact list closer together.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for sending information through a firewall, comprising the steps of:
providing a stimulus response mechanism which executes steps for:
implementing said stimulus response mechanism in a broadband enabled telephone system in which SIP messages are sent to and from a SIP end point;
providing at least one base station comprising:
a first communications facility;
a broadband network connection for establishing and maintaining broadband access to said network via said first communications facility; and
a second communications facility for interacting with, and maintaining profile information for, a plurality of handsets;
providing an SIP server configured to serve SIP messages to said plurality of handsets;
pushing an event and an address to a user handset selected from said plurality of handsets via a SIP message through said SIP server wherein said event announces that there is content for the user and the address identifies where the user goes to get the content and wherein the address is an http address in the form of a URL that is not seen by the user and is automatically interpreted; and
when the SIP message is received at the user handset, said user device using said http address to pull the content from the address contained in the SIP message according to said profile information for said user handset,
wherein the method is implemented in hardware.

2. The method of claim 1, said content comprising any of: traffic and weather alerts that are pushed to a user device.

3. The method of claim 1, further comprising the steps of: said base station acting as a proxy for said handsets; and said base station storing said profile information;
wherein each handset can be dynamically personalized for a plurality of users by user selection of a particular handset profile stored in said base station via said client means.

4. The method of claim 1, further comprising the step of: providing at least one server for collecting, packaging, and delivering personalized content and services on demand to each of said telephone system handsets via said base station in accordance with profile information contained on said base station for said handsets;
wherein information and services available via said network are delivered to a plurality of users of a plurality of handsets through said broadband enabled telephone system.

5. An apparatus for sending information through a firewall, comprising:
a stimulus response mechanism comprising:
a broadband enabled telephone system in which SIP messages are sent to and from a SIP end point, wherein said telephone system comprises an SIP server configured to server SIP messages to a plurality of handsets;
at least one base station comprising:
a first communications facility;
a broadband network connection for establishing and maintaining broadband access to said network via said first communications facility; and
a second communications facility for interacting with, and maintaining profile information for, said plurality of handsets;
wherein each handset of said plurality of handsets comprises:
means for communicating with, and uniquely identifying itself to, said base station via said second communications facility; and
client means for providing an interface to a handset user by which said user operates a handset to interact with said network via said base station and by which said user builds a profile which defines what information and services are provided to a user through a particular handset;
wherein said stimulus response mechanism executes steps for:
pushing an event and an address to a user handset via a SIP message through said SIP server, wherein said event announces that there is content for the user and the address identifies where the user goes to get the content; and
wherein the address is an http address in the form of a URL that is not seen by the user and is automatically interpreted; and
when the SIP message is received at the user device, said user device using said http address to pull the content from the address contained in the SIP message according to said profile information for said user handset.

6. The apparatus of claim 5, said content comprising any of:
traffic and weather alerts that are pushed to a user device.

7. The apparatus of claim 5, further comprising:
means for said base station acting as a proxy for said handsets; and
means for said base station storing said profile information;
wherein each handset can be dynamically personalized for a plurality of users by user selection of a particular handset profile stored in said base station via said client means.

8. The apparatus of claim 5, further comprising:
at least one server for collecting, packaging, and delivering personalized content and services on demand to each of said telephone system handsets via said base station in accordance with profile information contained on said base station for said handsets;
wherein information and services available via said network are delivered to a plurality of users of a plurality of handsets through said broadband enabled telephone system.

* * * * *